US012656488B2

(12) United States Patent
Pichardo et al.

(10) Patent No.: US 12,656,488 B2
(45) Date of Patent: Jun. 16, 2026

(54) SYSTEMS AND METHODS FOR OPERATION OF MULTIAXIAL ULTRASOUND TRANSDUCERS

(71) Applicant: NOVUSTX DEVICES INC., Calgary (CA)

(72) Inventors: Samuel Pichardo, Calgary (CA); Laura Curiel, Calgary (CA); Sagid Alberto Delgado Amparano, Calgary (CA); Nathan Meulenbroek, Calgary (CA)

(73) Assignee: NOVUSTX DEVICES INC., Calgary (CA)

( * ) Notice: Subject to any disclaimer, the term of this patent is extended or adjusted under 35 U.S.C. 154(b) by 436 days.

(21) Appl. No.: 18/286,032

(22) PCT Filed: Apr. 6, 2022

(86) PCT No.: PCT/CA2022/050521
§ 371 (c)(1),
(2) Date: Oct. 6, 2023

(87) PCT Pub. No.: WO2022/213192
PCT Pub. Date: Oct. 13, 2022

(65) Prior Publication Data
US 2024/0248205 A1 Jul. 25, 2024

Related U.S. Application Data

(60) Provisional application No. 63/171,998, filed on Apr. 7, 2021.

(51) Int. Cl.
G01S 15/89 (2006.01)
B06B 1/02 (2006.01)
(Continued)

(52) U.S. Cl.
CPC ........ G01S 15/8927 (2013.01); B06B 1/0207 (2013.01); B06B 1/0622 (2013.01);
(Continued)

(58) Field of Classification Search
CPC ............... G01S 15/8927; G01S 7/5202; G01S 7/52079; G01S 15/8915; B06B 1/0207;
(Continued)

(56) References Cited

U.S. PATENT DOCUMENTS

| | | | |
|---|---|---|---|
| 5,322,068 A | 6/1994 | Thiele et al. | |
| 7,004,824 B1 | 2/2006 | Madanshetty | |

(Continued)

FOREIGN PATENT DOCUMENTS

| | | | |
|---|---|---|---|
| EP | 0451517 A1 | 10/1991 | |
| EP | 2759003 B1 * | 8/2020 | ........... B06B 1/0622 |
| WO | 2012156838 A1 | 11/2012 | |

OTHER PUBLICATIONS

EP-2759003-B1, English Translation (Year: 2020).*
(Continued)

*Primary Examiner* — Ryan D Walsh
(74) *Attorney, Agent, or Firm* — Stephen Leonard; Aird & McBurney LP

(57) ABSTRACT

Systems and methods are disclosed for performing ultrasound imaging using biphasic driving and/or reception for ferroelectric ultrasound elements having propagation and lateral electrode pairs. Electrode pairs are driven using biphasic drive signals, where the drive signals applied to the respective pairs of electrodes are provided with a phase difference therebetween, and where a time delay may be added between the drive signals to further increase the power of the emitted ultrasound. In some example embodiments, passive determination of the direction and/or location of an acoustic source relative to a multiaxial ultrasound (Continued)

transducer is determined based on the voltages detected at the propagation electrodes and the lateral electrodes the multiaxial transducer, according to a pre-determined relationship between the electrode voltages and one or more directional angles. A plurality of multiaxial ultrasound transducers may be employed to improve the accuracy of the estimated direction and/or location of the acoustic source.

45 Claims, 45 Drawing Sheets

(51) Int. Cl.
B06B 1/06 (2006.01)
G01S 7/52 (2006.01)
G10K 11/34 (2006.01)

(52) U.S. Cl.
CPC ........ G01S 7/5202 (2013.01); G01S 7/52079 (2013.01); G01S 15/8915 (2013.01); G10K 11/346 (2013.01); G10K 11/348 (2013.01); B06B 1/0292 (2013.01)

(58) Field of Classification Search
CPC ... B06B 1/0622; B06B 1/0292; G10K 11/346; G10K 11/348
See application file for complete search history.

(56) References Cited

U.S. PATENT DOCUMENTS

| | | | |
|---|---|---|---|
| 8,715,187 B2 | 5/2014 | Landberg Davis et al. | |
| 8,932,237 B2 | 1/2015 | Vitek et al. | |
| 9,177,543 B2 | 11/2015 | Vitek et al. | |
| 9,555,268 B2 | 1/2017 | Clark | |
| 9,852,727 B2 | 12/2017 | Vitek et al. | |
| 10,189,052 B2 | 1/2019 | Rubel et al. | |
| 2001/0031922 A1 | 10/2001 | Weng et al. | |
| 2007/0055160 A1 | 3/2007 | Ng | |
| 2017/0080255 A1* | 3/2017 | Law | G10K 11/346 |
| 2019/0361103 A1 | 11/2019 | Hoffrogge et al. | |
| 2023/0033799 A1 | 2/2023 | Pichardo et al. | |

OTHER PUBLICATIONS

Hughes A, Hynynen K., "Design of patient-specific focused ultrasound arrays for non-invasive brain therapy with increased trans-skull transmission and steering range", Phys Med Biol. Aug. 3, 2017;62(17):L9-L19. doi: 10.1088/1361-6560/aa7cd5.

Maimbourg G, Houdouin A, Deffieux T, Tanter M, Aubry JF., "Steering Capabilities of an Acoustic Lens for Transcranial Therapy: Numerical and Experimental Studies", IEEE Trans Biomed Eng. Mar. 26, 2019. doi: 10.1109/TBME.2019.2907556. [Epub ahead of print].

Kim S, Kim H, Shim C, Lee HJ., "Improved Target Specificity of Transcranial Focused Ultrasound Stimulation (TSUS) using Double-Crossed Ultrasound Transducers", Conf Proc IEEE Eng Med Biol Soc. Jul. 2018; 2018:2679-2682. doi: 10.1109/EMBC.2018. 8512812.

Pichardo S, Silva RRC, Rubel O, Curiel L, "Efficient Driving of Piezoelectric Transducers Using a Biaxial Driving Techinque", (2015), Efficient Driving of Piezoelectric Transducers Using a Biaxial Driving Technique. PLoS One 10(9): e0139178, https://doi. org/10.1371/journal.pone.0139178.

Author Zhuochen Wang, "Dual-frequency Ultrasound Transducers for Medical Imaging", Publication date Oct. 18, 2016 https:// repository.lib.ncsu.edu/bitstream/handle/1840.20/33245/etd.pdf? sequence=1.

Kamimura et al., "Feedback control of microbubble cavitation for ultrasound-mediated blood-brain barrier disruption in non-human primates under magnetic resonance guidance", J Cereb Blood Flow Metlab. Jul. 2019; 39(7): 1191-1203; Published online Jan. 30, 2018. doi: 10.1177/0271678X17753514, https://www.ncbi.nlm.nih. gov/pmc/articles/PMC6668523/.

Corrected Search Report for PCT/CA2021/050014 dated Jun. 28, 2021, 3 pages.

Delgado, L. Curiel, and S. Pichardo, "Steering single-element lead zirconate titanate ultrasound transducers using biaxial driving," Ultrasonics, vol. 110, p. 106241, Feb. 2021, doi: 10.1016/j.ultras. 2020.106241.

R. M. Jones, D. McMahon, and K. Hynynen, "Ultrafast three-dimensional microbubble imaging in vivo predicts tissue damage volume distributions during nonthermal brain ablation," Theranostics, vol. 10, No. 16, pp. 7211-7230, 2020, doi: 10.7150/thno.47281.

International Search Report for PCT/CA2022/050521 dated Jul. 12, 2022.

* cited by examiner

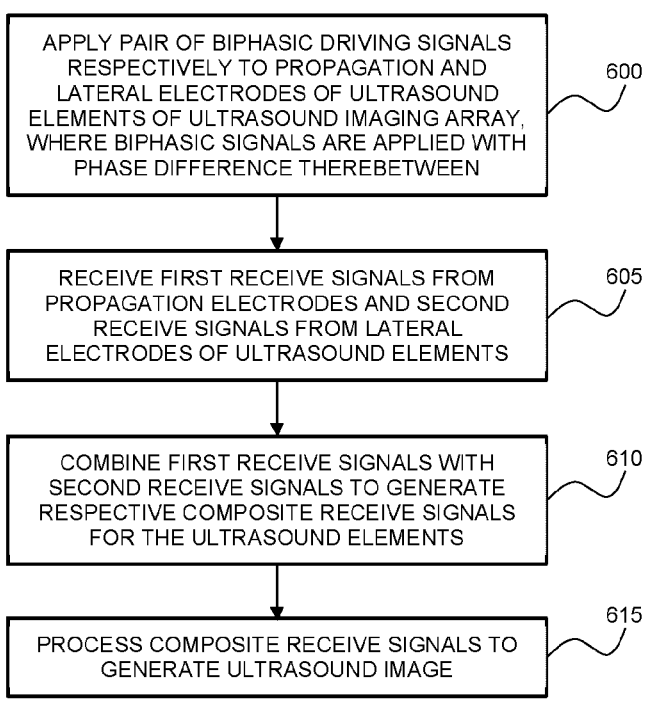

APPLY PAIR OF BIPHASIC DRIVING SIGNALS
RESPECTIVELY TO PROPAGATION AND
LATERAL ELECTRODES OF ULTRASOUND
ELEMENTS OF ULTRASOUND IMAGING ARRAY,
WHERE BIPHASIC SIGNALS ARE APPLIED WITH
PHASE DIFFERENCE THEREBETWEEN
600

RECEIVE FIRST RECEIVE SIGNALS FROM
PROPAGATION ELECTRODES AND SECOND
RECEIVE SIGNALS FROM LATERAL
ELECTRODES OF ULTRASOUND ELEMENTS
605

COMBINE FIRST RECEIVE SIGNALS WITH
SECOND RECEIVE SIGNALS TO GENERATE
RESPECTIVE COMPOSITE RECEIVE SIGNALS
FOR THE ULTRASOUND ELEMENTS
610

PROCESS COMPOSITE RECEIVE SIGNALS TO
GENERATE ULTRASOUND IMAGE
615

FIG. 10A

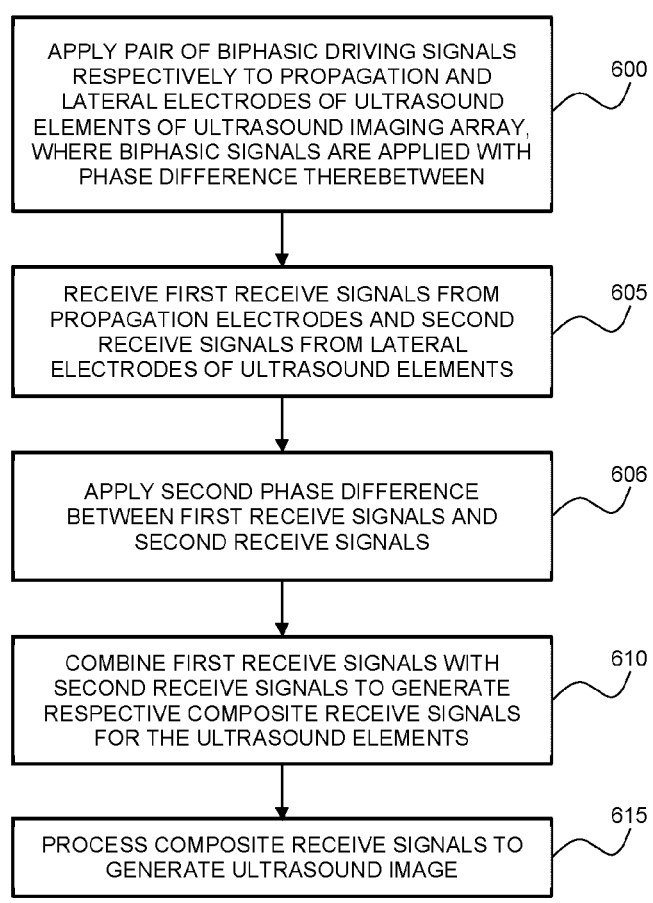

APPLY PAIR OF BIPHASIC DRIVING SIGNALS RESPECTIVELY TO PROPAGATION AND LATERAL ELECTRODES OF ULTRASOUND ELEMENTS OF ULTRASOUND IMAGING ARRAY, WHERE BIPHASIC SIGNALS ARE APPLIED WITH PHASE DIFFERENCE THEREBETWEEN — 600

RECEIVE FIRST RECEIVE SIGNALS FROM PROPAGATION ELECTRODES AND SECOND RECEIVE SIGNALS FROM LATERAL ELECTRODES OF ULTRASOUND ELEMENTS — 605

APPLY SECOND PHASE DIFFERENCE BETWEEN FIRST RECEIVE SIGNALS AND SECOND RECEIVE SIGNALS — 606

COMBINE FIRST RECEIVE SIGNALS WITH SECOND RECEIVE SIGNALS TO GENERATE RESPECTIVE COMPOSITE RECEIVE SIGNALS FOR THE ULTRASOUND ELEMENTS — 610

PROCESS COMPOSITE RECEIVE SIGNALS TO GENERATE ULTRASOUND IMAGE — 615

FIG. 10B

PERFORM FFT ON SIGNAL FROM L ELECTRODES, OBTAINING FREQUENCY-DOMAIN VECTOR ⟩ 700

APPLY PHASE SHIFT TO FREQUENCY-DOMAIN VECTOR ⟩ 705

APPLY INVERSE FFT TO PHASE-SHIFTED FREQUENCY-DOMAIN VECTOR ⟩ 710

ADD SIGNAL FROM PROPAGATION ELECTRODES TO PHASE-SHIFTED SIGNAL FROM LATERAL ELECTRODE ⟩ 715

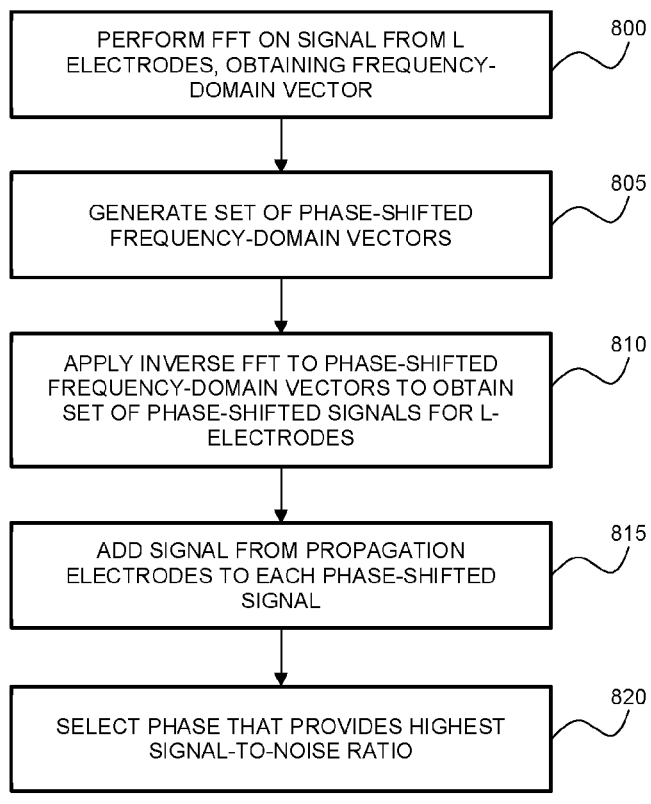

PERFORM FFT ON SIGNAL FROM L ELECTRODES, OBTAINING FREQUENCY-DOMAIN VECTOR — 800

GENERATE SET OF PHASE-SHIFTED FREQUENCY-DOMAIN VECTORS — 805

APPLY INVERSE FFT TO PHASE-SHIFTED FREQUENCY-DOMAIN VECTORS TO OBTAIN SET OF PHASE-SHIFTED SIGNALS FOR L-ELECTRODES — 810

ADD SIGNAL FROM PROPAGATION ELECTRODES TO EACH PHASE-SHIFTED SIGNAL — 815

SELECT PHASE THAT PROVIDES HIGHEST SIGNAL-TO-NOISE RATIO — 820

FIG. 10D

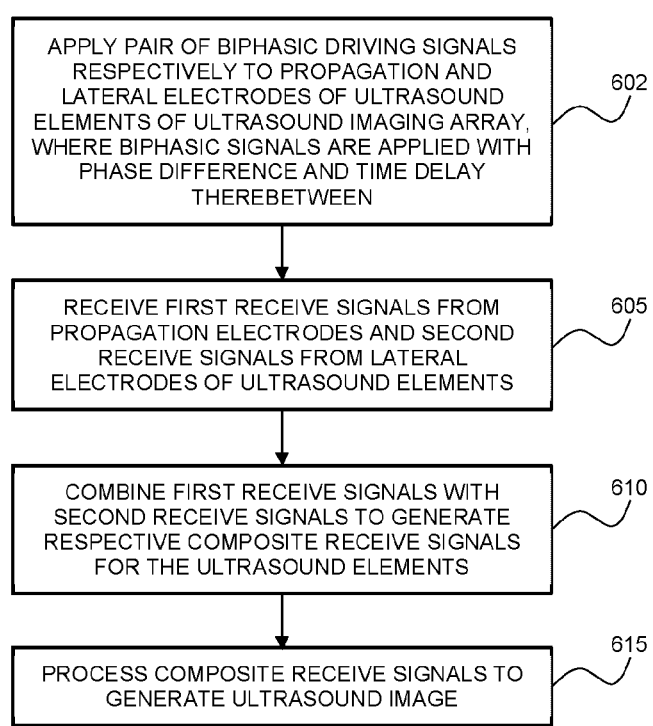

APPLY PAIR OF BIPHASIC DRIVING SIGNALS RESPECTIVELY TO PROPAGATION AND LATERAL ELECTRODES OF ULTRASOUND ELEMENTS OF ULTRASOUND IMAGING ARRAY, WHERE BIPHASIC SIGNALS ARE APPLIED WITH PHASE DIFFERENCE AND TIME DELAY THEREBETWEEN — 602

RECEIVE FIRST RECEIVE SIGNALS FROM PROPAGATION ELECTRODES AND SECOND RECEIVE SIGNALS FROM LATERAL ELECTRODES OF ULTRASOUND ELEMENTS — 605

COMBINE FIRST RECEIVE SIGNALS WITH SECOND RECEIVE SIGNALS TO GENERATE RESPECTIVE COMPOSITE RECEIVE SIGNALS FOR THE ULTRASOUND ELEMENTS — 610

PROCESS COMPOSITE RECEIVE SIGNALS TO GENERATE ULTRASOUND IMAGE — 615

FIG. 10E

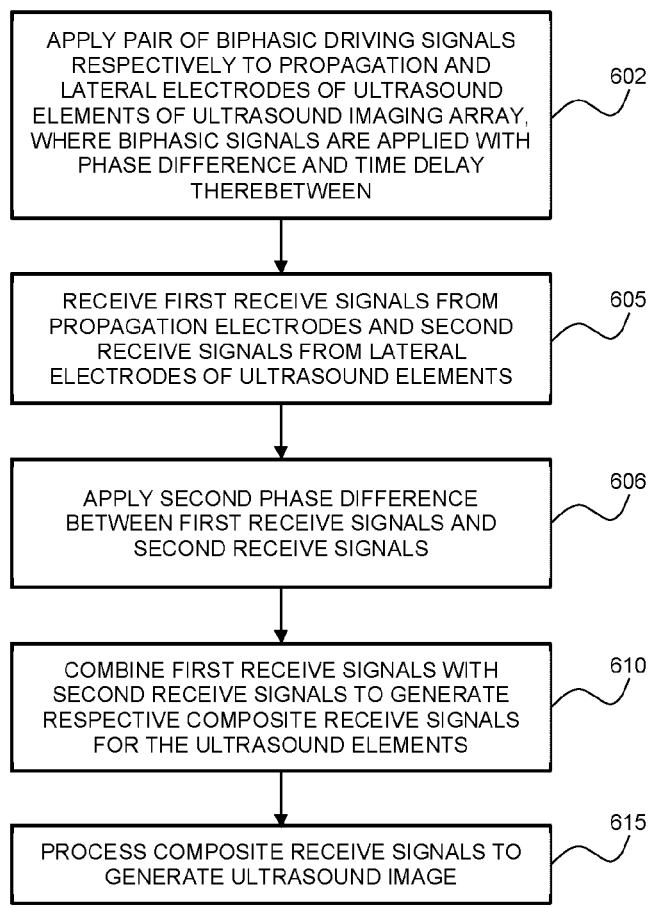

APPLY PAIR OF BIPHASIC DRIVING SIGNALS RESPECTIVELY TO PROPAGATION AND LATERAL ELECTRODES OF ULTRASOUND ELEMENTS OF ULTRASOUND IMAGING ARRAY, WHERE BIPHASIC SIGNALS ARE APPLIED WITH PHASE DIFFERENCE AND TIME DELAY THEREBETWEEN — 602

RECEIVE FIRST RECEIVE SIGNALS FROM PROPAGATION ELECTRODES AND SECOND RECEIVE SIGNALS FROM LATERAL ELECTRODES OF ULTRASOUND ELEMENTS — 605

APPLY SECOND PHASE DIFFERENCE BETWEEN FIRST RECEIVE SIGNALS AND SECOND RECEIVE SIGNALS — 606

COMBINE FIRST RECEIVE SIGNALS WITH SECOND RECEIVE SIGNALS TO GENERATE RESPECTIVE COMPOSITE RECEIVE SIGNALS FOR THE ULTRASOUND ELEMENTS — 610

PROCESS COMPOSITE RECEIVE SIGNALS TO GENERATE ULTRASOUND IMAGE — 615

FIG. 10F

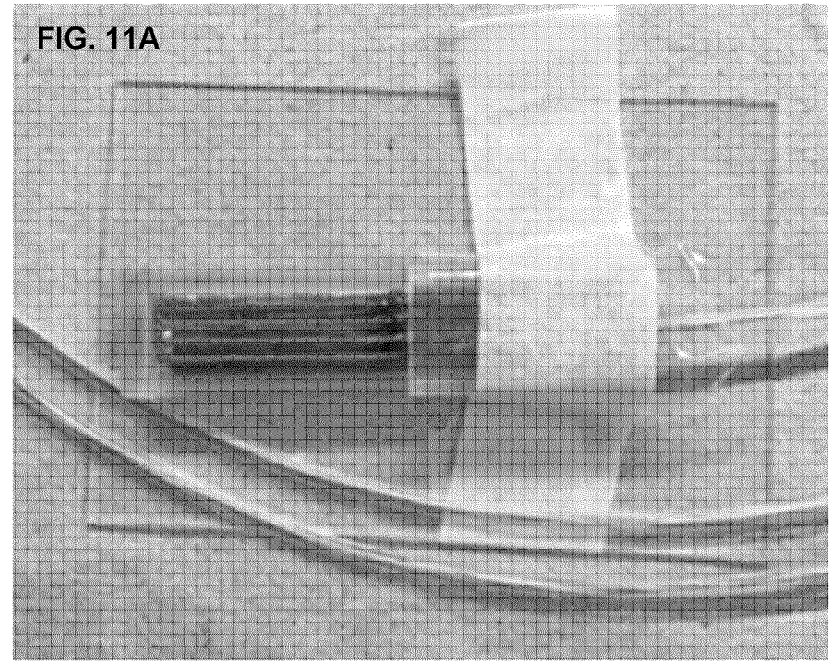
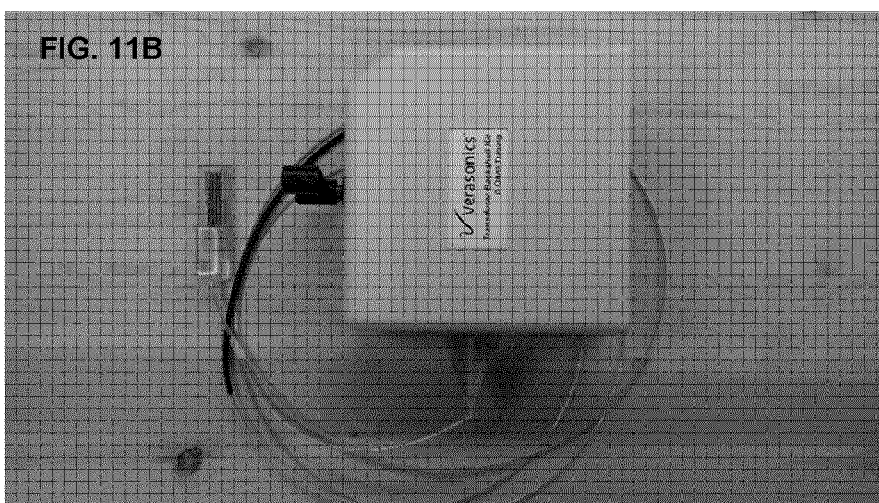

| Metric/Tx element | B | C | D |
|---|---|---|---|
| Peak-peak amplitude (a.u.) | 67 (±2.9) | 162 (±1) | 113(±3.2) |
| Axial resolution (mm) | 4.6(±2.9) | 0.7(±1) | 3.7(±3.2) |
| SNR | 15.2(±2.7) | 23.3(±2.3) | 19(±2.9) |

FIG. 29A

| Transducer Element | Source data | Peak-peak amplitude (a.u.) | Axial resolution (mm) | SNR (dB) |
|---|---|---|---|---|
| B | P | 141.4(±14.0) | 1.6(±2.2)* | 19.8(±1.4)* |
| B | L | 90.9(±8.9) | 1.9(±2.3)) | 16.8(±1.2) |
| B | P+L | 179.4(±18.9)* | 2.0(±2.2) | 17.4(±1.5) |
| C | P | 206.2(±12.3) | 1.4(±1.6) | 23.5(±1.3)* |
| C | L | 157.0(±10.2) | 0.8(±0.1)* | 23.4(±1.1) |
| C | P+L | 247.6(±18.4)* | 1.7(±2.1) | 20.8(±1.3) |
| D | P | 121.2(±25.5) | 2.7(±2.2) | 19.9(±3.2)* |
| D | L | 82.7(±15.9) | 2.4(±2.3)* | 19.1(±2.8) |
| D | P+L | 168.8(±53.6)* | 3.2(±2.3) | 18.3(±3.8) |

FIG. 29B

| Transducer Element | Source data | Peak-peak amplitude (a.u.) | Axial resolution (mm) | SNR (dB) | Optimal phase (°) |
|---|---|---|---|---|---|
| B | P+L-rotated | 165(±11) | 1.3(±1.8)* | 24.4(±1.3)* | 295(±12) |
| C | P+L-rotated | 268(±16) | 0.8(±0.11)* | 28.9 (±1.2)* | 269(±15) |
| D | P+L-rotated | 143(±32) | 2.1 (±2.1)* | 23.5(±2.5)* | 252(±56) |

FIG. 29C

| Transducer Element | Source data | Peak-peak amplitude (a.u.) | Axial resolution (mm) | SNR (dB) | Optimal phase (°) |
|---|---|---|---|---|---|
| B | P | 135.8(±15.0) | 3.6(±3.0) | 21.4(±3.7) | |
| | L | 77.7(±8.9) | 3.2(±2.9)) | 19.1(±2.8) | |
| | P+L | 182.4(±28.2)* | 4.2(±3.2) | 20.0(±3.6) | |
| | P+L-rotated | 176.8(±17.7) | 1.1(±1.0)* | 25.8(±3.0)* | 282.7(±33.4) |
| C | P | 147.4(±13.9) | 2.7(±2.6) | 22.5(±3.6)) | |
| | L | 103.2(±7.0) | 2.4(±1.4) | 22.1(±2.6) | |
| | P+L | 180.8(±23.1) | 4.4(±2.5) | 20.4(±3.4) | |
| | P+L-rotated | 212.5(±18.5)* | 0.8(±0.6)* | 26.4(±2.9)* | 254.4(±41.4) |
| D | P | 202.6(±24.6) | 3.2(±3.0) | 22.2(±4.4) | |
| | L | 109.5(±15.2) | 3.6(±3.0) | 21.2(±3.7) | |
| | P+L | 243.3(±56.2) | 4.4(±3.2) | 20.3(±4.3) | |
| | P+L-rotated | 255.9(±34.8)* | 0.8(±0.9)* | 27.6(±4.1)* | 268.6(±31.5) |

FIG. 29D

| Transducer Element | Source data | Peak-peak amplitude (a.u.) | Axial resolution (mm) | SNR (dB) | Optimal phase (°) |
|---|---|---|---|---|---|
| B | P | 137.1(±10.9) | 4.4(±3.2) | 22.1(±2.6) | |
| | L | 81.4(±7.2) | 4.3(±3.1) | 19.8(±1.9) | |
| | P+L | 191.6(±21.0)* | 4.4(±3.2) | 20.8(±2.6) | |
| | P+L-rotated | 109.4(±6.5) | 3.1(±3.1)* | 27.6(±2.0)* | 275.8(±20.0) |
| C | P | 147.4(±13.9) | 3.8(±3.2) | 24.1(±2.6) | |
| | L | 103.2(±7.0) | 3.4(±2.7) | 24.3(±2.1) | |
| | P+L | 190.6(±17.2) | 4.7(±2.8) | 21.9(±2.6) | |
| | P+L-rotated | 242.3(±14.7)* | 0.8(±1.0)* | 29.1(±1.9)* | 261.2(±28.7) |
| D | P | 210.7(±18.9) | 4.2(±3.3) | 24.4(±3.4) | |
| | L | 119.2(±10.6) | 4.2(±3.2) | 22.5(±2.8) | |
| | P+L | 261.8(±44.6) | 4.3(±3.2) | 22.3(±3.6) | |
| | P+L-rotated | 270.6(±18.5)* | 2.0(±2.7)* | 30.6(±2.6)* | 267.1(±13.2) |

FIG. 29E

| Transducer Element | Source data | Peak-peak amplitude (a.u.) | Axial resolution (mm) | SNR (dB) | Optimal phase (°) |
|---|---|---|---|---|---|
| B | P | 61.9(±12.8) | 5.9(±3.3) | 14.8(±2.7) | |
| | L | 61.9(±12.8) | 5.6(±3.2) | 14.3(±2.0) | |
| | P+L | 88.0(±22.3)* | 6.7(±3.5) | 13.7(±2.8) | |
| | P+L-rotated | 74.0(±14.0) | 2.4(±2.3)* | 19.0(±2.3)* | 270.3(±45.8) |
| C | P | 169.4(±17.0) | 0.7(±0.8) | 23.4(±2.0) | |
| | L | 98.8(±8.2) | 0.7(±0.8) | 22.8(±1.6) | |
| | P+L | 179.2(±15.4) | 1.5(±1.9) | 19.6(±1.9) | |
| | P+L-rotated | 227.5(±18.3)* | 0.5(±0.1) | 28.8(±1.7)* | 267.1(±16.7) |
| D | P | 107.1(±18.7) | 4.5(±3.1) | 18.3(±3.0) | |
| | L | 60.3(±12.8) | 5.3(±3.4) | 16.6(±2.9) | |
| | P+L | 139.9(±35.8)* | 5.9(±3.5) | 16.1(±3.2) | |
| | P+L-rotated | 110.4(±23.6) | 1.6(±1.9) | 22.6(±2.8)* | 270.0(±40.9) |

FIG. 29F

| PZT | Epoxy H20E |
|---|---|
| $\rho_{PZT} = 7950 \frac{kg}{m^3}$<br><br>Stiffness<br><br>$c^E = \begin{bmatrix} 12.3 & 7.4 & 8.5 & 0 & 0 & 0 \\ 0 & 12.3 & 8.5 & 0 & 0 & 0 \\ 0 & 0 & 12.0 & 0 & 0 & 0 \\ 0 & 0 & 0 & 2.23 & 0 & 0 \\ 0 & 0 & 0 & 0 & 2.23 & 0 \\ 0 & 0 & 0 & 0 & 0 & 2.45 \end{bmatrix} \times 10^{10} \frac{N}{m^2}$<br><br>Stress-electric field coefficient<br><br>$e = \begin{bmatrix} 0 & 0 & 0 & 0 & 16.0 \\ 0 & 0 & 0 & 16.0 & 0 \\ -8.33 & -8.33 & 25.0 & 0 & 0 \end{bmatrix} C/m^2$<br><br>Dielectric constant<br><br>$\varepsilon^S = \begin{bmatrix} 1300 & 0 & 0 \\ 0 & 1300 & 0 \\ 0 & 0 & 1250 \end{bmatrix}$ | $\rho_{epoxy} = 4400 \frac{kg}{m^3}$<br><br>Speed of sound<br><br>(L=longitudinal; S=shear)<br><br>$v_L = 2154 \frac{m}{s}$<br><br>$v_S = 1200 \frac{m}{s}$<br><br>Shear modulus<br><br>$G = v_S^2 \rho = 63.36 \times 10^{10} \frac{N}{m^2}$<br><br>Bulk modulus<br><br>$K = v_L^2 \rho - \frac{4}{3} G = 1.408 \times 10^{10} \frac{N}{m^2}$<br><br>Young modulus<br><br>$E = \frac{9KG}{3K + G} = 1.653 \times 10^{10} \frac{N}{m^2}$<br><br>Poisson's ratio<br><br>$v = \frac{3K - 2G}{2(3K + G)} = 0.304$ |

FIG. 31

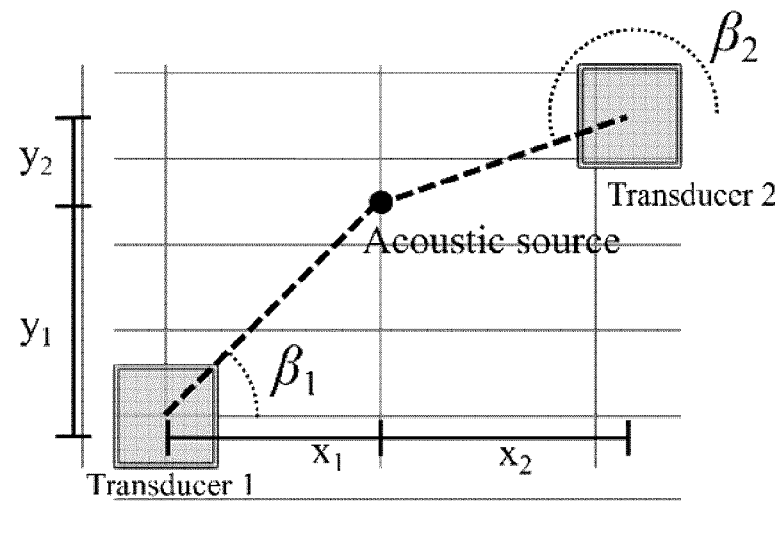
FIG. 34A
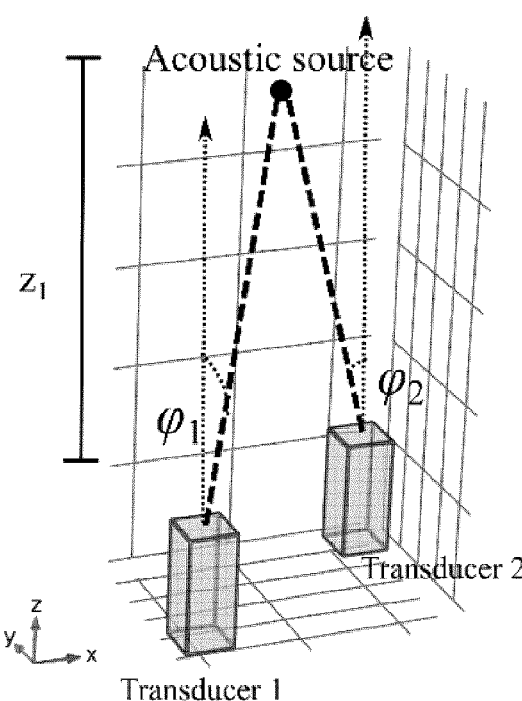
FIG. 34B

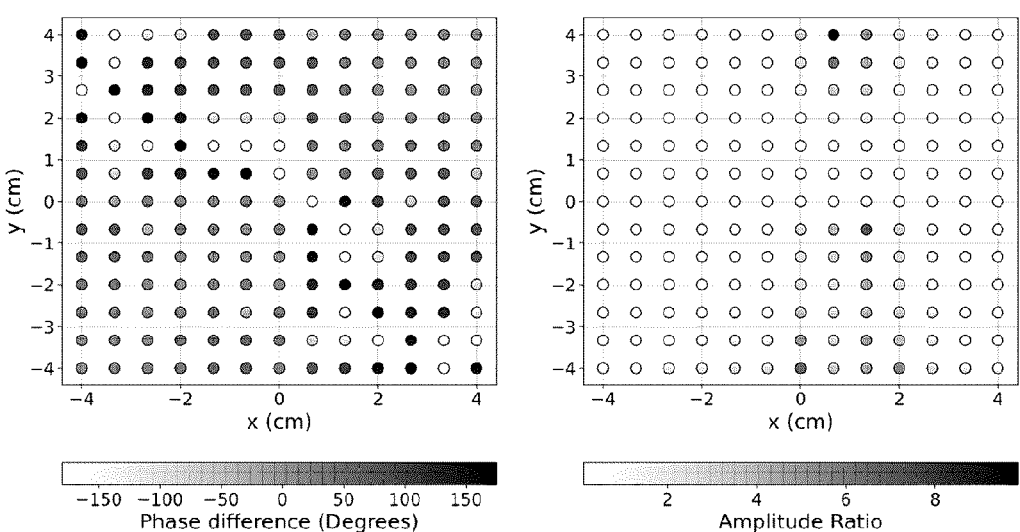
FIG. 40
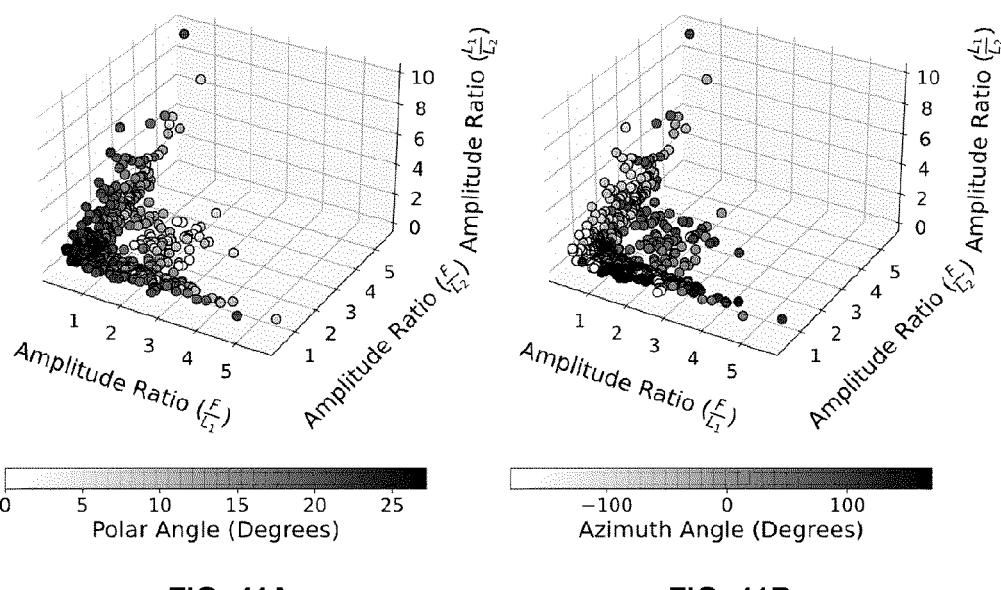
FIG. 41A                    FIG. 41B

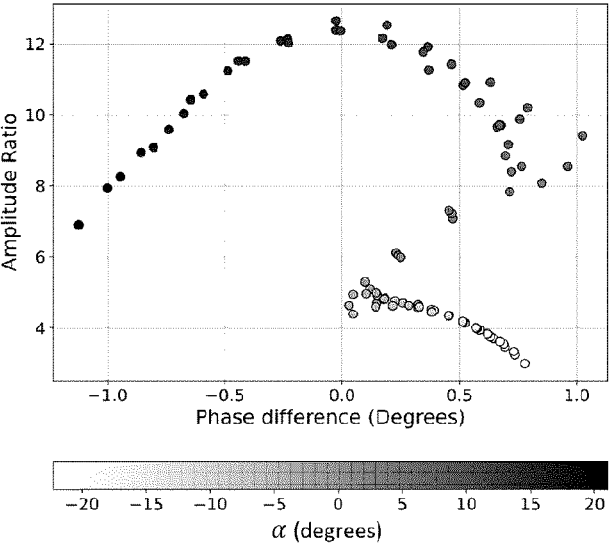
FIG. 42
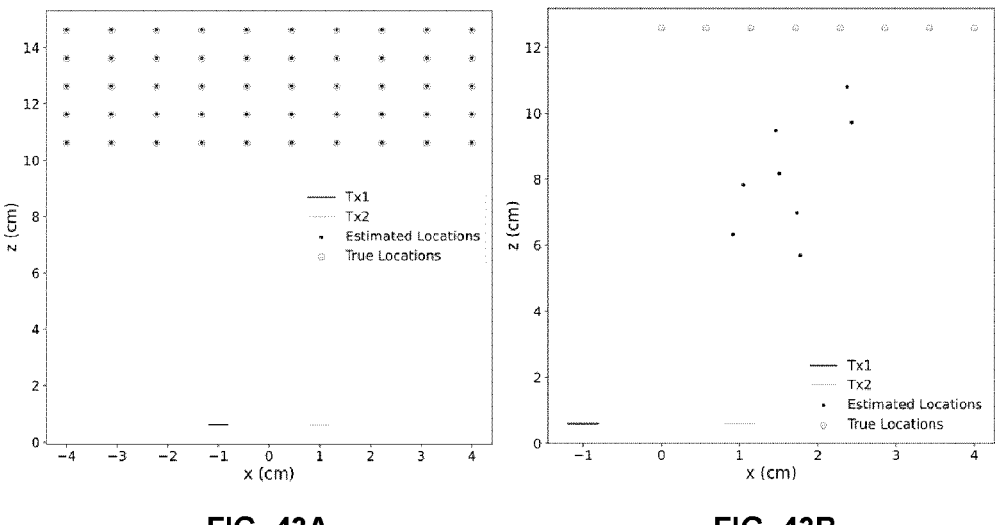
FIG. 43A                    FIG. 43B

1

SYSTEMS AND METHODS FOR OPERATION OF MULTIAXIAL ULTRASOUND TRANSDUCERS

CROSS-REFERENCE TO RELATED APPLICATION

This application is a National Phase application claiming the benefit of the international PCT Patent Application No. PCT/CA2022/050521, filed on Apr. 6, 2022, in English, which claims priority to U.S. Provisional Patent Application No. 63/171,998, titled "SYSTEMS AND METHODS FOR OPERATION OF MULTIAXIAL ULTRASOUND TRANSDUCERS" and filed on Apr. 7, 2021, the entire contents of which are incorporated herein by reference.

BACKGROUND

The present disclosure relates to ultrasound devices and ultrasound imaging.

Some ferroelectric materials exist as perovskite metal-oxide compound ceramics with a general chemical formula $ABO_3$, where A and B are different cations. These materials crystallize in a cubic structure shown in FIG. 1A above their Curie Temperature. As shown in FIG. 1A, the 'A' atom sits at cube corner positions (0, 0, 0), type 'B' atom sits at body centre position ($\frac{1}{2}$, $\frac{1}{2}$, $\frac{1}{2}$) and oxygen atoms sit at face-centered positions ($\frac{1}{2}$, $\frac{1}{2}$, 0).

As noted above, such centrosymmetric (cubic) structures exist only at high temperatures (above Curie temperature). At temperatures below the Curie temperature, the structure transforms into a tetragonal form, as shown in FIG. 1B. The distinct feature of the tetragonal structure is the presence of a non-zero polarization due to a shift of atom "B" from its centrosymmetric position.

The tetragonal phase also exhibits pyroelectric and ferroelectric properties, such that the crystal domains possess a spontaneous polarization in the absence of an external electric field. In ferroelectrics, the polarization direction can be reversed under the application of a sufficiently large external electric field. Such piezoelectric crystals change their macroscopic dimensions in response to an external electric field. This is the property that is utilized in ultrasound transducers and generators, and other devices. In particular, lead-based perovskites $PbZr_xT_{1-x}O_3$ (PZT) have emerged as one of the most widely studied and technologically important class of ferroelectric oxides. This alloy exhibits an enhancement of electromechanical response near to the morphotropic phase boundary (MPB) at x≈0.4-0.5 that exceeds by far the properties of individual constituents $PbZrO_3$ and $PbTiO_3$. The enhancement of the piezoelectric response near MPB is attributed to "flattening" of an energy surface that facilitates inversion of the spontaneous polarization.

FIG. 2A shows a typical piezoelectric element 100, consisting of a ferroelectric piezoelectric material sandwiched between two contacts 105 and 110, as shown in FIGS. 2A and 2B. When an alternating potential is applied to the contacts, the crystal undergoes expansion/contraction cycles, due to the electric field 120.

During the cycle, the central atom switches its position, as shown in FIG. 3, which results in a polarization inversion. For the switching process to occur, the electric field (or bias voltage) must exceed its critical (coercive) magnitude, which is a material-specific property. The coercive field $E_c$, is the electric field at which the polarization inversion occurs, as shown in the figure.

The notable feature of the polarization vs. applied electric field (or bias voltage) plot is the existence of a hysteresis loop (see FIG. 3). The area of this loop determines parasitic losses in the ferroelectric crystal, which are responsible for incomplete conversion of the electrical power into useful mechanical signal. The unused electrical energy can partly transform into heat, similar to the dielectric heating in a microwave oven. Heating of the piezoelectric element is an unwanted effect and requires special care for its dissipation. In practical applications, this limits the functionality of certain devices by causing the element to overheat. Therefore, a reduction of the coercive electric field (or bias voltage) is important for improvement in the efficiency of piezoelectric actuators and reduction of the electrical power required to drive the transducer.

It was previously believed that for ferroelectric perovskite oxide elements, the transition between two states with opposite polarization (see FIG. 3) occurs by moving the central atom along the straight line connecting its positions in the top and bottom configuration. This polarization inversion was thus originally viewed as a structural transformation with an intermediate transition via the centrosymmetric (cubic) structure with zero polarization. This transition typically features a double-well potential energy profile as shown in FIG. 4. This process corresponds to a 180° flip of polarization and requires overcoming of a large energy barrier (the particular magnitude of which is material-specific), since the centrosymmetric structure is unfavorable below the Curie temperature. The transformation between two structures manifests in the appearance of the hysteresis loop shown in FIG. 3.

FIG. 5 illustrates the two-dimensional potential energy profile for a $PbTiO_3$ ceramic, which is the basis for PZT—one of the most technologically relevant piezoelectric materials (these results were obtained using Wien2k density functional software package in conjunction with BerryPI package for polarization calculations). On this plot, there are four local energy minima that correspond to the tetragonal structure marked as (T). The most unfavorable (high energy) transition state for switching is located at the center of the contour plot, which corresponds to the cubic structure (C-point). According to the previous conventional understanding of this phenomenon, the common approach for driving ferroelectric devices, such as ultrasound generators, forces the central atom to transition directly through the cubic structure and therefore through the highest energy, most unfavorable point.

In International Patent Application No. PCT/CA2014/051113, titled "Methods of Driving Polarization Inversion in Ferroelectric Materials and Devices", filed on Nov. 21, 2014, which is incorporated herein by reference in its entirety, Rubel et al. recognized that the energy diagram shown in FIG. 5 illustrates strong anisotropy in the coercive field, and that this anisotropy can be employed to produce polarization inversion with a reduced applied coercive voltage or bias. In particular, it was disclosed that the aforementioned uniaxial method of driving the central ion through the central maxima of the anisotropic potential energy surface represents only one of a multitude of possible transition paths, and this path is not an energetically favorable path. This was clearly shown in FIG. 6, which shows both the uniaxial path (shown by the long-dashed line), and also an alternative, lower energy path (shown by the short-dashed line) that involves the application of a reduced coercive field (and associated applied bias).

Rubel et al. described how the anisotropy in the potential energy surface can be employed to produce methods of driving (e.g. electrically exciting, generating, producing) polarization inversion (e.g. switching) in a ferroelectric material (e.g. crystal, device, or element) with a reduced coercive field relative to uniaxial excitation, where the ferroelectric material possess an anisotropic potential energy surface having an energy barrier for a curved switching path that is lower than for the barrier for a direct path associated with uniaxial switching. Rubel et al. explained how polarization inversion with reduced coercivity could be obtained via the application of an electric field that exhibits a time-dependent orientation, in contrast with conventional uniaxial electrical excitation, thereby causing the central ion (and the crystal structure as a whole) to evolve along a lower-energy path such as the path shown in FIG. 6, in which the central ion is driven such that it avoids the potential energy maximum.

Rubel et al. described embodiment involving the application of non-parallel time-dependent voltages (e.g. bias, potential) such that the direction of the electric field changes with during the switching cycle. One example implementation for achieving such a time-dependent reorientation of the electric field during a switching cycle was illustrated by Rubel et al. in FIGS. 7A and 7B. FIG. 7A shows ferroelectric element consisting of the ferroelectric material 200 and two pairs of electrodes 205-220, where the pairs of electrodes are shown positioned orthogonally. Control circuitry 250 is employed to generate and provide output voltages $V_X$ and $V_Y$. FIG. 7B shows an example time-dependent voltage profile for the voltage sources, which produces a rotating electric field 230 within element 200. Rubel et al. described how the control circuitry 250 could be employed to control the amplitude, phase and/or frequency of the voltage outputs in order to effect polarization inversion with a reduced coercive field.

SUMMARY

Systems and methods are disclosed for performing ultrasound imaging using biphasic driving and/or reception for ferroelectric ultrasound elements having propagation and lateral electrode pairs. Electrode pairs are driven using biphasic drive signals, where the drive signals applied to the respective pairs of electrodes are provided with a phase difference therebetween, and where a time delay may be added between the drive signals to further increase the power of the emitted ultrasound. In some example embodiments, passive determination of the direction and/or location of an acoustic source relative to a multiaxial ultrasound transducer is determined based on the voltages detected at the propagation electrodes and the lateral electrodes the multiaxial transducer, according to a pre-determined relationship between the electrode voltages and one or more directional angles. A plurality of multiaxial ultrasound transducers may be employed to improve the accuracy of the estimated direction and/or location of the acoustic source.

Accordingly, in a first aspect, there is provided a method of performing ultrasound imaging using an ultrasound array, the ultrasound array comprising an array of ultrasound elements, each ultrasound element comprising a ferroelectric material, propagation electrodes disposed on a first pair of opposing surfaces of the ferroelectric material, and lateral electrodes disposed on a second pair of opposing surfaces of the ferroelectric material, each pair of propagation electrodes defining a propagation direction, the method comprising:

applying a respective pair of biphasic driving signals to each ultrasound element of a first set of ultrasound elements to emit ultrasound energy therefrom, such that the biphasic driving signals respectively applied to each ultrasound element of the first set of ultrasound elements comprise:

a first drive signal that is applied to the propagation electrodes; and a second drive signal that is applied to the lateral electrodes, wherein the first drive signal and the second drive signal are applied with a phase difference therebetween to generate a rotating electric field within the ferroelectric material;

receiving, respectively, from each ultrasound element of a second set of ultrasound elements, a first receive signal from the propagation electrodes and a second receive signal from the lateral electrodes;

combining the first receive signals with the second receive signals to generate, for each ultrasound element of the second set of ultrasound elements, a respective composite receive signal; and processing composite receive signals to generate at least a portion of an ultrasound image.

In some example implementations of the method, the phase difference is a first phase difference, and wherein the composite receive signal is generated, for each ultrasound element of the second set of ultrasound elements, by combining the first receive signal and the second receive signal with a second phase difference therebetween.

The second phase difference may be applied in the frequency domain. The second phase difference may be applied by: applying a fast Fourier transform to one of the first receive signal and the second receive signal to obtain a transformed receive signal; applying the second phase difference to the transformed receive signal, thereby obtaining a phase-shifted transformed receive signal; and applying an inverse fast Fourier transform to the phase-shifted transformed receive signal. The second phase difference may be determined and applied by: applying a fast Fourier transform to one of the first receive signal and the second receive signal to obtain a transformed receive signal; generating a plurality of transformed receive signals; applying a different test phase difference to each transformed receive signal, thereby obtaining a set of phase-shifted transformed receive signals; applying an inverse fast Fourier transform to each phase-shifted transformed receive signal; and selecting, as the second phase difference, the test phase difference that provides an optimal imaging metric.

In some example implementations of the method, the phase difference is approximately equal to the second phase difference. The phase difference may be between 10 and 350 degrees. The phase difference may be between 220 and 300 degrees. The phase difference may be between 150 and 350 degrees. The second phase difference may be between 10 and 350 degrees. The second phase difference may be between 220 and 300 degrees. The second phase difference may be between 150 and 350 degrees.

In some example implementations of the method, one or both of the first phase difference and the second phase difference are selected to lie within 45 degrees of an optimal phase associated with maximum ultrasound output.

In some example implementations of the method, for each ultrasound element of the first set of ultrasound elements, the first drive signal and the second drive signal are applied with a transmit delay therebetween; wherein the transmit delay is sufficiently small to permit temporal overlap between at least a portion of the first drive signal and the second drive signal. For at least one ultrasound element of the first set of ultrasound elements, the transmit delay may be selected to increase the ultrasound energy relative to an amount of ultrasound energy that is emitted in the absence of delay between the first drive signal and the second drive signal.

The first drive signal and the second drive signal may be periodic time dependent signals having a common period associated therewith, and wherein the first drive signal and the second drive signal each have a respective time duration that is greater than one period, and wherein the time delay is greater than one period.

The transmit delay may be between 0.5 and 3 periods. The transmit delay may be between 2.25 and 2.75 periods. The transmit delay may differ among at least two ultrasound elements. The different transmit delay values may amount to at least two ultrasound elements are selected to harmonize one or more properties of the ultrasound array. The one or more properties may include signal to noise ratio and axial resolution. The different transmit delay values may amount the at least two ultrasound elements are selected to maximize one or more properties of the ultrasound array. The one or more properties may include signal to noise ratio and axial resolution.

In some example implementations of the method, for each ultrasound element of the second set of ultrasound elements, the composite receive signal is generated by combining the first receive signal and the second receive signal with a receive delay therebetween; wherein the receive delay is less than a time duration of the first drive signal, and less than a time duration of the second drive signal. The receive delay may be selected to increase the ultrasound energy relative to an amount of ultrasound energy that would be emitted in the absence of drive signal delay between the first drive signal and the second drive signal. The receive delay may vary among at least two ultrasound elements. The different receive delay values may amount to at least two ultrasound elements are selected to harmonize one or more properties of the ultrasound array.

The different receive delay values may amount to at least two ultrasound elements are selected to maximize one or more properties of the ultrasound array.

In some example implementations of the method, for each ultrasound element of the first set of ultrasound elements, the first drive signal and the second drive signal are applied with a transmit delay therebetween;
wherein the transmit delay is less than a time duration of the first drive signal, and less than a time duration of the second drive signal; and
wherein, for each ultrasound element of the second set of ultrasound elements, the composite receive signal is generated by combining the first receive signal and the second receive signal with a receive delay therebetween;
wherein the receive delay is less than the time duration of the first drive signal, and less than the time duration of the second drive signal.

In some example implementations of the method, the ferroelectric material is a ferroelectric perovskite oxide material.

In some example implementations of the method, the lateral electrodes are orthogonal to the propagation electrodes.

In some example implementations of the method, the first set of ultrasound elements is the same as the second set of ultrasound elements.

In some example implementations of the method, at least one set of the first set of ultrasound elements and the second set of ultrasound elements include all elements of the ultrasound array.

In another aspect, there is provided a method of transmitting ultrasound from an ultrasound transducer, the ultrasound transducer comprising a ferroelectric material, propagation electrodes disposed on a first pair of opposing surfaces of the ferroelectric material, and lateral electrodes disposed on a second pair of opposing surfaces of the ferroelectric material, the propagation electrodes defining a propagation direction, the method comprising:
applying biphasic driving signals to the ultrasound transducer to emit ultrasound energy therefrom, the biphasic driving signals comprising a first drive signal that is applied to the propagation electrodes, and a second drive signal that is applied to the lateral electrodes, wherein the first drive signal and the second drive signal are applied with a phase difference therebetween to generate a rotating electric field within the ferroelectric material;
wherein the first drive signal and the second drive signal are applied with a time delay therebetween;
wherein the time delay is less than a time duration of the first drive signal, and less than a time duration of the second drive signal.

In some example implementations of the method, the time delay is selected to increase the ultrasound energy relative to an amount of ultrasound energy that would be emitted in the absence of delay between the first drive signal and the second drive signal.

In some example implementations of the method, the first drive signal and the second drive signal are periodic time dependent signals having a common period associated therewith, and wherein the first drive signal and the second drive signal each have a respective time duration that is greater than one period, and wherein the time delay is greater than one period. The time delay may be between 0.5 and 3 periods. The time delay may be between 2.25 and 2.75 periods.

In some example implementations of the method, the ultrasound transducer is an element of an ultrasound array.

In another aspect, there is provided an ultrasound imaging system comprising:
an array of ultrasound elements, each ultrasound element comprising:
a ferroelectric material;
propagation electrodes disposed on a first pair of opposing surfaces of the ferroelectric material; and
lateral electrodes disposed on a second pair of opposing surfaces of the ferroelectric material,
wherein each pair of propagation electrodes defines a propagation direction; and
control and processing circuitry operably connected to the array of ultrasound elements, the control and processing circuitry comprising a processor and a memory, wherein the processor is configured to execute instructions stored in the memory for performing the steps of:
applying a respective pair of biphasic driving signals to each ultrasound element of a first set of ultrasound elements to emit ultrasound energy therefrom, such that the biphasic driving signals respectively applied to each ultrasound element of the first set of ultrasound elements comprise:
a first drive signal that is applied to the propagation electrodes; and
a second drive signal that is applied to the lateral electrodes, wherein the first drive signal and the second drive signal are applied with a phase difference therebetween to generate a rotating electric field within the ferroelectric material;

receiving, respectively, from each ultrasound element of a second set of ultrasound elements, a first receive signal from the propagation electrodes and a second receive signal from the lateral electrodes;

combining the first receive signals with the second receive signals to generate, for each ultrasound element of the second set of ultrasound elements, a respective composite receive signal; and processing composite receive signals to generate at least a portion of an ultrasound image.

In some example implementations of the system, the phase difference is a first phase difference, and wherein the control and processing circuitry is configured such that the composite receive signal is generated, for each ultrasound element of the second set of ultrasound elements, by combining the first receive signal and the second receive signal with a second phase difference therebetween.

In some example implementations of the system, the control and processing circuitry is configured such that the second phase difference is applied in the frequency domain.

In some example implementations of the system, the control and processing circuitry is configured such that the second phase difference is applied by:

applying a fast Fourier transform to one of the first receive signal and the second receive signal to obtain a transformed receive signal;

applying the second phase difference to the transformed receive signal, thereby obtaining a phase-shifted transformed receive signal; and applying an inverse fast Fourier transform to the phase-shifted transformed receive signal.

In some example implementations of the system, the control and processing circuitry is configured such that the second phase difference is determined and applied by:

applying a fast Fourier transform to one of the first receive signal and the second receive signal to obtain a transformed receive signal;

generating a plurality of transformed receive signals;

applying a different test phase difference to each transformed receive signal, thereby obtaining a set of phase-shifted transformed receive signals; and applying an inverse fast Fourier transform to each phase-shifted transformed receive signal; and selecting, as the second phase difference, the test phase difference that provides an optimal imaging metric.

The control and processing circuitry may be configured such that the phase difference is approximately equal to the second phase difference. The control and processing circuitry may be configured such that the phase difference is between 10 and 350 degrees. The control and processing circuitry may be configured such that the phase difference is between 220 and 300 degrees. The control and processing circuitry may be configured such that the phase difference is between 150 and 350 degrees. The control and processing circuitry may be configured such that the second phase difference is between 10 and 350 degrees. The control and processing circuitry may be configured such that the second phase difference is between 220 and 300 degrees. The control and processing circuitry may be configured such that the second phase difference is between 150 and 350 degrees. The control and processing circuitry may be configured such that one or both of the first phase difference and the second phase difference are selected to lie within 45 degrees of an optimal phase associated with maximum ultrasound output.

In some example implementations of the system, the control and processing circuitry is configured such that, for each ultrasound element of the first set of ultrasound elements, the first drive signal and the second drive signal are applied with a transmit delay therebetween; wherein the transmit delay is sufficiently small to permit temporal overlap between at least a portion of the first drive signal and the second drive signal.

The control and processing circuitry may be configured such that, for at least one ultrasound element of the first set of ultrasound elements, the transmit delay is selected to increase the ultrasound energy relative to an amount of ultrasound energy that is emitted in the absence of delay between the first drive signal and the second drive signal. The control and processing circuitry may be configured such that the first drive signal and the second drive signal are periodic time dependent signals having a common period associated therewith, and wherein the first drive signal and the second drive signal each have a respective time duration that is greater than one period, and wherein the time delay is greater than one period.

The control and processing circuitry may be configured such that the transmit delay is between 0.5 and 3 periods. The control and processing circuitry may be configured such that the transmit delay is between 2.25 and 2.75 periods.

The control and processing circuitry may be configured such that the transmit delay differs among at least two ultrasound elements. The control and processing circuitry may be configured such that the different transmit delay values amount the at least two ultrasound elements are selected to harmonize one or more properties of the ultrasound array. The control and processing circuitry may be configured such that the one or more properties include signal to noise ratio and axial resolution. The control and processing circuitry may be configured such that the different transmit delay values amount the at least two ultrasound elements are selected to maximize one or more properties of the ultrasound array. The control and processing circuitry may be configured such that the one or more properties include signal to noise ratio and axial resolution.

The control and processing circuitry may be configured such that, for each ultrasound element of the second set of ultrasound elements, the composite receive signal is generated by combining the first receive signal and the second receive signal with a receive delay therebetween; wherein the receive delay is less than a time duration of the first drive signal, and less than a time duration of the second drive signal. The control and processing circuitry may be configured such that the receive delay is selected to increase the ultrasound energy relative to an amount of ultrasound energy that would be emitted in the absence of drive signal delay between the first drive signal and the second drive signal. The control and processing circuitry may be configured such that the receive delay varies among at least two ultrasound elements. The control and processing circuitry may be configured such that the different receive delay values amount the at least two ultrasound elements are selected to harmonize one or more properties of the ultrasound array. The control and processing circuitry may be configured such that the different receive delay values amount the at least two ultrasound elements are selected to maximize one or more properties of the ultrasound array.

In some example implementations of the system, the control and processing circuitry is configured such that, for each ultrasound element of the first set of ultrasound elements, the first drive signal and the second drive signal are applied with a transmit delay therebetween;

wherein the transmit delay is less than a time duration of the first drive signal, and less than a time duration of the second drive signal; and wherein, for each ultrasound element of the second set of ultrasound elements, the composite receive signal is generated by combining the first receive signal and the second receive signal with a receive delay therebetween;

wherein the receive delay is less than the time duration of the first drive signal, and less than the time duration of the second drive signal.

In some example implementations of the system, the ferroelectric material is a ferroelectric perovskite oxide material.

In some example implementations of the system, the lateral electrodes are orthogonal to the propagation electrodes.

In some example implementations of the system, the first set of ultrasound elements is the same as the second set of ultrasound elements.

In some example implementations of the system, the control and processing circuitry is configured such that at least one set of the first set of ultrasound elements and the second set of ultrasound elements include all elements of the ultrasound array.

In another aspect, there is provided an ultrasound imaging system comprising:

an ultrasound transducer comprising:

a ferroelectric material;

propagation electrodes disposed on a first pair of opposing surfaces of the ferroelectric material;

lateral electrodes disposed on a second pair of opposing surfaces of the ferroelectric material;

wherein the propagation electrodes define a propagation direction; and control and processing circuitry operably connected to the ultrasound transducer, the control and processing circuitry comprising a processor and a memory, wherein the processor is configured to execute instructions stored in the memory for performing the steps of:

applying biphasic driving signals to the ultrasound transducer to emit ultrasound energy therefrom, the biphasic driving signals comprising a first drive signal that is applied to the propagation electrodes, and a second drive signal that is applied to the lateral electrodes, wherein the first drive signal and the second drive signal are applied with a phase difference therebetween to generate a rotating electric field within the ferroelectric material;

wherein the first drive signal and the second drive signal are applied with a time delay therebetween;

wherein the time delay is less than a time duration of the first drive signal, and less than a time duration of the second drive signal.

The time delay may be selected to increase the ultrasound energy relative to an amount of ultrasound energy that would be emitted in the absence of delay between the first drive signal and the second drive signal.

In another aspect, there is provided a method of obtaining spatial information pertaining to an acoustic source via processing of signals from a multiaxial ultrasound transducer, the method comprising:

employing the multiaxial ultrasound transducer to detect acoustic signals from the acoustic source, the multiaxial ultrasound transducer comprising a ferroelectric acoustically active material, a pair of propagation electrodes and a pair of lateral electrodes, wherein the propagation electrodes are orthogonal to the lateral electrodes, thereby obtaining first signals from the propagation electrodes and second signals from the lateral electrodes; and employing a pre-established relationship relating a source direction to the first signals and the second signals to determine a direction of the acoustic source.

In some example implementations of the method, the acoustic source is a first acoustic source and the direction is a first direction, and wherein the source direction associated with the acoustic source is determined by processing the first signals and the second signals, according to the pre-established relationship, within a first time window, the method further comprising:

processing the first signals and the second signals, according to the pre-established relationship, within a second time window, to determine a second direction associated with a second acoustic source.

In some example implementations of the method, the multiaxial ultrasound transducer is a biaxial ultrasound transducer and wherein the direction lies in a biaxial plane that includes the propagation electrodes and the lateral electrodes. The acoustic source may reside within the biaxial plane. The acoustic source may reside beyond the biaxial plane, and wherein the direction of the acoustic source, as determined based on the processing of the first signals and the second signals, is a cylindrical angle associated with a projection, onto the biaxial plane, of a spatial vector extending between the multiaxial ultrasound transducer and the acoustic source.

In some example implementations of the method, the multiaxial ultrasound transducer is a triaxial ultrasound transducer and wherein the direction is a three-dimensional direction.

In some example implementations of the method, the multiaxial ultrasound transducer is a first multiaxial ultrasound transducer and the direction is a first direction, the method further comprising:

employing at least one additional multiaxial ultrasound transducer to determine at least one additional direction associated with the acoustic source, and processing the first direction and the at least one additional direction to locate the acoustic source.

The first multiaxial ultrasound transducer and the at least one additional multiaxial ultrasound transducer may be elements of an ultrasound array.

In some example implementations of the method, the acoustic source is an acoustic scatterer.

In some example implementations of the method, the acoustic source is an active acoustic source that generates ultrasound energy. The active acoustic source may be, for example, a bubble, a group of bubbles in close spatial proximity, or a secondary ultrasound device.

In some example implementations of the method, the multiaxial ultrasound transducer is an element of an ultrasound array, the method further comprising:

processing the direction and time-of-flight beamformed signals from the ultrasound array to locate the acoustic source.

The multiaxial ultrasound transducer may be a first multiaxial ultrasound transducer and the direction is a first direction, and wherein the ultrasound array comprises at least one additional multiaxial transducer, the method further comprising: employing at least one additional multiaxial ultrasound transducer to determine at least one additional direction associated with the acoustic source; and processing the first direction, the at least one additional direction, and time-of-flight beamformed signals from the ultrasound array to determine a location of the acoustic source. The acoustic source may be an acoustic scatterer and wherein the ultrasound array is employed to transmit incident ultrasound energy that is scattered by the acoustic scatterer.

In some example implementations of the method, the multiaxial ultrasound transducer is an element of an ultrasound array, wherein the acoustic source is an acoustic scatterer, the method further comprising:

controlling the ultrasound array to transmit incident ultrasound energy that is scattered by the acoustic scatterer;

comparing the direction of the acoustic source to image data obtained by beamforming signals received by the ultrasound array to identify an image artifact in the image data, the image artifact having a location that does not lie along the direction; and removing the image artifact from the image data.

In some example implementations of the method, the multiaxial ultrasound transducer is a first multiaxial ultrasound transducer, the direction is a first direction, the multiaxial ultrasound transducer is an element of an ultrasound array, and wherein the acoustic source is an acoustic scatterer, the method further comprising:

controlling the ultrasound array to transmit incident ultrasound energy that is scattered by the acoustic scatterer;

employing at least one additional multiaxial ultrasound transducer to determine at least one additional direction associated with the acoustic source; and processing the first direction and the at least one additional direction to determine an initial location of the acoustic source;

comparing the initial location of the acoustic source to image data obtained by beamforming signals received by the ultrasound array to identify an image artifact in the image data, the image artifact having an image location that does not overlap with the initial location; and removing the image artifact from the image data.

The acoustic source may be an active acoustic source that generates ultrasound energy, and wherein processing the direction and the time-of-flight beamformed signals comprises:

employing the direction to determine an image line for time-of-flight beamforming of signals received by the ultrasound array;

performing receive time-of-flight beamforming of signals received by the ultrasound array along the image line, thereby obtaining beamformed signals; and employing the beamformed signals to locate the acoustic source.

The acoustic source may be an active acoustic source that generates ultrasound energy, and wherein processing the first direction, the at least one additional direction, and time-of-flight beamformed signals may comprise:

employing the first direction and the at least one additional direction to determine an initial estimate of the location of the acoustic source;

performing receive time-of-flight beamforming of signals received by the ultrasound array along an image line that includes the initial estimate of the location of the acoustic source, thereby obtaining beamformed signals; and employing the beamformed signals to obtain a second estimate of the location of the acoustic source.

In another aspect, there is provided an ultrasound imaging system comprising:

a multiaxial ultrasound transducer comprising:
  a ferroelectric acoustically active material;
  a pair of propagation electrodes; and
  a pair of lateral electrodes, wherein said propagation electrodes are orthogonal to said lateral electrodes; and control and processing circuitry operably connected to said multiaxial ultrasound transducer, said control and processing circuitry comprising at least one processor and associated memory, wherein said at least one processor is configured to execute instructions stored in said memory for performing operations comprising:
  employing said multiaxial ultrasound transducer to detect acoustic signals from an acoustic source, thereby obtaining first signals from said propagation electrodes and second signals from said lateral electrodes; and
  employing a pre-established relationship relating a source direction to the first signals and the second signals to determine a direction of the acoustic source.

A further understanding of the functional and advantageous aspects of the disclosure can be realized by reference to the following detailed description and drawings.

BRIEF DESCRIPTION OF THE DRAWINGS

Embodiments will now be described, by way of example only, with reference to the drawings, in which:

FIG. 7A shows the electrode configuration and the resulting rotating internal electric field, while FIG. 7B shows the phase difference between the two applied voltages.

FIG. 10A is a flow chart illustrating an example method of performing imaging using biphasic driving of ultrasound elements.

FIG. 10B is a flow chart illustrating an example method of performing imaging using biphasic driving and biphasic receiving.

FIG. 10D is a flow chart illustrating an example method of determining a suitable phase difference to apply to one of the receive signals.

FIG. 10E is a flow chart illustrating an example method of performing imaging using biphasic driving, and where a time delay is applied between the signals provided to the propagation and lateral electrodes.

FIG. 10F is a flow chart illustrating an example method of performing imaging using biphasic driving and biphasic receiving, and where a time delay is applied between the signals provided to the propagation and lateral electrodes.

FIG. 11A shows an example 4-element imaging transducer with final casing.

FIG. 11B shows the transducer interfaced with a connector.

The nylon wire is clearly observable at 2 cm and noisy pulses appear at different locations in the images.

Figure 22:
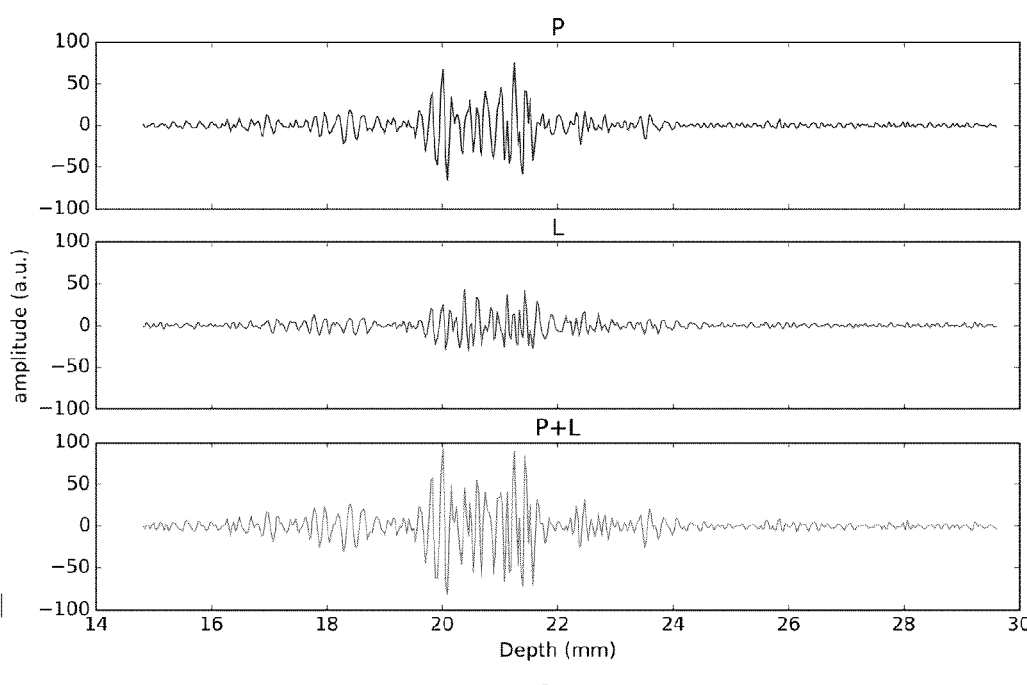

FIG. 22 plots examples of the RF-echo signals received on P- and L-electrodes, and their sum.

Figure 23:
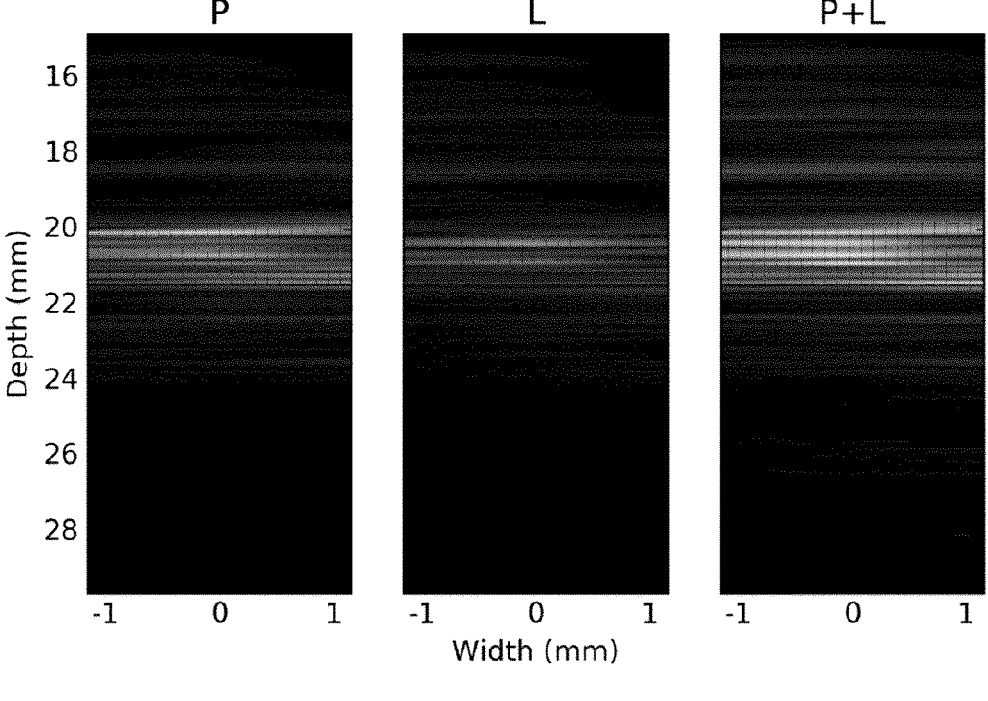

FIG. 23 shows examples of reconstructed B-mode images using P, L and P+L RF echo data. Images were scaled equally to ensure correct interpretation of intensity.

Figures 24, 25:
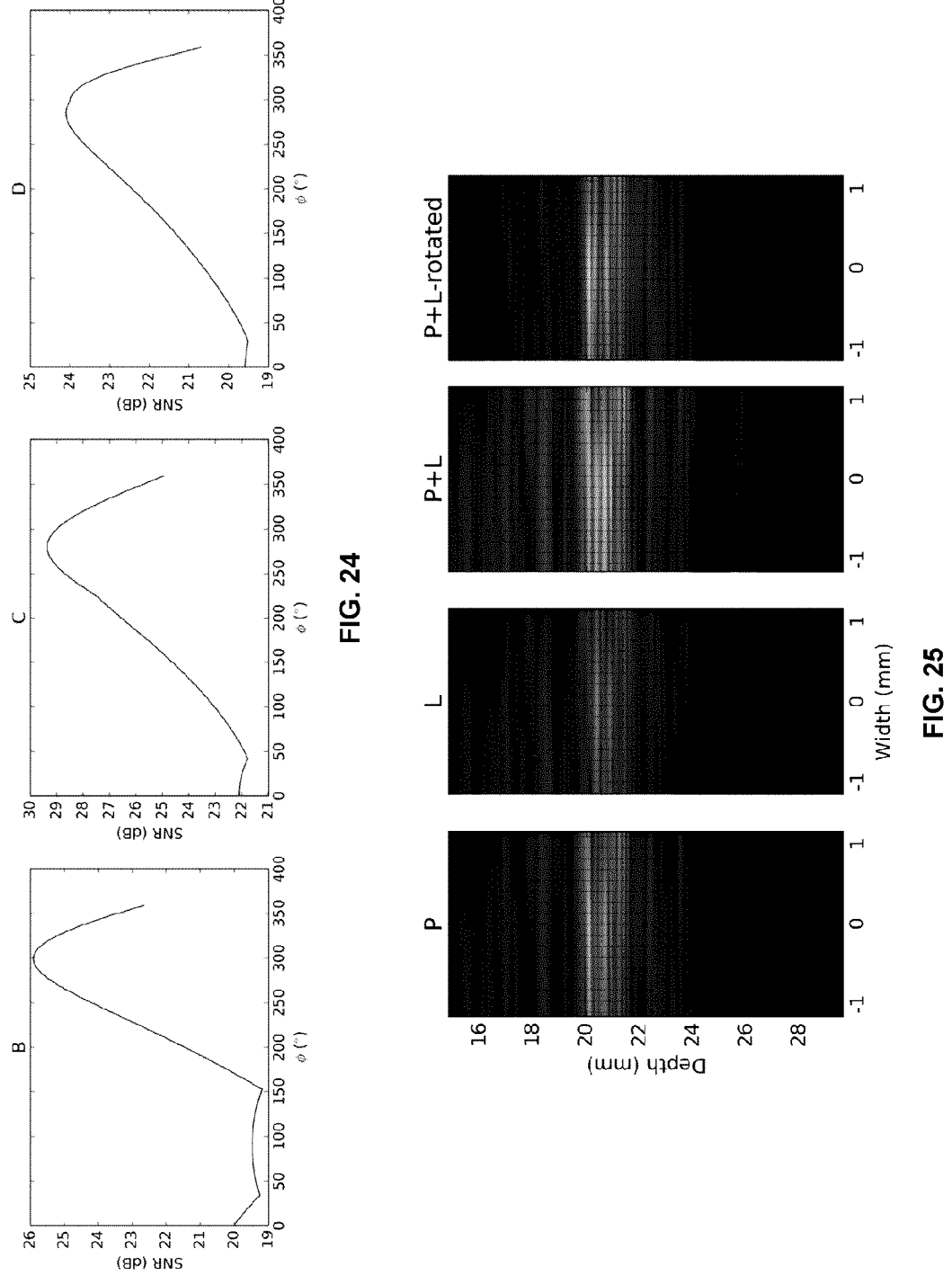

FIG. 24 plots examples of SNR of the P+L-rotated signal as a function of the applied phase $\phi$ (°) for each of electrodes B, C and D.

FIG. 25 shows examples of reconstructed B-mode images using P, L, P+L and P+L-rotated RF echo data. Images were scaled equally to ensure correct interpretation of intensity.

Figure 26:
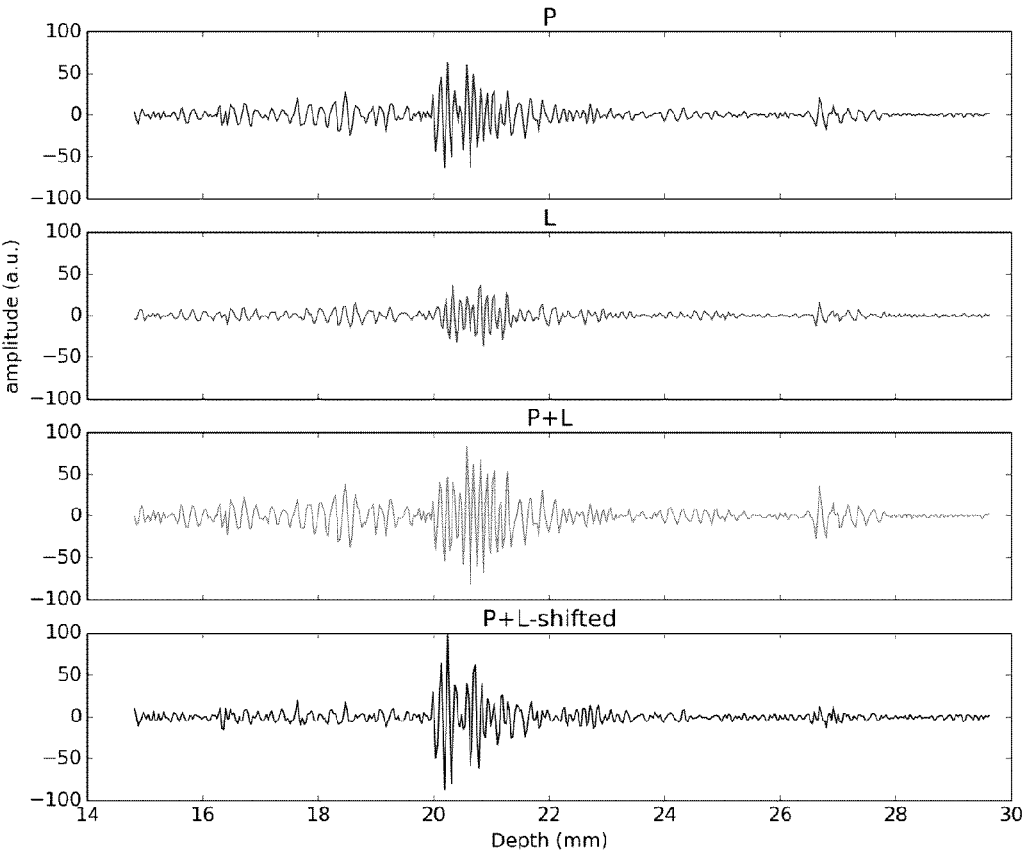

FIG. 26 shows example of RF-echo signals on P- and L-electrodes, P+L, P+L-rotated using a delay of 2 T.

Figure 27:
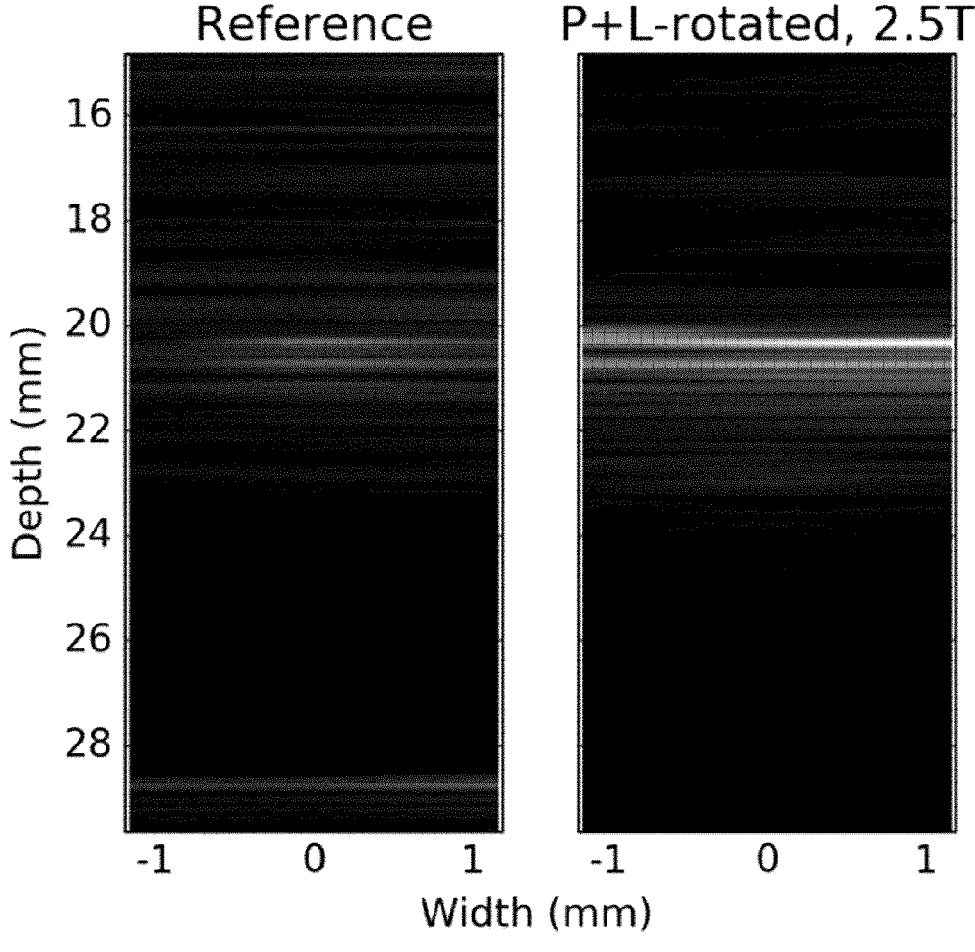

FIG. 27 shows (left) the reconstructed B-mode reference image and (right) the reconstructed image using a delay of 2.5 T and P+L-rotated RF echo data. Images were scaled equally to ensure correct interpretation of intensity.

Figure 28:
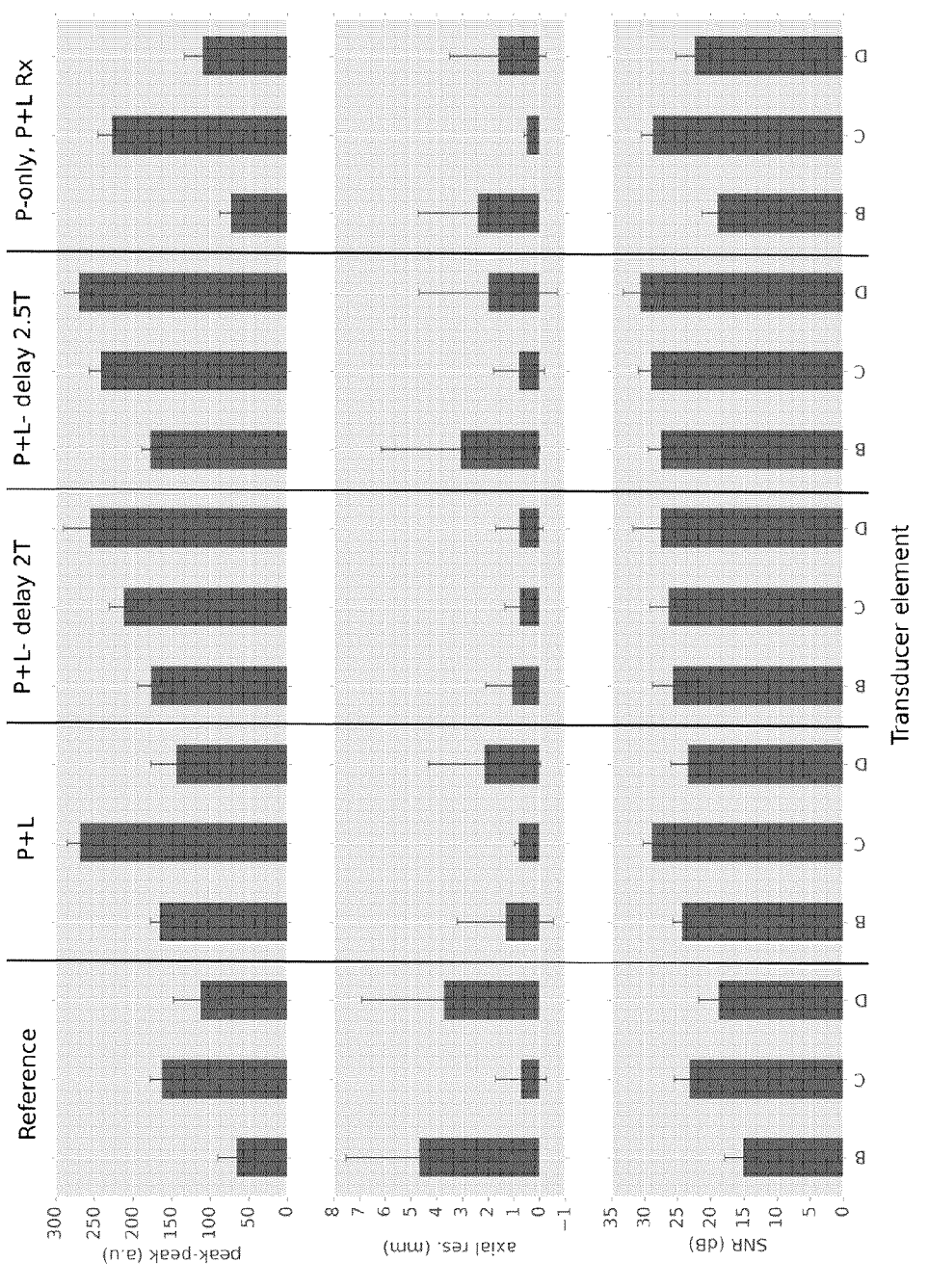

FIG. 28 is a set of plots providing a summary of results, comparing several scenarios of the P+L biphasic method in transmission and the P+L-rotated method in reception.

FIG. 29A is a table of imaging metrics for each transducer element for all measurements using only the P-electrodes for driving and reception.

FIG. 29B is a table of imaging metrics for each transducer element for all measurements using the P-, L- and P+L signals when driving the transducer with the P+L mode. Best metrics are highlighted by bold*.

FIG. 29C is a table of imaging metrics for each transducer element for all measurements using the P+L-rotated signal. Best metrics compared to Table 2 are highlighted by bold*.

FIG. 29D is a table of imaging metrics for each transducer element for all measurements using the P-, L-, P+L, P+L-rotated signals when driving the transducer with the P+L mode with a delay of 2 periods applied on L-electrodes. Best metrics are highlighted by bold*.

FIG. 29E is a table of imaging metrics for each transducer element for all measurements using the P-, L-, P+L, P+L-rotated signals when driving the transducer with the P+L mode with a delay of 2.5 periods applied on L-electrodes. Best metrics are highlighted by bold*.

FIG. 29F is a table of imaging metrics for each transducer element for all measurements using the P-, L-, P+L, P+L-rotated signals when driving the transducer with the P-only mode. Best metrics are highlighted by bold*.

Figure 30:
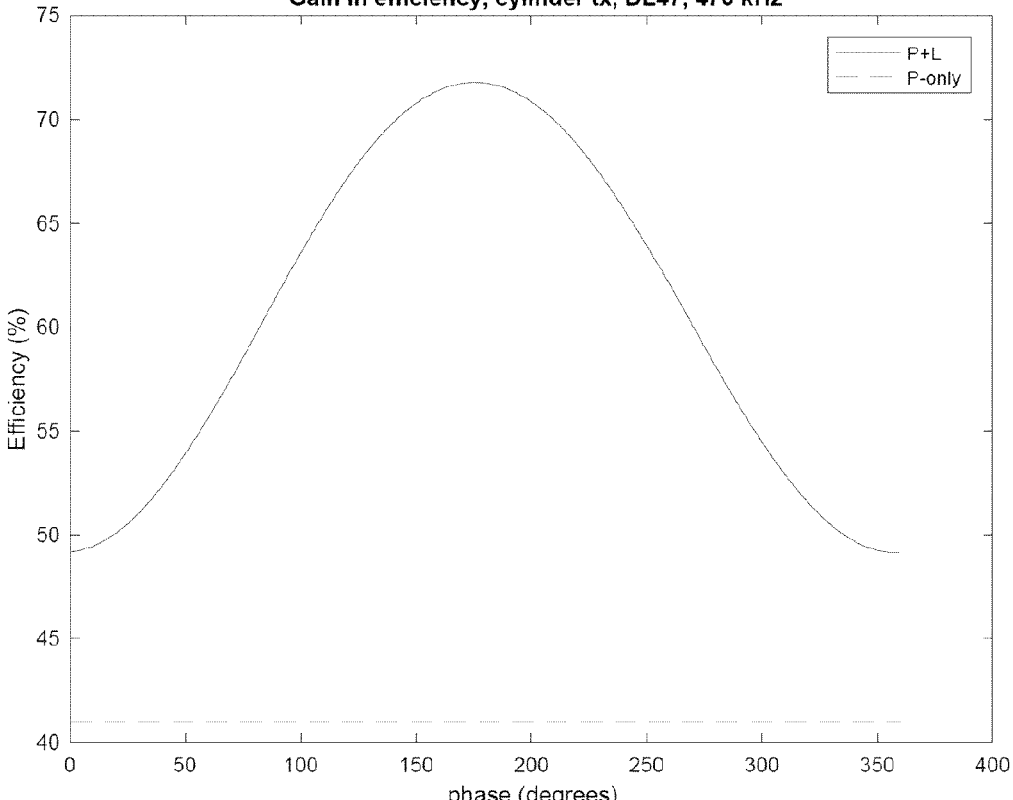

FIG. 30 plots the expected gain in efficiency for a cylindrical transducer driven by P+L-rotated signal as a function of phase, compared to traditional driving with P only.

FIG. 31 is a table describing the material properties of the PZT and epoxy.

Figure 32A:
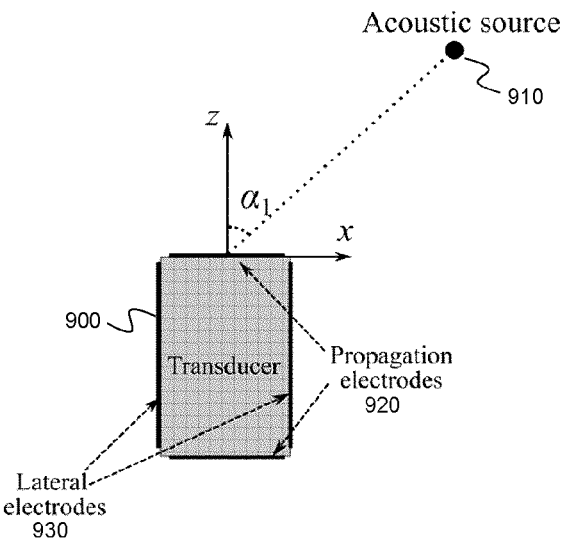
Figure 32B:
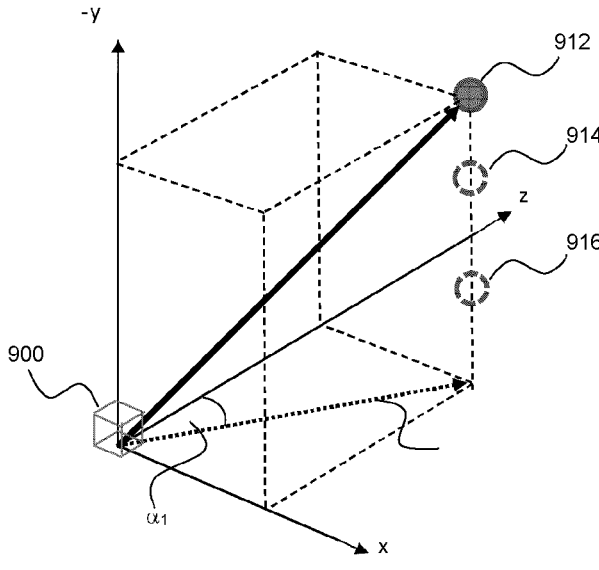
Figure 32C:
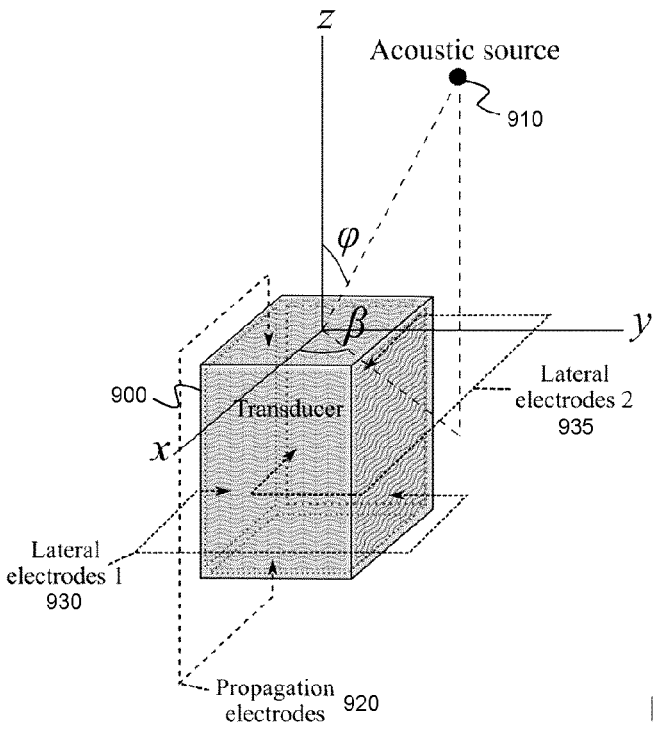

FIGS. 32A-32C schematically illustrate directivity detection with a biaxial transducer and a triaxial transducer.

Figure 33:
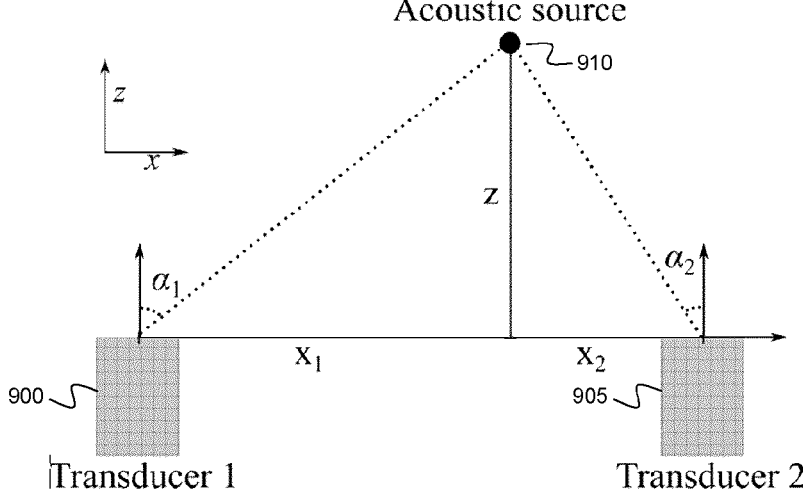

FIG. 33 schematically illustrates acoustic source location detection with a biaxial transducer in an example 2D case.

FIGS. 34A and 34B schematically illustrate acoustic source location detection with a triaxial transducer in an example 3D case.

Figures 35A, 35B, 35C, 36A, 36B, 36C:
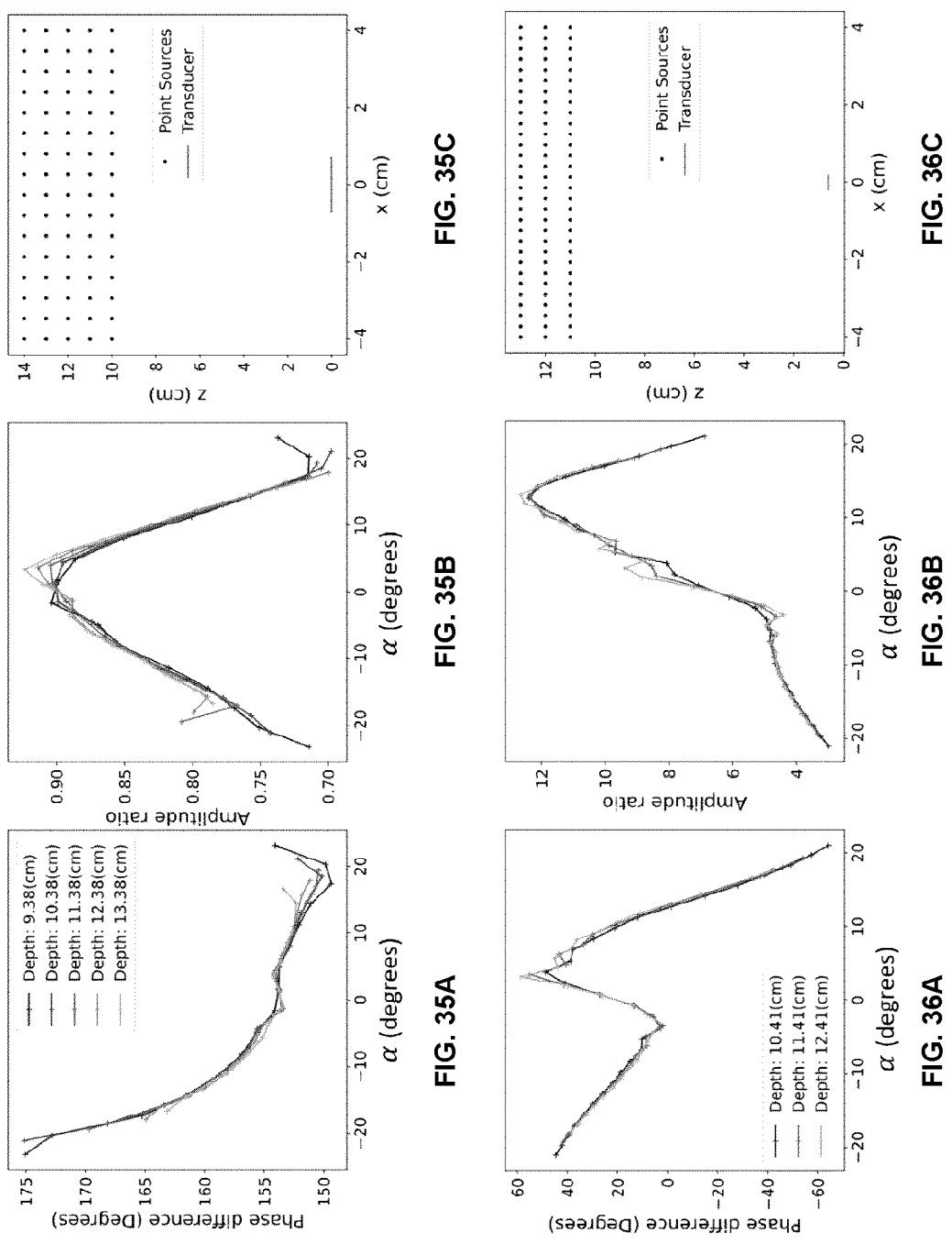

FIGS. 35A-35C plots numerical results for a single transducer with two terminals tuned for 133 kHz. Phase difference and amplitude ratio are binned by depth from the top face of the transducer. FIG. 35A plots phase difference against the cylindrical angle of each point source location. FIG. 35B plots terminal voltage amplitude ratio against the cylindrical angle of each point source location. FIG. 35C shows the locations of point sources as well as the top (forward) surface of the transducer.

FIGS. 36A-36C plots numerical results for a single transducer with two terminals tuned for 250 kHz. Phase difference and amplitude ratio are binned by depth from the top face of the transducer. FIG. 36A plots phase difference against the cylindrical angle of each point source location. FIG. 36B plots terminal voltage amplitude ratio against the cylindrical angle of each point source location. FIG. 36C shows the locations of point sources as well as the top (forward) surface of the transducer.

Figure 37:
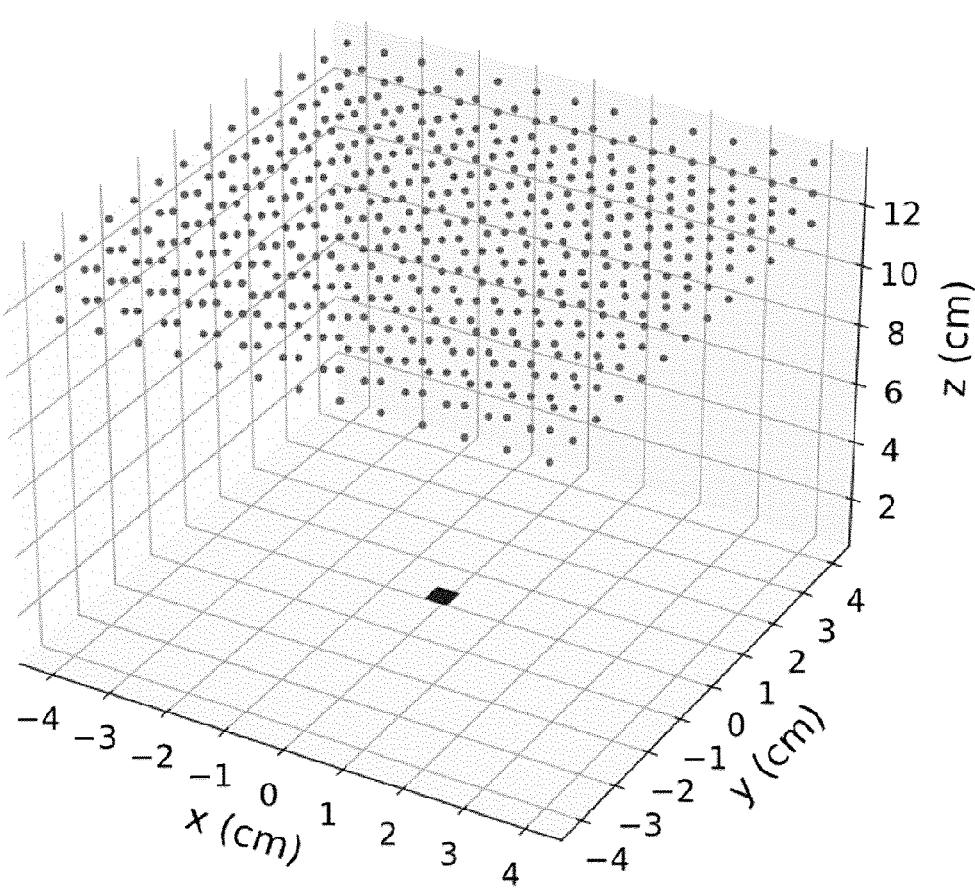

FIG. 37 shows the 3D locations of point sources as well as the top (forward) surface of the transducer. Points were collected in 3 grids at different z-depths relative to the top of the transducer: 11, 12, and 13 cm. Grids contained 13×13 source point locations.

Figure 38:
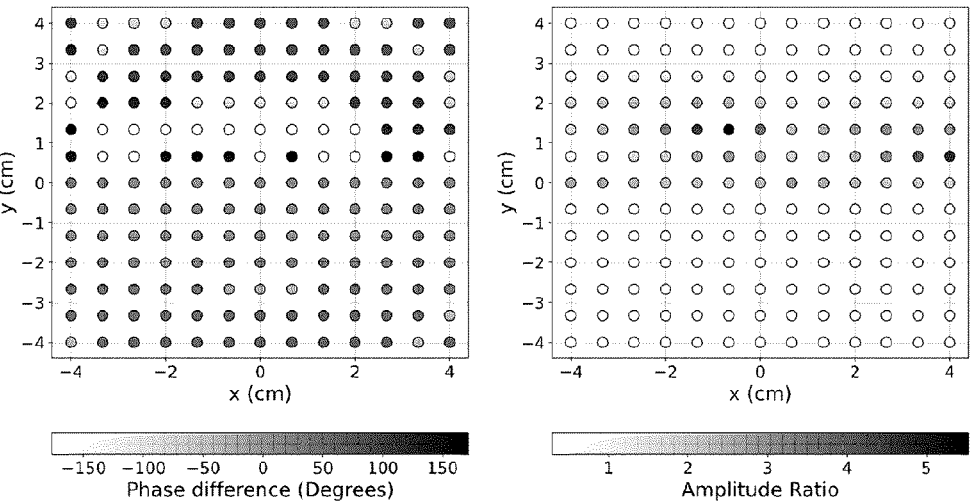

FIG. 38 plots numerical results for a single transducer with three terminals. These plots contain metrics from the forward and lateral terminal 1 (along the y axis), as related to x and y coordinates of the point source. The left plot shows the difference in phase of the two terminals at each point. The right plot shows the ratio between the terminal voltages at each point.

Figure 39:
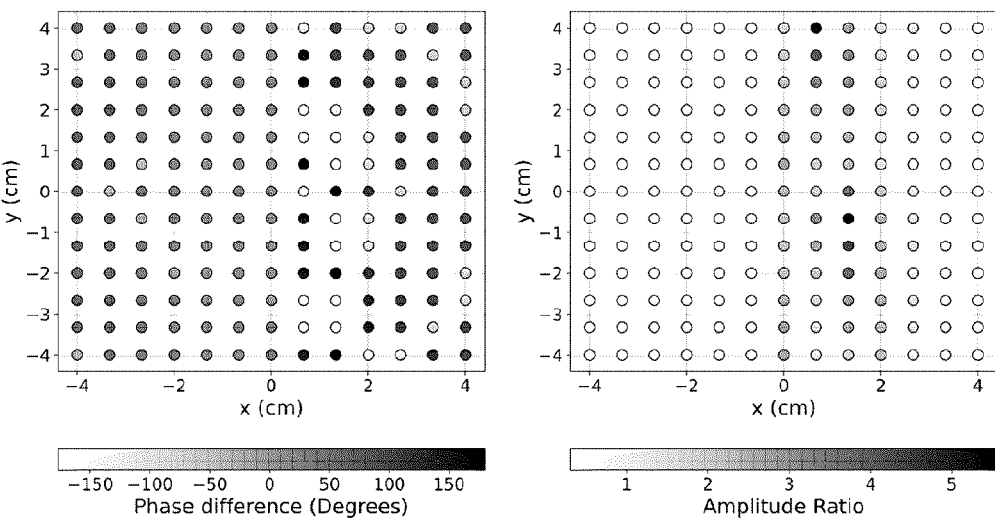

FIG. 39 plots numerical results for a single transducer with three terminals. These plots contain metrics from the forward and lateral terminal 2 (along the y axis), as related to x and y coordinates of the point source. The left plot shows the difference in phase of the two terminals at each point. The right plot shows the ratio between the terminal voltages at each point.

FIG. 40 plots numerical results for a single transducer with three terminals. These plots contain metrics both lateral terminals, as related to x and y coordinates of the point source. The left plot shows the difference in phase of the two terminals at each point. The right plot shows the ratio between the terminal voltages at each point.

FIGS. 41A and 41B plot an approximation of Equation 7 (FIG. 41A) and Equation 8 (FIG. 41B) using linear radial basis functions.

FIG. 42 plots an approximation of Equation 6 using polynomial multiple regression. For a transducer and source tuned to 250 kHz.

FIGS. 43A and 43B show estimations of x and z coordinates using two biaxial transducers. The centers of the two transducers were offset from the origin by 1 cm to either side. Point sources are from individual simulations and compiled together into one plot. FIG. 43A shows an example of point source localization using a perfect fit for interpolation. FIG. 43B shows an example of point source localization with a function that does not intersect each point perfectly but provides a smoother line of best fit.

Figure 44A:
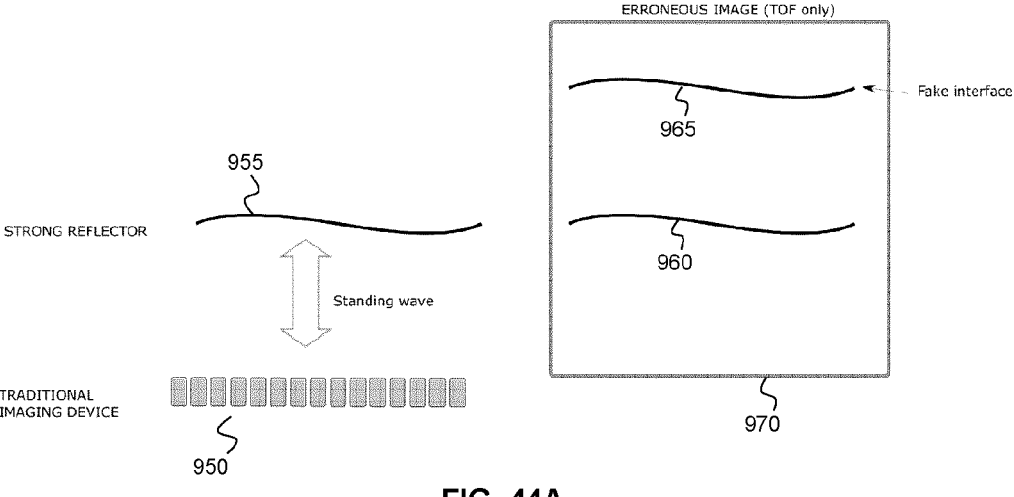
Figure 44B:
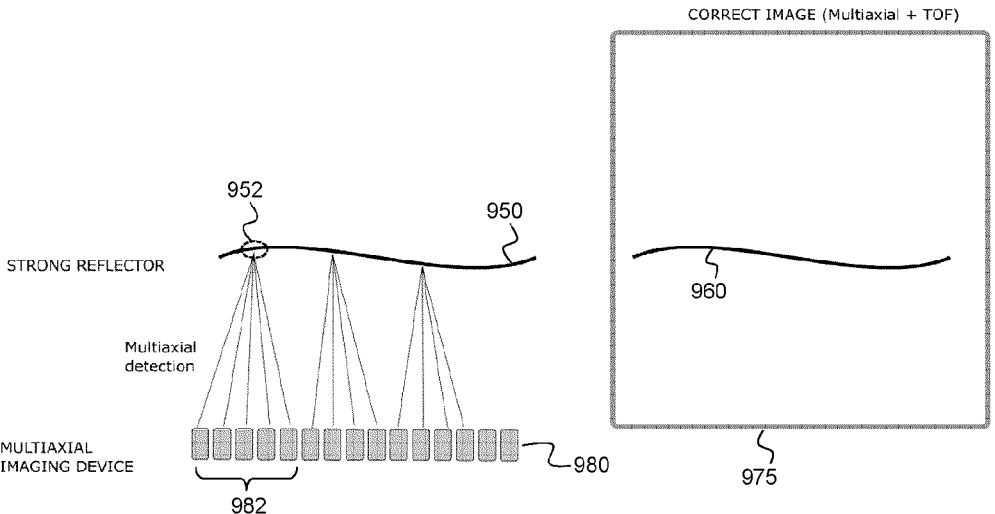

FIGS. 44A and 44B illustrate the detection and removal of time-of-flight image artifacts via the processing of signals from one or more multiaxial ultrasound transducers.

DETAILED DESCRIPTION

Various embodiments and aspects of the disclosure will be described with reference to details discussed below. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure.

As used herein, the terms "comprises" and "comprising" are to be construed as being inclusive and open ended, and not exclusive. Specifically, when used in the specification and claims, the terms "comprises" and "comprising" and variations thereof mean the specified features, steps or components are included. These terms are not to be interpreted to exclude the presence of other features, steps or components.

As used herein, the term "exemplary" means "serving as an example, instance, or illustration," and should not be construed as preferred or advantageous over other configurations disclosed herein.

As used herein, the terms "about" and "approximately" are meant to cover variations that may exist in the upper and lower limits of the ranges of values, such as variations in properties, parameters, and dimensions. Unless otherwise specified, the terms "about" and "approximately" mean plus or minus 25 percent or less.

It is to be understood that unless otherwise specified, any specified range or group is as a shorthand way of referring to each and every member of a range or group individually, as well as each and every possible sub-range or sub-group encompassed therein and similarly with respect to any sub-ranges or sub-groups therein. Unless otherwise specified, the present disclosure relates to and explicitly incorporates each and every specific member and combination of sub-ranges or sub-groups.

As used herein, the term "on the order of", when used in conjunction with a quantity or parameter, refers to a range spanning approximately one tenth to ten times the stated quantity or parameter.

As discussed above, the present inventors, in their previous work, have shown that the biphasic driving of an ultrasound transducer can lead to increased and more efficient ultrasound output via a reduction in the coercive field. As disclosed in International Patent Application No. PCT/CA2014/051113, it was previously believed by the inventors that the biphasic effect was applicable only for the excitation of an ultrasound transducer to cause the more efficient excitation of ultrasound energy. Moreover, it was believed that the biphasic effect was limited to the application of a phase difference between signals applied to different pairs of electrodes. While the biphasic driving method employed in International Patent Application No. PCT/CA2014/051113 was described as facilitating an increase in emitted ultrasound energy and efficiency, it nonetheless remained desirable to achieve improvements for ultrasound imaging, such as improvements that further increase signal-to-noise ratio.

In the present disclosure, various example embodiments are provided for the application of the biphasic effect to ultrasound imaging. As described in detail below, and as shown in the examples below, the present inventors have discovered that when the biphasic effect is applied to ultrasound imaging, it is not only beneficial for the improved transmission of ultrasound energy, but is also useful for receiving ultrasound signals with increased sensitivity. Moreover, it is shown that by adding a time delay between the pairs of electrodes (the propagation electrodes and the lateral electrodes, as shown below) in addition to the phase difference between the propagation and lateral electrodes, either with our without the use of the biphasic effect upon receive, a further increase in imaging performance can be attained.

Indeed, as shown in the examples below, some potential benefits of using the present adaptations to the biphasic method include, but are not limited to: (i) achieving an increase in signal-to-noise ratio compared to similar energy conditions, (ii) the feasibility to increase and/or harmonize the signal-to-noise ratio in phased array images, (iii) the feasibility to improve and/or harmonize axial resolution in phased array images, (iv) the selective improvement in signal-to-noise ratio for a subregion of an image, and (v) the selective improvement in axial resolution for a subregion of an image. Furthermore, in some example implementations, the selective use of pulse shapes, and the apodization of the amplitudes and delay conditions, can be employed to further enhance metrics for imaging quality. In terms of efficiency, the examples provided below demonstrate how the biphasic method can double the SNR when applying the same level of energy as used with a conventional driving method. Similarly, the examples demonstrate how significant improvement was observed for axial resolution, which showed a significant reduction of up to 73% in size (from 4.1 mm to 1.1 mm). The results presented below also demonstrate that the biphasic method can harmonize axial resolution among ultrasound array elements.

Figure 1A:
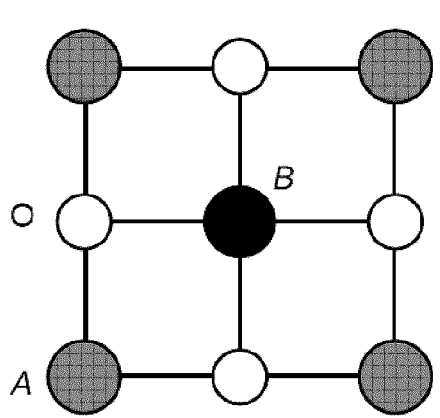
FIGS. 1A and 1B show different phases of a perovskite ferroelectric crystal, including the (A) cubic and (B) tetragonal phases.
Figure 1B:
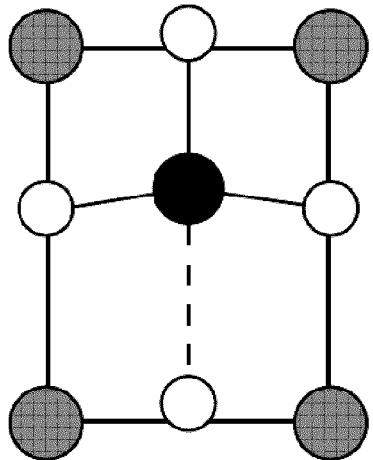
Figures 2A, 2B:
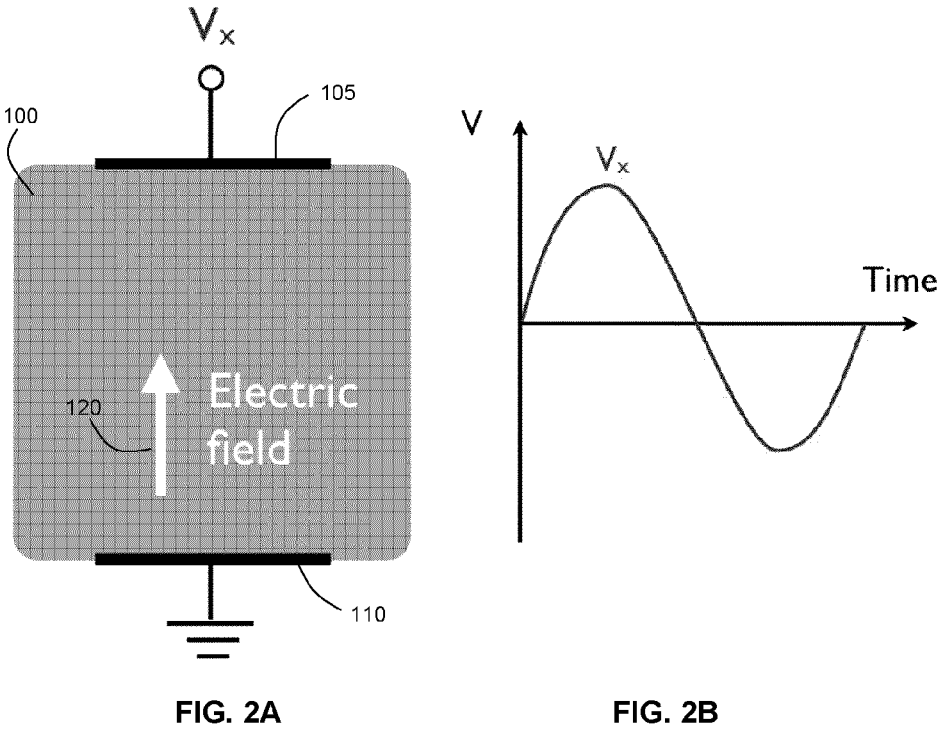
FIGS. 2A and 2B show the application of a time-varying electric field between parallel electrodes of a piezoelectric crystal, in order to obtain a mechanical response.
Figure 3:
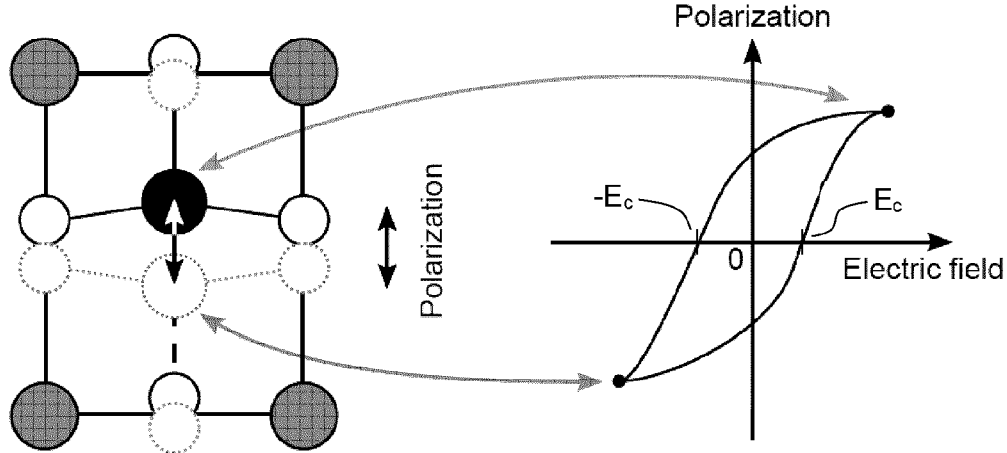
FIG. 3 illustrates the hysteresis in the relationship between the applied electric field, the resulting polarization and structural changes that accompany the polarization inversion.
Figure 4:
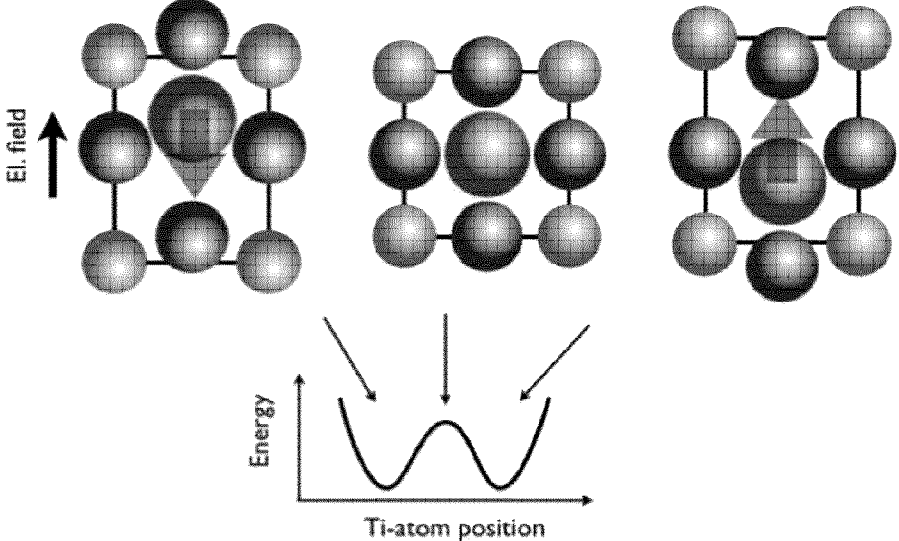
FIG. 4 is an illustration of the double-well potential energy profile associated with the motion of the central ion through a vertical line connecting the two orientations associated with the different polarization states of a ferroelectric perovskite material.
Figure 5:
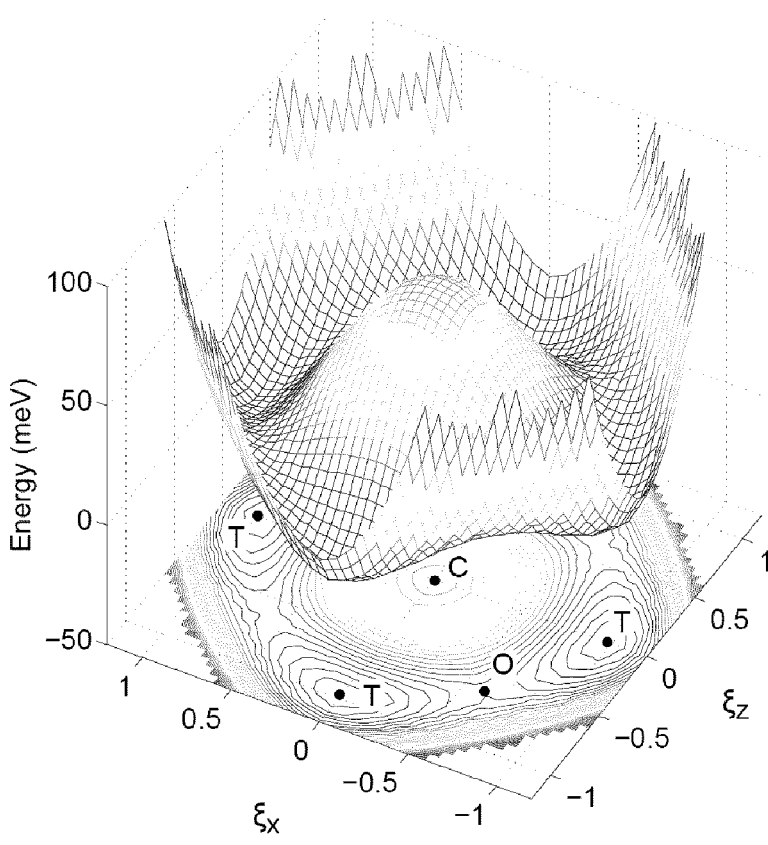
FIG. 5 is an illustration of the potential energy surface associated with the motion of the central ion within a planar surface passing through the center of the unit cells, showing the central maximal peak. The energy surface is calculated from first principles for the polarization inversion in (010) plane of $PbTiO_3$. The labels C, T and O refer to cubic, tetragonal and orthorhombic structures, respectively.
Figure 6:
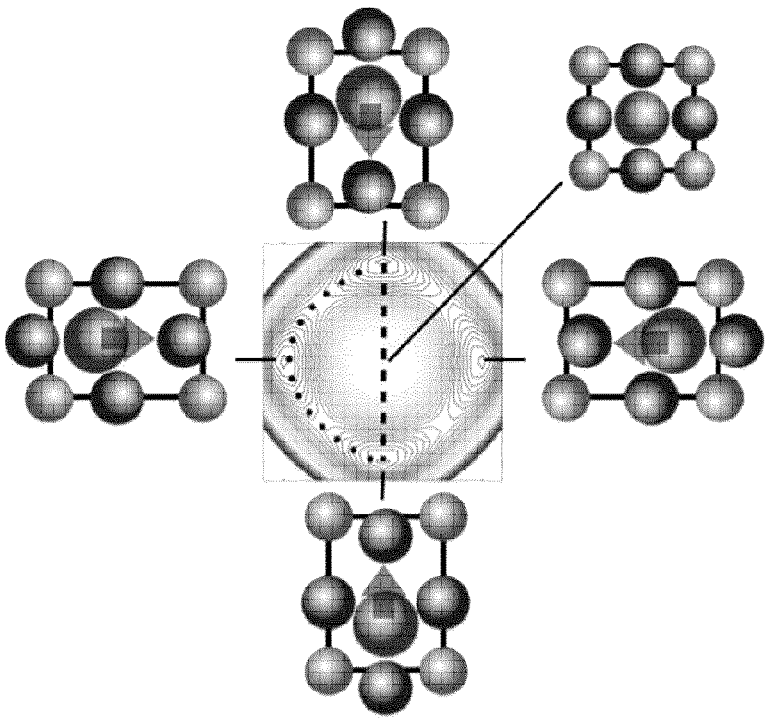
FIG. 6 shows a projection of the energy surface shown in FIG. 5, illustrating the position of the central ion at various locations on the energy surface.
Figure 7A:
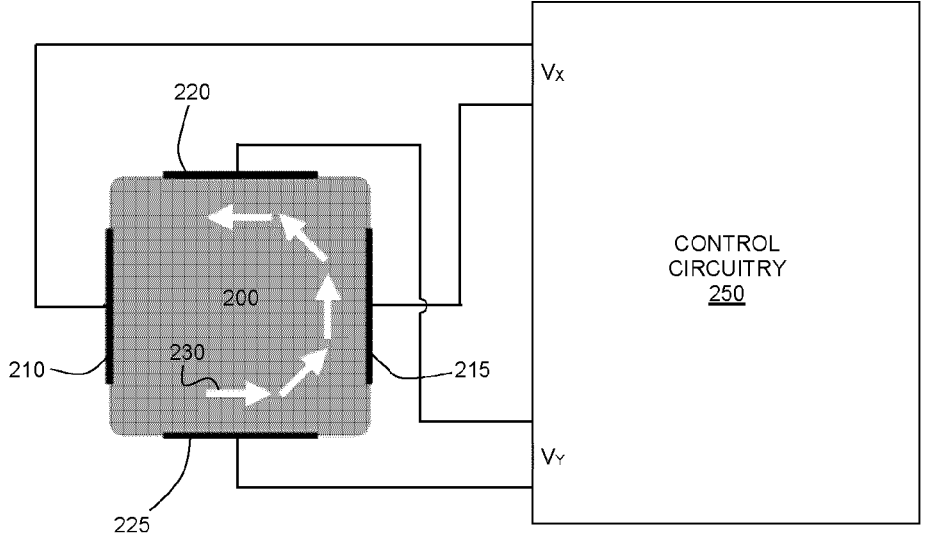
FIGS. 7A and 7B illustrate an example method of driving a ferroelectric element with a phase difference between two orthogonally applied voltages, in order to generate a rotating electric field within the element.
Figure 7B:
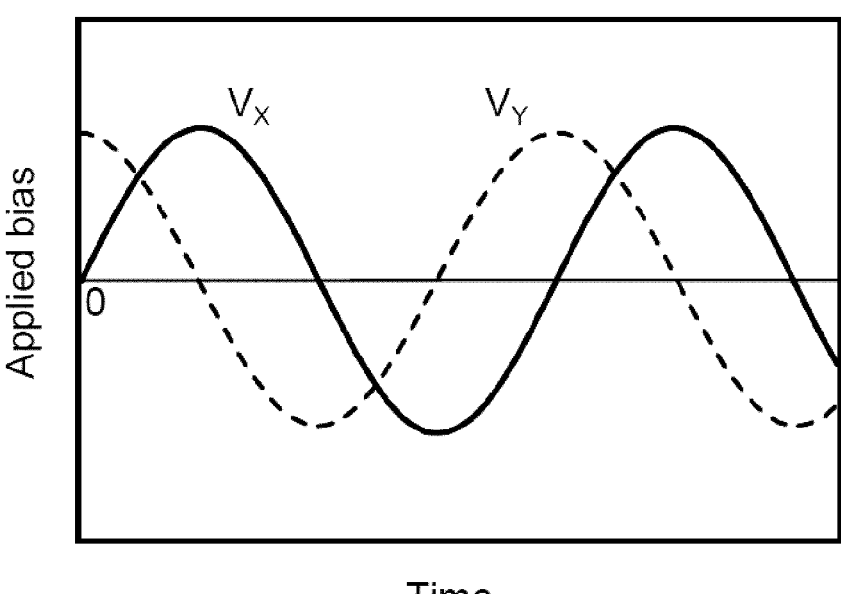
Figure 8:
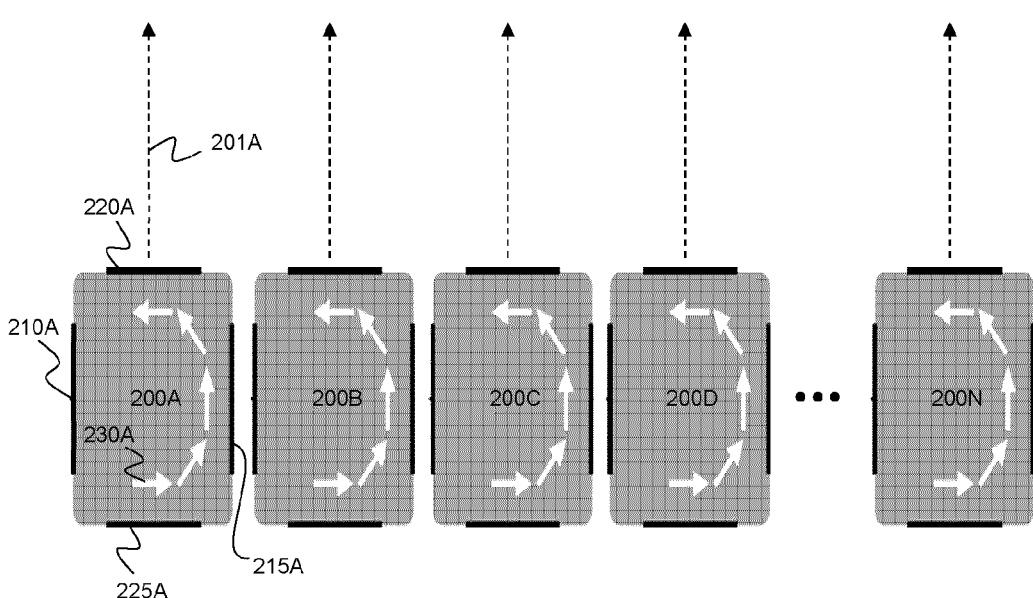
FIG. 8 illustrates an array of ultrasound elements configured for ultrasound imaging via biphasic driving and/or reception.

Referring now to FIG. 8, an illustration is provided of an example one-dimensional ultrasound array, including array elements 200A-200N. Each element comprises a ferroelectric material (e.g. a ferroelectric perovskite oxide material or a ferroelectric perovskite material) and at least two pairs of electrodes. As shown in the figure, a first pair of electrodes, henceforth referred to as the propagation electrodes 220A and 225A, are provided on a first pair of opposing surfaces of the ferroelectric material, such that the propagation electrodes define (e.g. are arranged perpendicular to) a propagation direction or propagation axis (shown at 201A for array element 200A). A second pair of electrodes, henceforth referred to as lateral electrodes 210A and 215A, are provided on a second pair of opposing surfaces. In some example embodiments, the array elements may be separately formed, e.g. by dicing a ferroelectric material for form individual ferroelectric elements that are subsequently assembled into an array), or may be formed monolithically, e.g. such as via a kerfed array formed in a ferroelectric material.

In many example implementations described herein, the lateral electrodes 210A and 215A are shown in a perpendicular configuration relative to the propagation electrodes 220A and 225A. However, it will be understood that the two pairs of electrodes need not be strictly perpendicular or orthogonal. In some example implementations, the pairs of electrodes may be oriented with slight variations relative to a perpendicular configuration, for example, with at 90±5 degrees relative to one another. It will be understood that although many of the present example embodiment pertain to one-dimensional arrays, the embodiments of the present disclosure may be extended to other spatial configurations, such as 1.5 and 2D arrays.

As shown in FIG. 8, driving signals may be provided to the electrodes of a given array element in order to generate a rotating electric field therein, as per the biphasic effect. This internal rotating electric field is shown at 230A in array element 200A. The driving signals may be provided with a phase difference therebetween, and the phase difference may be selected to achieve an increased transmitted power and/or an increased signal-to-noise ratio upon receive during imaging.

Figure 9:
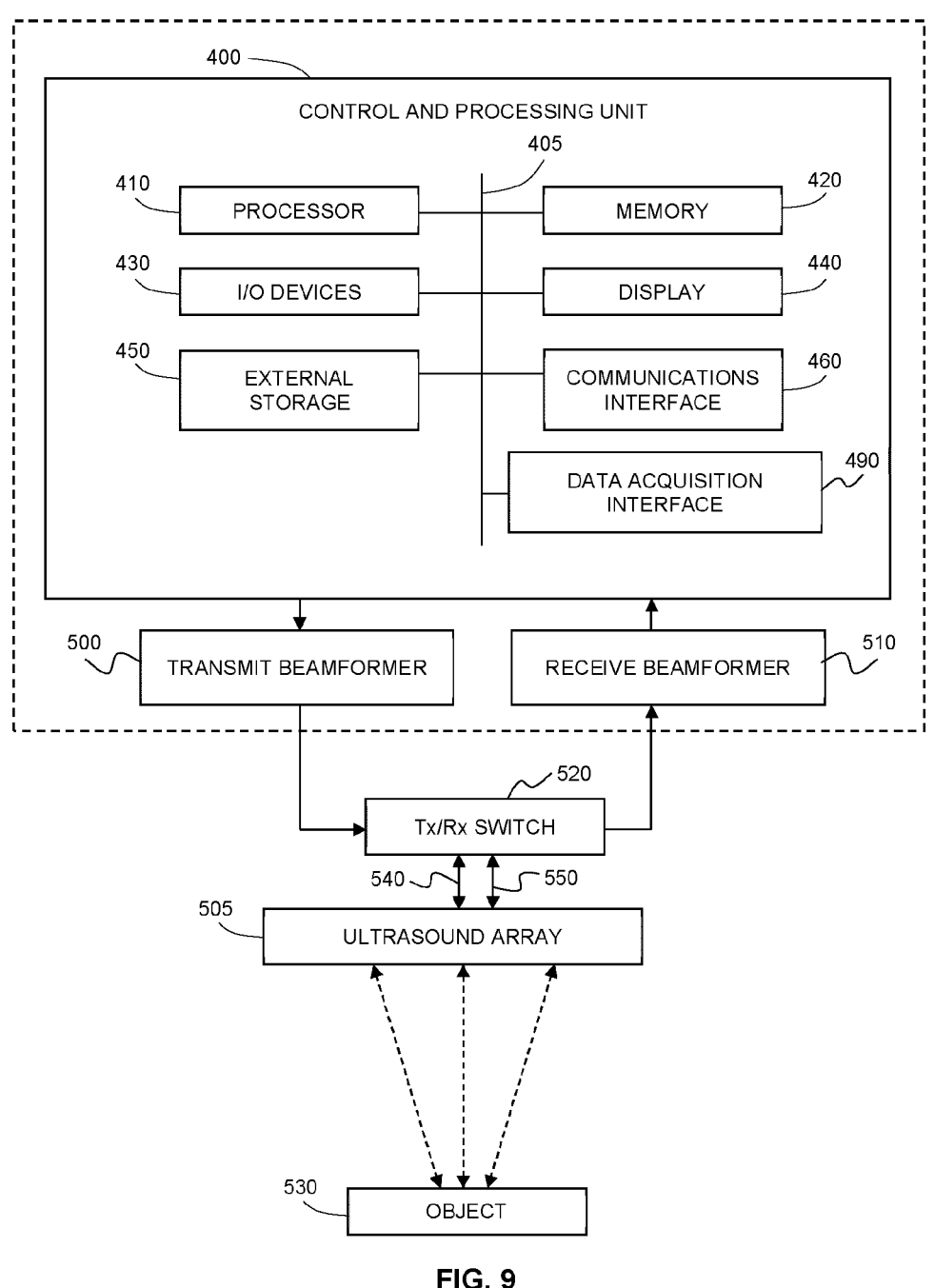
FIG. 9 shows an example system for performing ultrasound imaging via biphasic driving and/or reception.

FIG. 9 illustrates an example imaging system for performing ultrasound imaging using biphasic driving and/or biphasic reception. The example system includes an ultrasound array 505 having a set of array elements, where at least a subset of the array elements has both propagation and lateral electrodes provided thereon, for example, as shown in FIG. 8. The electrodes of the ultrasound array 505 are interfaced with a Tx/Rx switch 520, which is operably connected to a transmit beamformer 500 and a receive beamformer 510. For example, for each ultrasound array element having associated propagation electrodes and lateral electrodes, separate propagation electrode connections 540 and lateral electrode connections 550 are provided. The ultrasound array 505 emits ultrasound energy and receives ultrasound reflections from object 530.

A control and processing unit (circuitry) 400 is employed to control the transmit beamformer 500 and the receive beamformer 510, and to process the beamformed signals. As shown in FIG. 9, in one embodiment, control and processing unit 400 may include a processor 410, a memory 420, a system bus 405, one or more input/output devices 430, and a plurality of optional additional devices such as communications interface 460, data acquisition interface 490, display 440, and external storage 450. It is to be understood that the example system shown in the figure is not intended to be limited to the components that may be employed in a given implementation. For example, the system may include one or more additional processors.

One or more components of the control and processing unit 400 may be provided as an external component that is interfaced to a processing device. For example, as shown in the figure, the transmit beamformer 500 and the receive beamformer 510 may be included as a component of the control and processing unit 400 (as shown within the dashed line), or may be provided as one or more external devices. The transmit beamformer 500, receive beamformer 510, or another imaging processing module may be configured or programmed to execute algorithms for performing the methods described herein.

Embodiments of the present disclosure can be implemented via processor 410 and/or memory 420. For example, the functionalities described below can be partially implemented via hardware logic in processor 410 and partially using the instructions stored in memory 420. Some embodiments are implemented using processor 410 without additional instructions stored in memory 420. Some embodiments are implemented using the instructions stored in memory 420 for execution by one or more general purpose microprocessors. Thus, the disclosure is not limited to a specific configuration of hardware and/or software.

While some embodiments can be implemented in fully functioning computers and computer systems, various embodiments are capable of being distributed as a computing product in a variety of forms and are capable of being applied regardless of the particular type of machine or computer readable media used to actually effect the distribution. At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

A computer readable storage medium can be used to store software and data which when executed by a data processing system causes the system to perform various methods. The executable software and data may be stored in various places including for example ROM, volatile RAM, nonvolatile memory and/or cache. Portions of this software and/or data may be stored in any one of these storage devices.

Referring now to FIG. 10A, an example method of performing ultrasound imaging using an ultrasound imaging array is disclosed. The ultrasound imaging array includes ultrasound array elements having propagation electrodes and lateral electrodes, for example, as shown in FIG. 8. In step 600, a pair of biphasic drive signals (transmit signals)

are provided to the array elements, such that each element of the array receives respective propagation and lateral drive signals at its respective propagation and lateral electrodes. The driving signals may have a common period (frequency).

Each pair of propagation and lateral drive signals have a phase difference applied therebetween in order to employ the biphasic effect. The phase difference may be computationally selected based on modelling, for example, as disclosed in International Patent Application No. PCT/CA2014/051113, or may be experimentally determined. For example, a suitable phase difference may be determined by applying drive signals of varying phase difference to a given array element and selecting the phase difference that results in a maximum or optimized imaging metric, such as emitted power or imaging signal-to-noise ratio. For example, in some example and non-limiting implementations, the phase difference may line between 10 and 350 degrees, between 330 and 300 degrees, between 140 and 350 degrees.

The pairs of propagation and lateral drive signals that are applied with a suitable phase difference (the biphasic drive signals) may be provided on a per-element basis by a transmit beamformer, as shown in FIG. 9, for phase-array imaging. Briefly, a short electric pulse is generated and multiplexed to be sent to individual elements of the phase-array after applying a phase-delay to each of the elements. The electric pulse applied to the P and L electrodes in each element of the array will also have a delay in phase to achieve the biphasic driving.

Referring again to FIG. 10A, after having transmitted ultrasound energy (e.g. an ultrasound pulse) from the array of ultrasound electrodes, reflected ultrasound signals are received, from the propagation and lateral electrodes of each ultrasound array element in step 605, thereby providing propagation receive signals and lateral receive signals on a per-element basis. The propagation signals and receive signals are then combined (e.g. summed) in order to generate, for each array element, a composite receive signal, as shown at 610.

The composite signals are then processed, for example, via the receive beamformer 510 in FIG. 9, in order to generate an ultrasound image. For example, the signal received from the P and the L electrodes may be added after a phase and possible apodisation is applied to one or both signals, such as to form a composite receive signal per element. Any standard beamforming technique can then be applied to obtain a composite signal out of all the array of elements, including beam steering and summing the resulting signals. In an example implementation, the composite receive signals may be processed to generate an A-line of an ultrasound image from a sub-group of elements, and steps 600-615 may be repeated one or more times for different sub-group of elements in order to form a complete ultrasound image (e.g. using a scan converter to generate an image).

During experimental investigations of ultrasound imaging using biphasic transmission, the inventors found that applying a phase difference between the propagation receive signal and the lateral receive signal for each array element led to a further improvement in image quality. An example of such a method is illustrated in FIG. 10B, where in step 606, a phase difference is applied, on a per-element basis, to the propagation receive signal and the lateral receive signal (the first and second receive signals in the flow chart). For example, in some example and non-limiting implementations, the phase difference applied between the propagation receive signal and the lateral receive signal may lie between 10 and 350 degrees, between 330 and 300 degrees, between 140 and 350 degrees. In one example embodiment, the phase difference between the propagation drive signal and the lateral drive signal may be equal to phase difference between the propagation receive signal and the lateral receive signal.

It is noted that while the application of a phase difference to the propagation drive signal and the lateral drive signal is readily achieved, as such signals will typically have a well-defined phase, the application of a phase difference between the propagation receive signal and the lateral receive signal may be more complex due to the absence of well-defined phase of the received signals. Accordingly, in one example embodiment, the application of a phase difference may be achieved by first transforming one of the signals to the frequency domain, applying the phase shift to transformed signal in the frequency domain, and then transforming the signal back to the time domain.

Figure 10C:
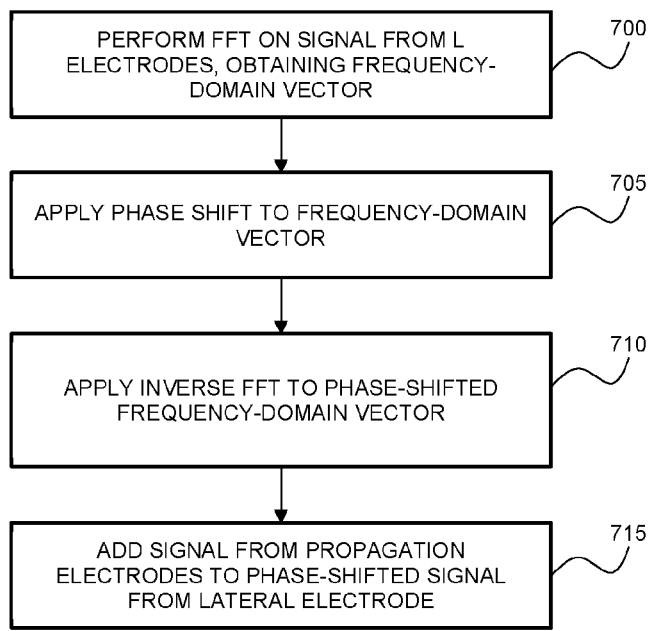
FIG. 10C is a flow chart illustrating an example method of applying a phase difference to one of the receive signals.

Such an example embodiment is illustrated in FIG. 10C. In step 700, a fast Fourier transform (FFT) is applied to the lateral receive signal, generating a frequency-domain vector. A phase shift is then applied to each frequency component of the vector at 705, and an inverse FFT is performed at step 710. Finally, the propagation receive signal is added to the phase-shifted lateral receive signal at step 715. Although the present example flow chart is illustrated based on the transformation of the lateral receive signal, it will be understood that the phase difference may alternatively be applied to the propagation receive signal.

FIG. 10D illustrates an example method for selecting an optimal phase difference for applying to the receive signals. In step 800, the fast Fourier transform (FFT) of the lateral receive signal is calculated, as follows: X=FFT(L-data). In step 805, a set of phase-shifted frequency domain vectors are generated for a set of phase values. For example, for each phase ($\phi$, in radians) from 0 to $2\pi$, the following steps may be performed: (i) calculate the Y vector (same size as X) in the frequency domain that shifts all the frequency spectrum by $\phi$ with $$Y(n) = e^{-i2\varphi\frac{\left(n-\frac{N}{2}\right)}{N}},$$

where n is the position in the spectrum and N is the size of the X vector, and (ii) calculate the vector Z=X×Y in the frequency domain. After having generated the set of phase-shifted frequency-domain vectors (phase-shifted frequency-domain signals), the frequency-domain vectors are transformed back to the time domain using an inverse FFT, as per step 810, to obtain the phase-shifted lateral receive signals for the set of phases. In step 815, the propagation receive signal is added to each of the phase-shifted lateral receive signals. Finally, in step 820 the phase difference is selected that provides the optimal image quality (such as an optimal signal-to-noise ratio).

The present inventors have also discovered that in addition to applying a phase difference between the propagation drive signal and lateral drive signal for a given array element, the application of a time delay between the propagation drive signal and lateral drive signal, or vice versa (i.e. a time delay between the lateral drive signal and the propagation drive signal) can provide a further benefit to image quality. The time delay may be selected to increase the amount of ultrasound energy that is emitted relative to an amount of ultrasound energy that is emitted in the absence of delay between the propagation drive signal and the lateral drive signal. In some example embodiments, in which the propagation drive signal and the lateral drive signal have a common period (and a duration of at least one period), the time delay is greater than one period, or is between 0.5 and 3 periods, or is between 2.25 and 2.75 periods.

Example implementations of the present embodiment are illustrated in the flow charts provided in FIGS. 10E and 10F. In FIG. 10E, a time delay is provided, in addition to a phase difference, between the propagation drive signal and the receive drive signal, in step 602, where the remaining steps follow those described in reference to FIG. 10A. In FIG. 10F, a time delay is provided, in addition to a phase difference, between the propagation drive signal and the receive drive signal, in step 602, where the remaining steps follow those described in reference to FIG. 10B. It will be understood that the time delay may be any suitable time delay that maintains at least partial temporal overlap of the propagation drive signal and the lateral drive signal. The selection of a suitable time delay may be achieved by performing imaging with a series of trial time delays, and selecting the time delay that provides an optimal image quality (e.g. an optimal signal-to-noise ratio). In a further example embodiment, a time delay may also be applied between the propagation receive signal and the lateral receive signal, or vice versa.

It will be understood that in the preceding example embodiments, the phase differences (either applied in transmit or receive), and/or the time delay (again applied either in transmit or receive), may differ among two or more array elements. Furthermore, it will be understood that while some of the preceding example embodiments refer to biphasic drive signals being delivered to all array elements, and/or biphasic receive signals being collected from all array elements, biphasic drive signals and/or biphasic receive signals may be respectively delivered to or collected from a subset of array elements. For example, during transmission, biphasic drive signals may be delivered to a first set of array elements, and receive signals may be collected from a second set of array elements, where the first subset and the second subset may be the same or different. For example, in some example embodiments, the methods described herein may be employed for split aperture imaging, synthetic aperture imaging, plane wave imaging, multi-aperture imaging and/or other variants of array-based imaging.

In one example embodiment, the signal-to-noise ratio of a phased array image may be increased and/or harmonized according to the methods disclosed herein. For example, after applying a phase between signals received by P and L for an element and addition of the signals (biphasic reception), the echo obtained from the reflectors is enhanced while the noise component is cancelled by destructive interference, with the result of a composed signal with a higher signal-to-noise ratio. The applied phase can be controlled per element to maximize or harmonize the signal-to-noise ratio obtained for all or a subset of elements.

In one example embodiment, the axial resolution of a phased array image may be increased and/or harmonize according to the methods disclosed herein. For example, the signal obtained after biphasic reception can be the result of applying a dephasing between electrodes P and L such as to reduce the width of the resulting receive pulse, giving rise to a higher axial resolution.

In one example embodiment, the signal-to-noise ratio of a subregion of an image may be improved according to the methods disclosed herein. For example, the signal obtained after biphasic reception can be the result of applying a dephasing between electrodes P and L such as to minimize the noise amplitude at a specific time on the signal, which is associated with a specific depth in the image, giving rise to a controlled signal-to-noise ratio for the chosen image depth.

In one example embodiment, the axial resolution of a subregion of an image may be improved according to the methods disclosed herein. For example, the signal obtained after biphasic reception can be the result of applying a dephasing between electrodes P and L such as to reduce the pulse width at a specific time on the signal, which is associated with a specific depth in the image, controlling the axial resolution for the chosen image depth.

In some example embodiments, the selective use of pulse shapes, and the apodization of the amplitudes and delay conditions, can be employed to further enhance metrics for imaging quality. For example, the signal obtained from each of the electrodes P and L can be convoluted, before or after dephasing and summation, with specific pulse shapes to obtain an apodized resulting signal, with this resulting in a selective suppression of sidelobes, or the narrowing of the pulse, or the destructive sum of the noise component, and therefore improving metrics for the image quality.

Source Direction and Location Determination Via Multi-axial Ultrasound Transducers The applications of ultrasound imaging are broad given its capabilities for fast, inexpensive, and non-invasive visualization of areas of the body. For example, one of the most widely recognized uses of ultrasound imaging is for fetal ultrasound, which generates an image of a fetus inside the uterus (in-utero). Currently, most types of ultrasound imaging (including fetal ultrasound) send short, low-intensity bursts of ultrasound into the body and listen for reflection. The time at which a reflection is heard indicates the depth and position of an object that has sufficiently different density than its surroundings to reflect an ultrasound pulse, such the fetus.

Passive ultrasound imaging is contrasted with techniques that use imaging pulses, or active imaging, in that it does not send an imaging pulse. Instead, it depends on receiving ultrasound from sources within its field of view to reconstruct an image. These sources can be active (such as, but not limited to, another transducer or cavitation bubbles) or passive (such as, but not limited to, a reflective surface). The application of focused ultrasound (FUS) can create both types of sources by applying burst of sound waves with the intent of causing therapeutic effects, such as liquefaction. Specifically, an FUS technique called histotripsy causes the liquefaction of tissue due to the mechanical forces of bubbles interacting with the ultrasound and expanding and contracting. These oscillating bubbles can both reflect incident sound waves and generate their own.

Histotripsy shows significant potential for the development of a non-invasive surgical therapy to treat congenital anomalies such as large vascular fetal tumors and has been demonstrated in a rabbit model. It also demonstrates a distinct advantage over procedures such as laser ablation and ultrasound-guided radiofrequency ablation, which require breaching the amniotic sac to deliver treatment for tumors and other maladies. This avoids complications such as preterm rupture of placental membranes. However, given the delicate environment around a fetus, precision when applying histotripsy is crucial.

Passive ultrasound imaging techniques such as passive cavitation detection (PCD) and passive acoustic mapping (PAM) can monitor the area where FUS is applied without the need for additional imaging pulses, which may interact unpredictably with therapeutic pulses. Both techniques can listen for signals from the expansion, contraction, and collapse of bubbles during treatment. PCD is typically performed with only one element, gathering information about the intensity, duration and type of bubble activity. PAM gathers identical information but can map it to a spatial location using an array of transducers. PAM has also been shown to be able to predict ablated volumes from FUS treatment. Currently, however, PAM suffers from high computational complexity, the need for assumptions to be made about the time of events, and the need for the imaging array to be placed centrally in a treatment configuration, often at the center of a focused transducer array.

The present inventors realized that multi-axial transducers, which can exhibit a rotating electric field due to orthogonally placed electrodes, such as those described above, could potentially address the shortcomings of both PCD and PAM. Multiaxial transducers are transducers having a ferroelectric acoustically active material that have more than the traditional two paired electrodes. For example, a biaxial transducer has a ferroelectric acoustically active material and two paired-sets of electrodes (perpendicular to each other), while a triaxial transducer has a ferroelectric acoustically active material and three paired-sets of electrodes (also perpendicular to each other). Biaxial transducers used in driving mode with two phase-offset electric fields have been shown to enable the dynamic steering of the focus of a single-element transducer.

The present inventors have found that ultrasound signals detected from a given acoustic source via a multiaxial transducer results in the generation of terminal voltages that are dependent on the direction of the acoustic source relative to the multiaxial transducer. Accordingly, in various example embodiments, the voltages (e.g. amplitude and phases of the voltages) measured at the terminals of a multiaxial transducer may be processed to determine the direction and or location of the acoustic source relative to the multiaxial ultrasound transducer. In some example implementations, the acoustic source may be an active acoustic source such as, but not limited to, a bubble, a group of bubbles in close proximity, or another ultrasound transducer. In other example implementations, the acoustic source may be acoustically reflective or scattering interface or inhomogeneity.

Such a capability can be beneficial and useful in many applications. For example, in the case of a single-element multiaxial ultrasound transducer, the ability to estimate the direction of a source can permit the determination, along an identified source direction, of a range of specific depths where acoustic generation may be occurring. This capability may be particularly useful in space-constrained applications, such as systems in which an ultrasound detector is included in a central region of an ultrasound array for imaging or monitoring purposes.

In some example applications, an estimate of a direction based on the use of a multiaxial ultrasound transducer may be advantageous in avoiding the need for using time-of-flight estimates that would otherwise require the detection signals from a plurality of transducer elements and the use of time delay beamforming. In other example applications involving image reconstruction, the use of one or more multiaxial ultrasound transducers may facilitate an increase in image resolution both laterally and axially, and may also decrease the number of required sensors in an array because of the lack of dependence on uncertain time of occurrence estimates. The use of multi-axial ultrasound transducers may also result in an increased computationally efficiency during image reconstruction. Furthermore, as evidence in the Examples presented below, experimental results demonstrate that active multi-axial imaging techniques increase signal-to-noise ratio, peak-to-peak amplitude, and improve resolution in reconstructed images.

In one example embodiment, a multiaxial ultrasound transducer may be employed to determine a direction of arrival of a signal from an acoustic source. FIGS. 32A-32C schematically illustrate a multiaxial ultrasound transducer 900 and an acoustic source 910 for the case of a biaxial and triaxial transducer, respectively. FIG. 32A shows a biaxial transducer having a pair of opposing propagation electrodes 920 and a pair of opposing lateral electrodes 930. The spatial relationship between the biaxial transducer and the acoustic source 900 can be characterized using an angle ($\alpha$) that resides in a biaxial plane that passes through the propagation electrodes 920 and the lateral electrodes 930 (this plane is the x-z plane in FIG. 32A). This case is generalized in FIG. 32B to acoustic sources that do not lie within the biaxial plane. In the example case of a triaxial transducer that is shown in FIG. 32C, which includes one set of propagation electrodes 920 and two orthogonal sets of lateral electrodes (930 and 935), the three-dimensional spatial relationship between the triaxial transducer and the acoustic source can be characterized using spherical coordinates ($\beta$, $\phi$).

As shown below, the direction of the acoustic source relative to a multiaxial ultrasound transducer may be determined based on the voltages detected at the propagation electrodes and the lateral electrodes of a multiaxial transducer. In some example implementations, a pre-determined relationship between these electrode voltages and one or more directional angles (e.g. one angle in the case of a biaxial ultrasound transducer and two angles in the case of a triaxial ultrasound transducer) is employed. This relationship may be any suitable relationship, such as a numerical or analytical relationship, expressed in any suitable form (e.g. a lookup table or a parametric functional relationship).

In some example implementations, a suitable relationship between terminal voltages of a multiaxial transducer and the source directional angle(s) can be determined by measuring and/or calculating the terminal voltages of a multiaxial transducer for a plurality of known locations of an acoustic source. This relationship can be subsequently employed to determine a directional angle of a source having an unknown location based on measured terminal voltages.

In some example implementations, the relationship between terminal voltages of a multiaxial transducer and the source directional angle(s) may be expressed in terms of one or more parameters generated based on the terminal voltages. It will be understood that a wide number a suitable parameters may be derived from the terminal voltages of a multiaxial ultrasound transducer for the determination of a relationship. In some example embodiments, one parameter may be determined based on the measured phases of the terminal voltages, and another parameter may be determined based on the measured amplitudes of the terminal voltages.

For example, in one example implementation, a first derived parameter may be a difference in phase of two terminal voltages. For a complex phasor, this is found using Equations 1 through 3 below, where V is a complex voltage measured from a terminal. To avoid aliasing and discontinuities in the relationship, the smallest enclosed angle by the two phases is found, with the result being within the range of [−180,180). Positive angles represent a rotation counter-clockwise around the unit circle, relative to the positive y axis, whereas negative angles represent a rotation clockwise. Equation 3 guarantees that angles will fall within this range by shifting the difference up by $\pi$ radians or 180 degrees, finding remainder when divided by $2\pi$ or 360 degrees using the modulo operator (%), and then shifting the difference back to be zero centered. Changing the order of the parameters $V_1$, $V_2$ will reverse the sign of the phase difference. In the time domain, Equation 1 can be replaced by methods which find the phase of specific frequencies of interest using a short-time Fourier transform, or Equation 2 can be replaced by using cross-correlation to directly determine the resultant time delay due to a phase difference.

$$\phi(V) = \tan^{-1}\left(\frac{\text{Im}(V)}{\text{Re}(V)}\right) \tag{1}$$

$$\Delta\phi(V_1, V_2) = \phi(V_1) - \phi(V_2) \tag{2}$$

$$\text{Phase Difference} = P(V_1, V_2) = (\Delta\phi + \pi)\%(2\pi) - \pi \tag{3}$$

A second derived parameter may be generated, for example, as the voltage amplitude ratio between two terminals voltages, as given by Equation 4. Reversing the order of the parameters $V_1$, $V_2$ will invert the results. $V_1$ and $V_2$ can be directly acquired in both the time and frequency domains.

$$\text{Amplitude Ratio} = P(V_1, V_2) = \frac{|V_1|}{|V_2|} \tag{4}$$

It will be understood that the preceding example parameters of the phase difference and voltage ratio are merely provided as examples and are not intended to be limiting.

In an example case involving a biaxial ultrasound transducer, numerical methods such as, but not limited to, polynomial regression and spline interpolation may be employed to generate a relationship that returns an estimated cylindrical angle associated with the direction of an acoustic source based on the phase difference and voltage ratio as determined from the measured biaxial terminal voltages. Equations 5 and 6 express these using functions g, h, and m, which represent arbitrary fits, such as regression or spline techniques.

$$\alpha = g(A(F, L)) = h(P(F, L)) \tag{5}$$

$$\alpha = m(A(F, L), P(F, L)) \tag{6}$$

While the preceding example involves the determination of a relationship between the source direction angle based on two parameters, one involving amplitude and another involving phase, it will be understood that such an example relationship is not intended to be limiting. For example, in other example implementations, a relationship may be generated based on a single parameter, such as a parameter based on amplitude alone, or a parameter based on both amplitude and phase. The ability to determine a suitable relationship based on amplitude alone, phase alone, or a combination of amplitude and phase, may depend on the frequency of transducer.

In example cases in which the acoustic source lies within the biaxial plane, the relationship between terminal voltages of the biaxial transducer and the source directional angle may be employed to determine the directional angle of the acoustic source. However, in other cases in which the acoustic source lies outside of the biaxial plane, the angle obtained from the relationship may not indicate the true three-dimensional angle of the acoustic source, but may instead provide the cylindrical angle (i.e. the polar angle within a cylindrical coordinate system) associated with the projection of the source-transducer separation vector onto the biaxial plane, as illustrated in FIG. 32B for the case of a biaxial ultrasound transducer having propagation electrodes that are perpendicular to the z axis and lateral electrodes that are perpendicular to the x-axis. As shown in the figure, acoustic sources 912-916 residing at different lateral offsets relative the biaxial plane are characterized by the same cylindrical angle $\alpha_1$.

An example relationship for the case of three-dimensional direction determination via a triaxial ultrasound transducer is similar to the above biaxial case. This example triaxial case uses combinations of the voltages from the different terminals to estimate the polar ($\beta$) and azimuthal angles ($\phi$). Equations 7 and 8 demonstrate an example relationship based on functional relationships g and h, in which only the amplitude ratio is employed. The amplitude ratio could be equivalently replaced by the phase difference in such an example.

$$\beta = g(A(F, L_1), A(F, L_2), A(L_1, L_2)) \tag{7}$$

$$\gamma = h(A(F, L_1), A(F, L_2), A(L_1, L_2)) \tag{8}$$

Equations 9 and 10 illustrate another example in which both the amplitude ratio and phase difference are employed together to determine the functional relationships m and n.

$$\beta = m(A(F, L_1), A(F, L_2), A(L_1, L_2), P(F, L_1), P(F, L_2), P(L_1, L_2)) \tag{9}$$

$$\gamma = n(A(F, L_1), A(F, L_2), A(L_1, L_2), P(F, L_1), P(F, L_2), P(L_1, L_2)) \tag{10}$$

In some example embodiments, multiaxial ultrasound transducers may be employed for the detection of the location of an acoustic source. For example, acoustic source localization can be performed using two biaxial detectors in the case of 2D detection, or using two triaxial detectors for 3D detection.

FIG. 33 illustrates an example of 2D acoustic source localization using a biaxial ultrasound transducer for an example acoustic source located within the biaxial plane. As shown in the figure, by knowing the distance between transducers 900 and 905 ($x_T = x_1 + x_2$) and the estimation of $\alpha_1$ and $\alpha_2$ using the biaxial detection, then the location of the acoustic source 910 can be determined without employing the time-of-flight methods that are conventionally employed using in ultrasound imaging.

For example, the determination of the Cartesian coordinates of a point source can be accomplished in 2D by finding the intersection of two lines. The equations for these lines are defined by a line passing through the center of the forward face of each of the biaxial transducer, and the slope of each line is given by the bearing estimate of the acoustic source relative to the transducer. Given the bearing of a point source, once can convert it into slopes using:

$$m_1 = \tan\left(\frac{\pi}{2} - \alpha_1\right) \tag{11}$$

$$m_2 = \tan\left(\frac{\pi}{2} - a_2\right) \tag{12}$$

Using the equation for a line with that goes through a point and with slopes as calculated in Equations 11 and 12, solving for $x_1$, $x_2$ and z with two transducers gives:

$$z = m_1 x_1 = m_1 (x_T - x_2)$$

$$z = m_2 x_2 \tag{13}$$

$$m_1 (x_T - x_2) = m_z x_2$$

$$m_1 x = m_1 x_2 + m_2 x_2$$

$$x_2 = \frac{m_1 x_T}{m_1 + m_2} \tag{14}$$

$$x_1 = x_T - x_2 \tag{15}$$

This dual-transducer biaxial source localization approach does not require the use of time-of-flight (TOF) information to achieve localization. This can advantageous because it can either be applied in tandem with TOF localization to increase the accuracy of a location estimate, or instead of TOF localization, as demonstrated here, to remove a source of computational complexity and error inherent to TOF estimates.

The triaxial case is analogous to the biaxial case described above and only two triaxial detectors are needed for 3D source localization. As shown in FIGS. 34A and 34B, it is only necessary to know the relative locations of the two triaxial transducers and the pairs of azimuth and polar angles $(\ominus_1, \phi_1)$ and $(\beta_2, \phi_2)$ as measured by each triaxial detector. As for the case of 2D detection, the location in 3D is solved by simple trigonometric operations.

$$x_T = x_1 + x_2$$

$$y_T = y_1 + y_2 \tag{16}$$

$$m_1 = \tan(\beta_1) \tag{17}$$

$$m_2 = \tan(\beta_2) \tag{18}$$

In present example, it is assumed that the origin resides at the top of transducer 1 and that both transducers are in the same plane xy. A solution is sought in the xy plane, for which two line equations of the lines passing through the center of each transducer are shown as follows:

$$-m_1 x + y = 0, \text{ for Transducer 1} \tag{19}$$

$$-m_2 x + y + (-y_T + m_2 x_T) = 0, \text{ for Transducer 2} \tag{20}$$

The coordinates $x_1$ and $y_1$ where both lines intersect is then given by:

$$x_1 = \frac{(y_T - m_2 x_T)}{m_1 - m_2}, \tag{21}$$

$$y_1 = m_1 x_1$$

The coordinate $z_1$ can be calculated using either polar angle with $$z_1 = \frac{\sqrt{x_1^2 + y_1^2}}{\tan \phi_1} = \frac{\sqrt{x_2^2 + y_2^2}}{\tan \phi_2} \tag{22}$$

The previous example can be adjusted for different transducer configurations. Provided that the locations of the transducers are known, the location of the acoustic source can be easily inferred using trigonometric analysis.

In other example implementations involving biaxial ultrasound transducers, multiple biaxial ultrasound transducers can be employed to perform acoustic source localization in three dimensions. For example, two biaxial ultrasound transducers can be provided and oriented such that the respective biaxial planes are orthogonal. The cylindrical angles from the two transducers, obtained by processing the signals from the respective biaxial electrodes, can be employed to localize the acoustic source in three dimensions. In other example implementations, an array of biaxial ultrasound transducers may be employed to perform three-dimensional source localization, provided that at least two biaxial ultrasound transducers have non-parallel biaxial planes.

While the preceding analysis and the examples below relate to specific example transducer configurations and algorithms for the determination of source direction and/or location, it will be understood that a wide variety of configurations and algorithms may be employed to facilitate a determination of source direction and/or location.

For example, while the preceding example embodiments employ only a pair of multiaxial ultrasound transducers for source localization (e.g. a pair of biaxial ultrasound transducers for source localization in 2D or a pair of triaxial ultrasound transducers for source localization in 3D), it will be understood that more than two multiaxial ultrasound transducers may be employed to when performing source localization. For example, the use of more than one pair of multiaxial ultrasound transducers for source localization may be beneficial in improving localization accuracy. In some example implementations, in order to reduce the error in the estimation of source location, three or more multiaxial ultrasound transducers may be employed in an array configuration (e.g. transducers $T_1$, $T_2$, $T_3$, ... $T_n$, where n is the number of transducer element). The determination of the location of the acoustic source can be performed by pairing different transducer elements (i.e., $[T_1, T_2]$, $[T_1, T_3]$, $[T_2, T_3]$, etc.) and averaging the estimated source positions obtained by processing terminal voltages from each of the pairs.

In some example implementations, transducer-specific mathematical fitting may be beneficial in order to determine a suitable relationship between source direction and/or location and transducer terminal voltages. In some example implementations, machine learning algorithms such as, but not limited to, support vector regression, may be employed to determine a suitable relationship between source direction and/or location and transducer terminal voltages.

It is also noted that while the examples presented below involve the characterization and determination of source direction and/or location within a limited spatial ranges, it will be understood that these spatial limitations are not intended to be limiting. In particular, the spatial and angular characterization in the examples below is limited, in part, because of optimizations were targeted for the example intended application of in-utero histotripsy monitoring. In-utero histotripsy typically occurs approximately between the depths of 10 cm and 14 cm, and within a radius of approximately 4 cm from the origin. The single-element transducer results described in the examples below involved points in this range, giving approximate bearings of −25 to 25 degrees in the biaxial case. Linear arrays, where transducers are necessarily offset from the origin, will extend the range of bearings and polar angles to ±30 degrees, ±40 degrees, or even larger angular ranges.

Although many of the example embodiments disclosed above may be employed to passively determine a direction and/or location of an acoustic source, it will be understood that the multiaxial detection methods described above can be combined with time-of-flight methods to improve the detection of the location of reflecting events, which may be beneficial in improving the image quality of traditional ultrasound imaging. Indeed, while the preceding example multiaxial location do not use time-of-flight (TOF) information in the case of active sources such as cavitation events, it is noted that when combined in tandem with TOF, the multi-axial detection method can help to increase the accuracy of the calculation of the location of the acoustic source, whether the acoustic source is active or passive.

For example, referring again to FIGS. 32A and 32B, if the acoustic source 910 is a reflector (e.g., a two-tissue interface, air-tissue interface, or change in acoustic impedance), a single multiaxial transducer could generate an ultrasound pulse, measure then the time-of-flight (TOF) to estimate the distance d with the standard ultrasound-based location formula given by:

$$d = \frac{TOF}{2c}, \tag{23}$$

where TOF is the time that takes to travel from the transducer to the reflector and back to the transducer, and c is the speed of sound of the medium.

In the case detection with a single biaxial ultrasound transducer operated in Tx/Rx mode, the source angle $\alpha_1$ can be determined from the biaxial detection method and the depth d can be determined from the traditional TOF method. The Cartesian coordinates can be determined according to:

$$z = d \arcsin\left(\frac{\pi}{2} - \alpha_1\right), \tag{24}$$

$$x_1 = d \arccos\left(\frac{\pi}{2} - a_1\right)$$

In example implementations involving arrays of ultrasound emitters, both the directional information obtained from multiaxial detection and the directional information from traditional TOF beamforming methods may be employed. For example, by combining multiaxial direction determination with traditional TOF beamforming, imaging accuracy may be improved, and artifacts can be potentially suppressed or reduced in intensity. Large arrays of multiaxial transducers can be implemented to provide or improve upon a location estimate by averaging the location estimates of different pairing of transducers in an array or subaperture. It is noted that the computational complexity to use multiaxial detection alone or in combination with TOF methods can be low.

Accordingly, in various example embodiments involving an array of ultrasound transducers, at least a subset of the transducers of the array can be multiaxial ultrasound transducers, and the signals from the multiaxial signals can be processed according to the previously described methods to obtain direction and/or location information. This can be combined with results from conventional TOF beamforming of signals obtained from the array of ultrasound transducers to improve the accuracy of results relative to that which would be obtained using conventional TOF beamforming. For example, directional and/or location information can be obtained based on two or more multiaxial array elements, which need not reside adjacent to one another in the array. In some example implementations, the multiaxial ultrasound elements employed to obtain additional direction and/or location formation can be selected to avoid or minimize regions where the cylindrical angle (for 2D) or the polar and azimuth angles (for 3D) of a point source may have a multi-valued relationship with the phase difference or amplitude ratio.

In some example implementations, all of the array elements of an ultrasound array may be multiaxial ultrasound array elements, while in other example implementations, only a portion of the elements of an ultrasound array may be multiaxial ultrasound elements.

In implementations in which the acoustic source direction is determined via multiaxial processing of signals from a plurality of multiaxial ultrasound array elements (e.g. all or a subset of an array such as a 32 element array, a 256 element array, or beyond a 256 element array), the resulting improvement can translate in a high precision detection of the source, being either passive or active.

For example, for reflecting interfaces, a hyperechogenic reverberating pattern (for example, caused by standing waves between an array and a strong reflector) often shows "fake" interfaces in the reconstructed image behind the reflecting object. The multi-axial method can help to discern that the echoes coming from the "fake" interfaces are actually coming from the multiple reflections from the same interface, as the directivity information for those reflections would be the same, then it can help to eliminate from the image those "fake" interfaces, resulting in a considerable improvement of the image quality. Accordingly, the combination of TOF and detection of directivity with multi-axial technology can reduce a large number of artifacts as the multi-axial method can help determine the directivity of the echoes and adjust the TOF-based image reconstruction.

In one example embodiment, a one-dimensional linear array of triaxial ultrasound transducers may be employed for three-dimensional imaging. The triaxial ultrasound transducers could be controlled during transmission, with a combination of traditional TOF transmit beamforming and biaxial control of emission direction, as described, for example, in co-pending International Patent Application No. PCT/CA2021/0500014, titled "SYSTEMS AND METHODS FOR CONTROLLING DIRECTIONAL PROPERTIES OF ULTRASOUND TRANSDUCERS VIA BIPHASIC ACTUATION" and filed on Jan. 8, 2021, which is incorporated herein by reference in its entirety. The direction of transmission is controlled, in three-dimensions, by delivering first transmit signals to the array of triaxial ultrasound array elements such that the emission direction within a beamforming plane defined by the array axis and the direction perpendicular to the propagation electrodes is controlled by traditional TOF transmit beamforming and the emission direction perpendicular to this plane is controlled by delivering second transmit signals to the pair of lateral electrodes that are parallel to the beamforming plane. By controlling the amplitude, phase, and optionally delay of the second driving signals relative to the first driving signals, the transmit beam may be steered in three-dimensions. Receive signals that are received by the triaxial ultrasound array may be processed by a combination of traditional receive TOF beamforming and the preceding example triaxial source localization methods to determine a location associated with a reflector.

While much of the preceding disclosure involving acoustic source localization via multiaxial ultrasound transducers relates to the determination of the direction and/or location of a single acoustic source, it is noted that the scope of the present disclosure is not intended to be limited to single source detection and can be implemented in cases involving multiple acoustic sources. One final consideration is the case of multiple reflectors (i.e., an interface line between two types of tissues) where the multi-axial detection method can improve their detection.

Indeed, example implementations involving a single acoustic scatterer or acoustic source may be implemented using either continuous wave or time-resolved signal detection, two or more scatterers or acoustic sources may be detected using the methods described herein provided that their respective signals are temporally separated. In some example implementations involving phased array detection, TOF receive beamforming can be employed to further discern multiple acoustic scatters and/or acoustic sources. For example, when multiple multiaxial transducers are employed in an array, the source directions calculated from multiple multiaxial ultrasound transducers within a given time window can be employed to identify the dominant acoustic reflector. According to such methods, data from different segments of time can be separately processed to detect a dominant acoustic source within any given time segment.

In some example embodiments involving an array of multiaxial ultrasound transducers, directional and/or information obtained by processing the voltages received at the multiaxial terminals, as per methods described above, may be employed to identify image artifacts in image data obtained via conventional TOF beamforming. An example of such an embodiment is shown in FIGS. 44A and 44B. FIG. 44A illustrates a case in which a conventional ultrasound array 950 is employed to generate, via conventional TOF beamforming, an image 970 that includes a strong reflector 955. The formation of a standing wave between the conventional ultrasound array 950 and the strong reflector 955 results in the generation of an image artifact 965.

If at least some of the array elements of the ultrasound array are multiaxial ultrasound array elements, as shown in FIG. 44B, the preceding multiaxial processing methods can be employed to determine a direction and/or location of one or more regions along the strong reflector 950. For example, as shown in FIG. 44B, if sub-apertures (such as sub-aperture 982) of the ultrasound array 982 are sequentially actuated during transmission, such that localized regions of the strong reflector are sequentially insomnified during transmission (such as region 952 shown in FIG. 44B), then one or more multiaxial ultrasound array elements could be employed to obtain additional direction and/or location information associated with one or more of the locally insomnified regions of the strong reflector 950.

This additional information could be employed to validate the primary image data 960 associated with the strong reflector 960 and negate the artifact image data 965, such that a corrected image 975 can be generated that is absent of the artifact. For example, TOF image data having directions and/or locations that are not correlated with respective directions and/or locations identified by multiaxial processing can be selectively removed to obtain a corrected image. As shown in the figure, this validation and/or correction may be performed based on a single locally insomnified region associated with a single sub-aperture, or based on multiple locally insomnified regions associated with multiple sub-apertures. Furthermore, in the case of multiple strong reflectors, the time-resolved multiaxial processing methods described above could be employed to obtain location information associated with the multiple strong reflectors.

In example implementations involving acoustic sources as opposed to acoustic scatters, and where acoustic signals are received from an ultrasound array in the absence of transmission events, the location of an acoustic source that is determined from multiaxial processing can be employed to perform receive beamforming of the signals received from the ultrasound array, thereby permitting the use of beamformed receive data to provide an additional estimate of the source location. In one example implementation, the direction of an acoustic source that is determined from multiaxial processing may be employed to select an image line direction for performing receive beamforming, with the resulting focal location found along that image line being employed to determine the source location.

It will be understood that the preceding example implementations involving the detection of the direction and/or location of an acoustic source via the processing of signals detected by a multiaxial transducer may find applications in a wide range of fields. For example, such devices and methods may find application applications including, but not limited to, ultrasound imaging applications, such as, for example, imaging via an ultrasound imaging catheter; and therapeutic applications such bubble detection and localization in histotripsy; and in applications involving the detection of signals from another ultrasound transducer, such as, for example, location sensing of ultrasound probes, sonar applications, and applications in ultrasound computer tomography.

EXAMPLES

The following examples are presented to enable those skilled in the art to understand and to practice embodiments of the present disclosure. They should not be considered as a limitation on the scope of the disclosure, but merely as being illustrative and representative thereof.

Example 1: Fabrication of Prototype Device

Figure 11C:
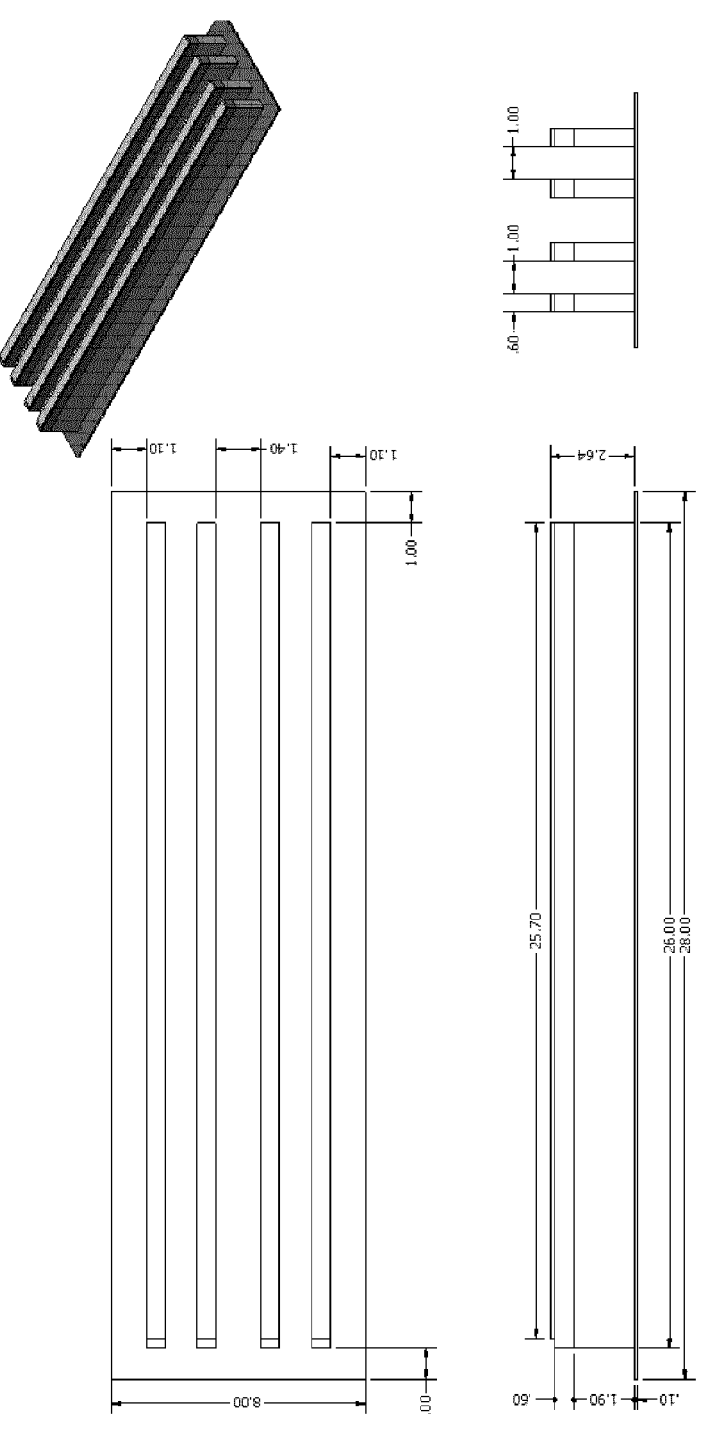
FIG. 11C is a drawing showing the dimensions of the example 4-element transducer.
Figure 11D:
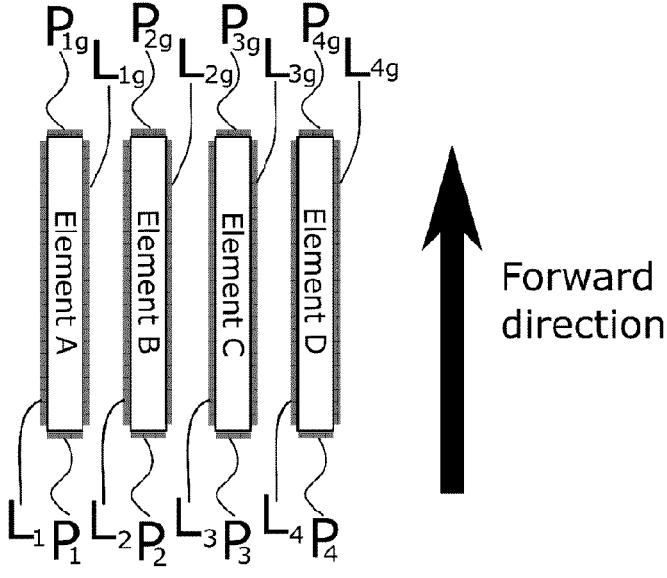
FIG. 11D shows a schematic of electrodes associated with each transducer element.

An ultrasound imaging device was built having two pairs of orthogonal electrodes for driving according to the biphasic method disclosed in International Patent Publication No. PCT/CA2014/051113. FIG. 11A shows a photograph of the final device, while FIG. 11B shows the transducer interfaced with a connector. A computer assisted drawing (CAD) of the transducer array is shown in FIG. 11C. FIG. 11D shows a schematic of electrodes for each transducer element.

Each transducer was built from custom lead zirconate titanate (PZT) material with a length of 26 mm, thickness (propagation direction) of 0.6 mm and width of 0.6 mm. On the "top" and "bottom" in the propagation direction of each transducer, silver epoxy (H20E, Epoxy Technology, MA, USA) was used as conductive matching (0.14 mm-thickness) and backing (1.9 mm-thickness) layers. The gap between the elements was 1 to 1.4 mm.

The material properties of the PZT and epoxy are shown in FIG. 31.

Example 2: Electrical Testing of Electrodes

A series of tests was initially conducted to verify the conductivity of the elements and to detect short circuits.

These tests were performed to avoid damaging the driving equipment. Referring to FIG. 11D, electrodes $P_1$ and $L_1$ on element A were found to be short circuit. We could not identify the location of the short circuit. The short circuit was not at the level of the PCB connector attached to the driving equipment. Due to the fragility of the connectivity on the transducer side, we decided not to use element A for testing. Electrodes $L_2$, $P_2$ and $L_3$ were found not to be conducting correctly. Further inspection detected damage on the PCB board at the connector. The damage may have occurred during transport. Repairs were done and mechanical holding of the cable was reinforced to avoid repetition of this failure.

Figure 12A:
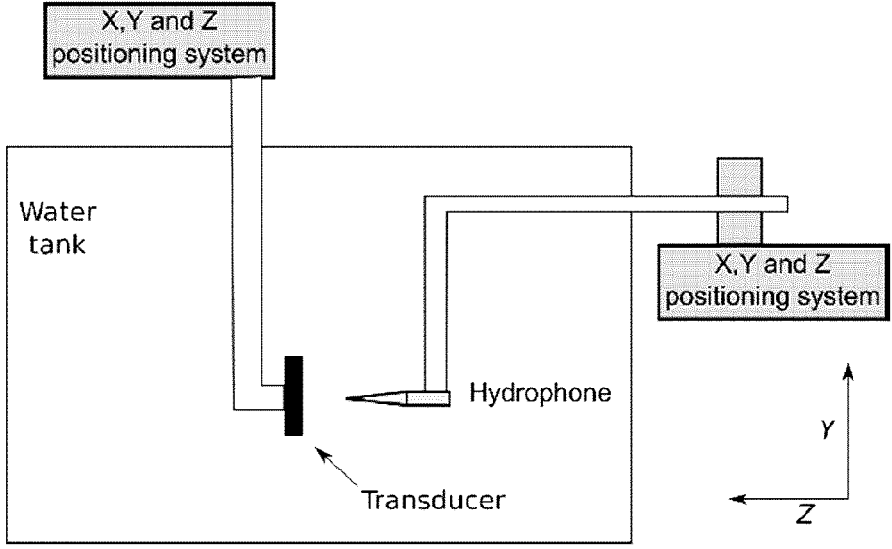
FIG. 12A is a schematic illustration of the acoustic tank employed to characterize the transducer.
Figure 12B:
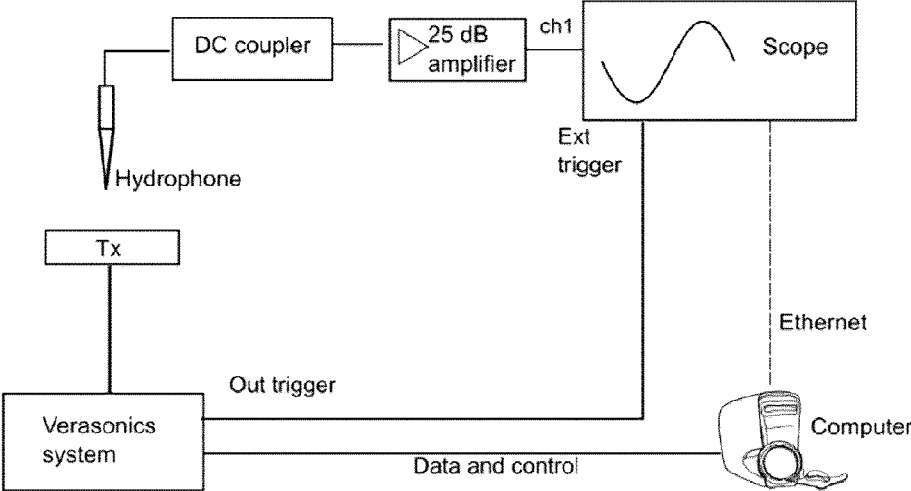
FIG. 12B illustrates the electronics employed when characterizing the transducer in the acoustic tank.

Example 3: Experimental Hydrophone Configuration for Measurements of Biphasic Mode FIGS. 12A and 12B show the experimental and electronic setup, respectively, for performing hydrophone measurements. A 0.075 mm-diameter needle hydrophone (Precision Acoustics, Dorset, UK) was used to capture emissions from the transducer array. The hydrophone was mounted on a robotic 3D-positioner. Acoustic pressure measurements were collected for each transducer element by placing the hydrophone 2 cm from the central region of the transducer element. Measurements with the hydrophone were coupled, amplified and then digitized with an oscilloscope (Waverunner XPS, LeCroy). Driving the transducer was performed using the 128 Vantage System (Verasonics, Kirkland, WA, USA), which uses an arbitrary waveform module that was required to program the de-phased signals in the lateral electrodes.

Example 4: Phase Variation Hydrophone Test

Figure 13A:
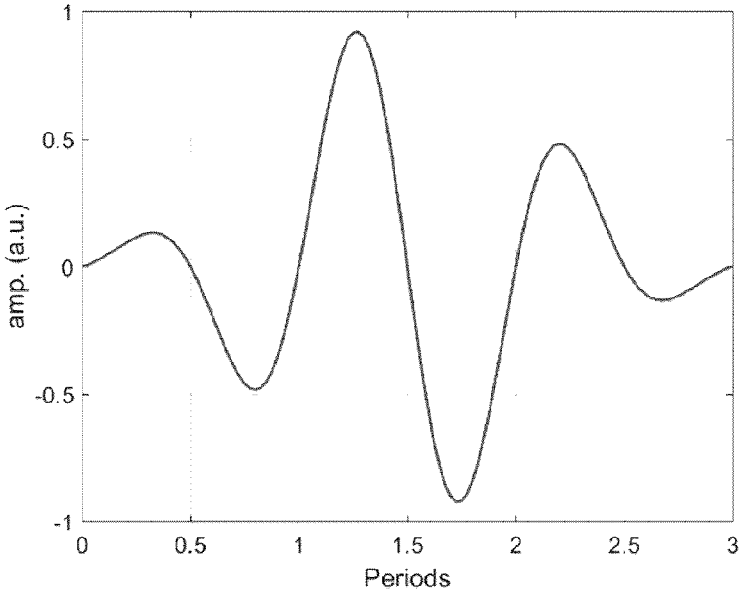
FIGS. 13A and 13B plot the waveforms of electrical imaging pulses with 0° (A) and 180° (B) phase.
Figure 13B:
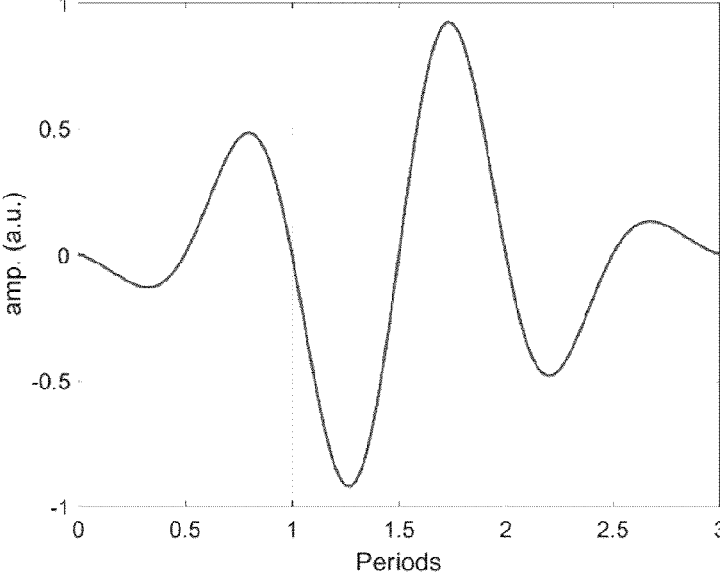

A series of acquisitions was performed to test the biphasic method. Tests were performed by programing the L-electrodes with an imaging pulse with different phase values. FIGS. 13A and 13B show examples of the pulses sent to the transducer elements, with a 180° phase offset between the two examples.

The test consisted in varying the phase in the L-electrodes from 0° to 350° in steps of 10°. For each phase value tested, three repetitions were performed. The voltage amplitude on the P- and L-electrodes was set to 30 V. For comparison, a test driving only the P-electrodes with 30 V was performed.

Figure 14:
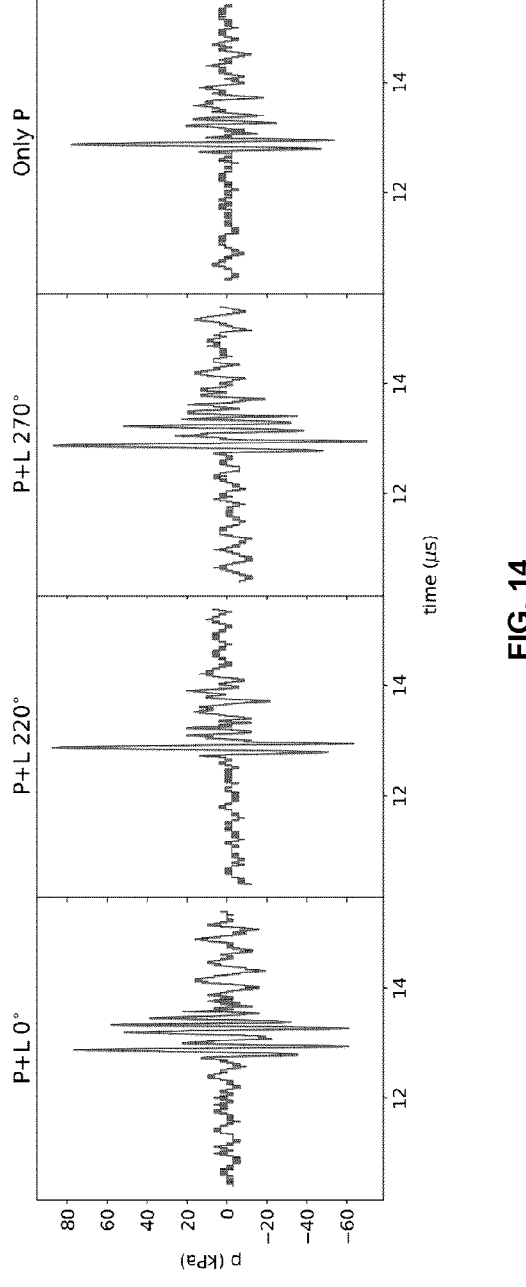
FIG. 14 plots, from left to right, hydrophone measurements using the biphasic method with 0°, 220°, 270° phase differences between the propagation (P) and lateral (L) electrodes, and using propagational-only electrodes.

FIG. 14 plots examples of pulses collected with the hydrophone for a P+L test with 0°, 220°, 270° and also for a reference test using only the P-electrodes. As can be seen in the figure, the shape of pulses and amplitude change as a function of the phase applied on the L-electrodes. A phase of 270° produced a larger amplitude compared to the propagation-only test, but a broader pulse was observed, which is not optimal for imaging. The test with 220° produced a more moderate amplitude gain, while preserving a short pulse duration. The test with P-only electrode excitation showed a small ringing effect (a trail of supplemental pulses), which is normally undesired for imaging.

Figure 15A:
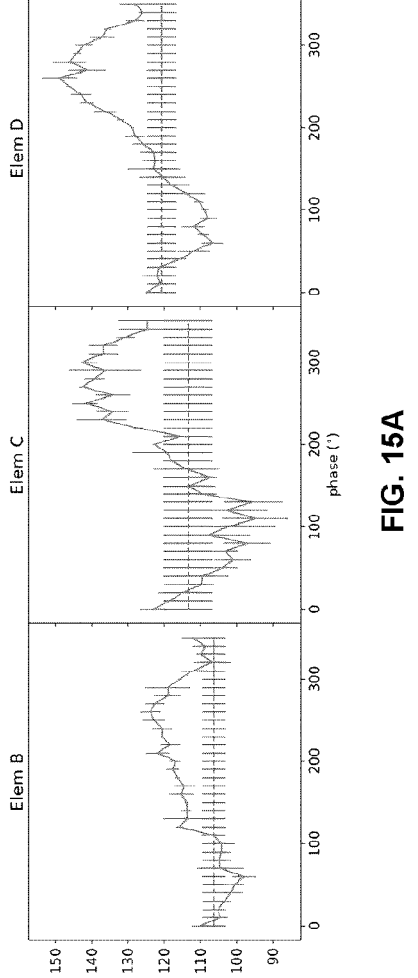
FIGS. 15A and 15B plot measurements of the peak-peak pressure (A) and half-pulse duration (B) obtained with the biphasic mode (P+L) as a function of the phase on the L-electrode for each transducer elements. The biphasic test (P+L) exhibits a phase dependence, while the reference test does not show a phase dependence.
Figure 15B:
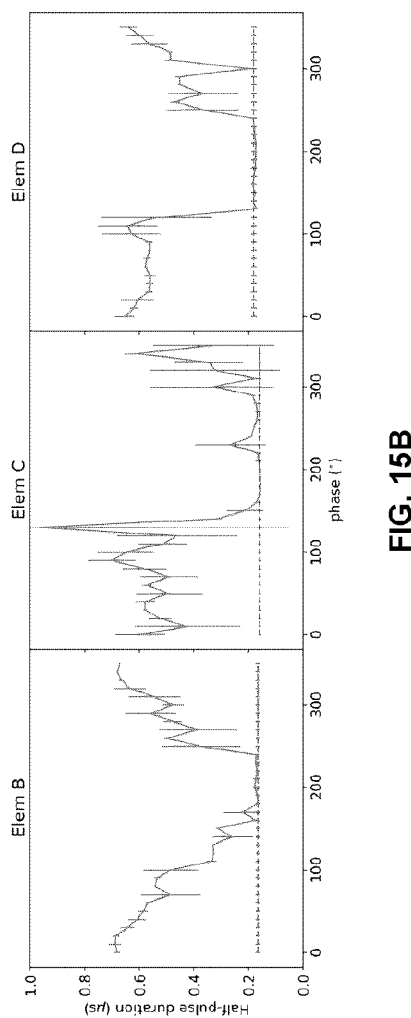

The peak-to-peak pressure amplitude and half-width pulse duration were calculated for all measurements. FIGS. 15A and 15B show the peak-to-peak pressure amplitude and half-width pulse duration, respectively, for each transducer element, as a function of the phase applied to the L-electrode. The biphasic effect was clearly observed as the peak-peak amplitude followed a sinusoidal relationship with the phase applied on the L-electrode. This trend was observed for all transducer elements. The maximum peak amplitude gain for elements B, C and D was, respectively, 16%, 26% and 24%. The respective optimal phases per element were 260°, 300° and 260°, respectively, for an average optimal phase of 273°.

The effect of the biphasic driving method on the half-pulse transient duration, which should be as narrow as a possible, was similar among three transducer elements. This duration increased for phase values close to 0° and dropped to a duration close to the baseline for phase values around 200°. These results are the first demonstration of the biphasic effect on an imaging transducer both in terms of the resulting amplitude and pulse shape.

Figure 16A:
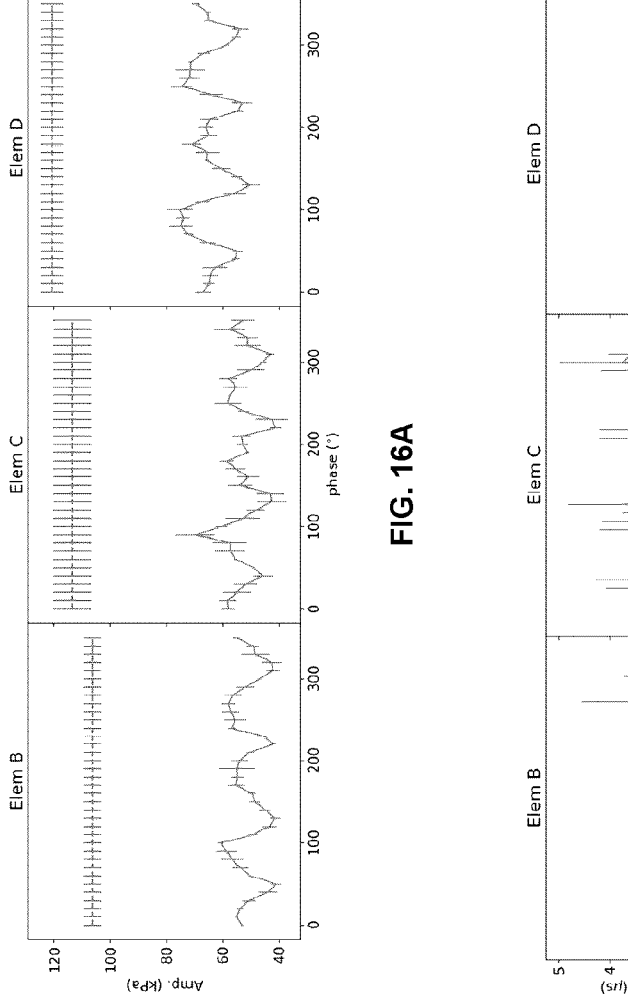
FIGS. 16A and 16B plot measurements of the peak-peak pressure (A) and half-pulse duration (B) when driving only the L-electrode. The L-only test exhibits a phase dependence, while the P-only test does not show a phase dependence. Error bars indicate standard deviation.
Figure 16B:
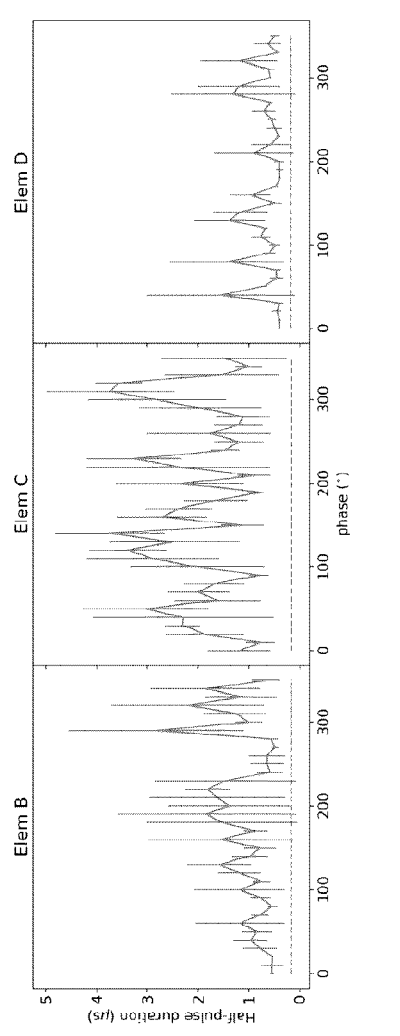

FIGS. 16A and 16B show measurements of peak-peak amplitude and half-pulse duration, respectively, when driving the transducer using only the L-electrodes. Driving only the L-electrodes showed a peak-pressure that was much smaller than when using the P-electrodes or when using the P+L mode. The peak pressure oscillated several times as function of the applied phase (4 "cycles"). The observed half-pulse durations were also much wider when compared to the P-only and P+L tests.

Example 5: Delay Variation Hydrophone Test

The inventors found that adding a supplemental delay to the waveforms transmitted by the P and L electrodes, in addition to the change in phase, could influence the biphasic effect. In order to investigate this effect, an additional set of phase variation tests were performed, where a supplemental delay was applied on the L-electrode. The delay was expressed in periods (T) of the central frequency, from 0 to 3 T, in steps of 0.5 T. The imaging pulse employed in these experiments had a duration of 3 periods, ensuring that the P and L waveforms were at least partially overlapped in time. The inventors performed the present additional experiments based on the hypothesis that different gains of the P+L mode could be observed by adding fractions of periods to the signal applied on the L-electrodes.

Figure 17:
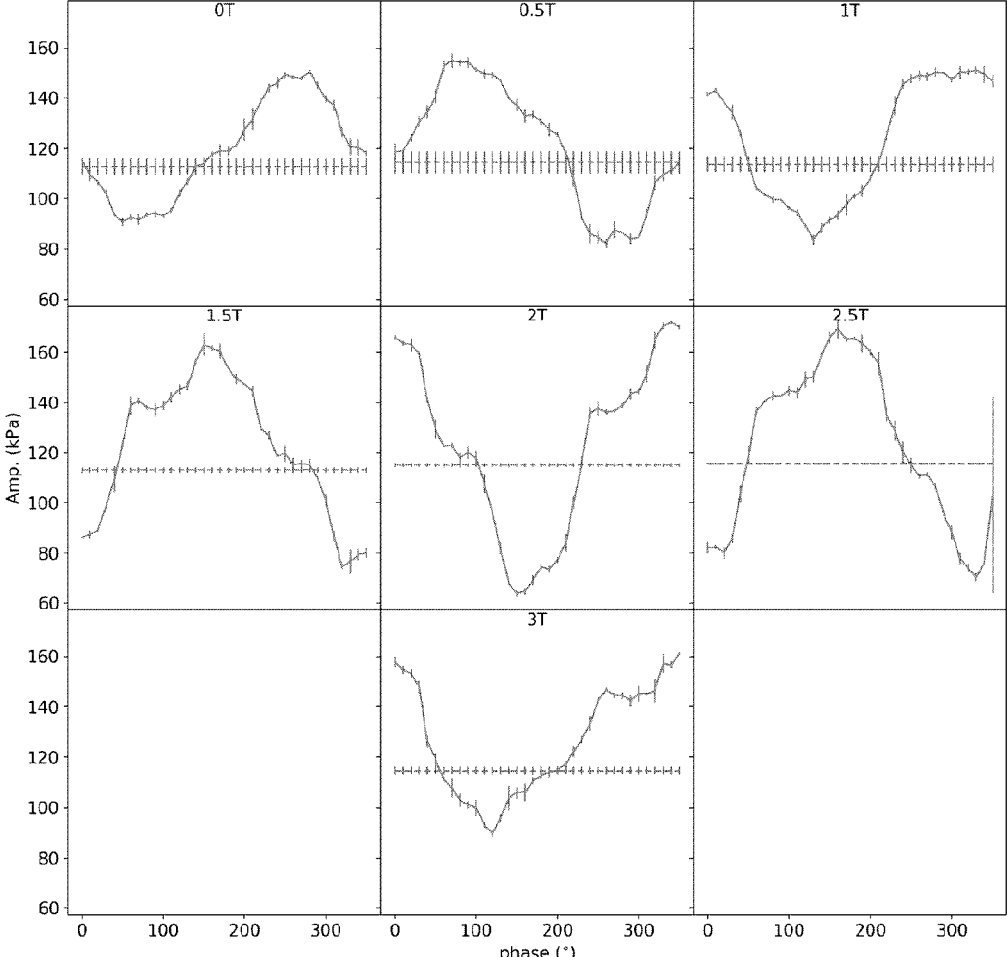
FIG. 17 plots measurements of the peak-peak pressure obtained with the biphasic mode (P+L) for the test using a supplemental delay in the signal applied to the L-electrodes. The biphasic test (P+L) shows a phase dependence, while the reference test (only P) does not show a phase dependence. Error bars indicate standard deviation.
Figure 18:
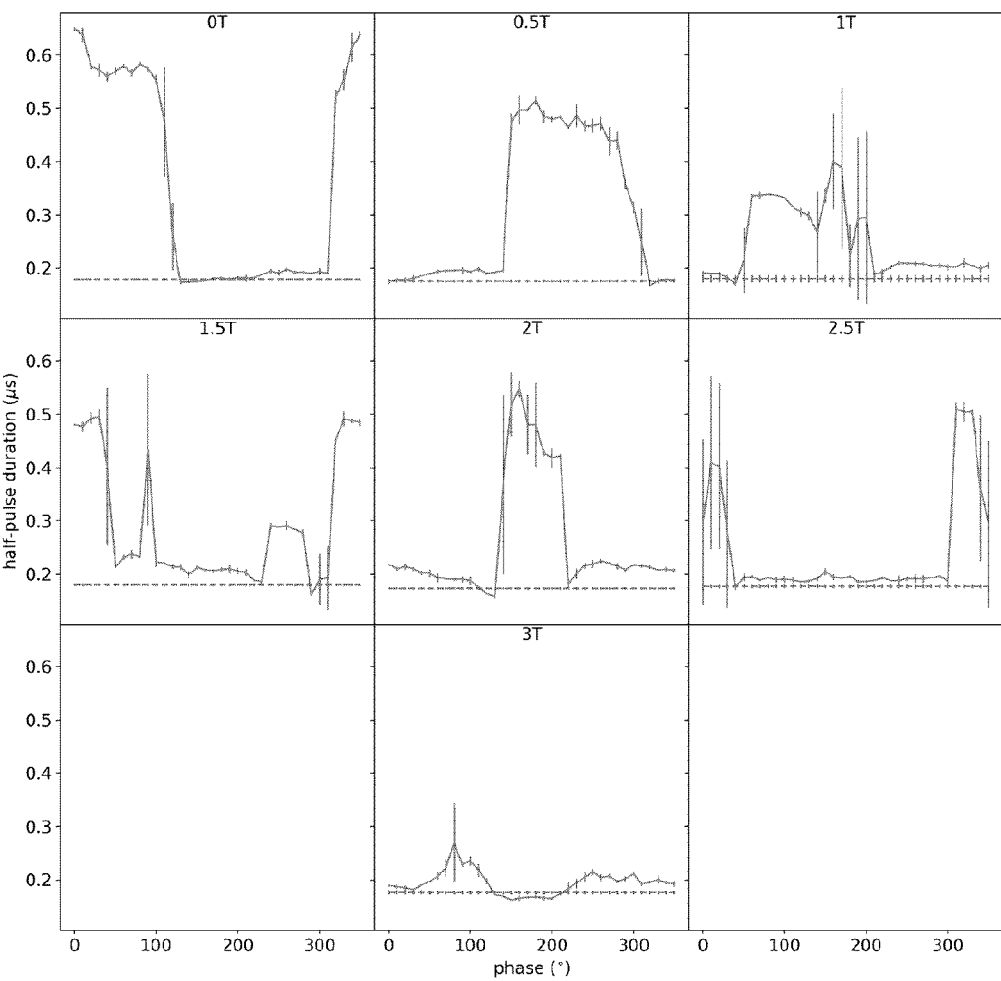
FIG. 18 plots measurements of the half-pulse duration obtained with the biphasic mode (P+L) for the test using a supplemental delay in the signal applied to the L-electrodes. The biphasic test (P+L) shows a phase dependence, while the reference test (only P) does not show a phase dependence. Error bars indicate standard deviation.

FIGS. 17 and 18 show, respectively, the peak-peak amplitude and half-pulse duration of the different tested delays. These tests were performed on element D of the transducer. These results demonstrate that the biphasic effect was indeed modified by introducing a supplemental time delay between the P and L waveforms. The gain was observed to increase with the temporal delay and reached a maximum for a delay of 2 T and a phase of 340°. The gain in this case was 50%, which was double that obtained when using a delay of OT (24%). The half-pulse duration for this configuration was 0.22 s, which is 22% larger than the reference duration of 0.18 s. The configuration with 2.5 T and a phase of 160° produced a gain of 46%, while reducing the half-pulse duration to 0.195 s, which is only 8% larger than the reference duration.

Example 6: Experimental Configuration for Imaging Tests

Figure 19:
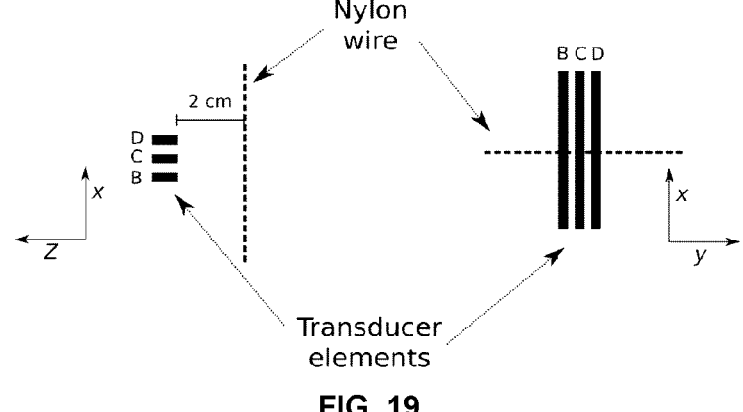
FIG. 19 schematically illustrates the experimental configuration of the reflector used for the imaging test.

As shown in FIG. 19, a nylon wire with a diameter of 0.36 mm was used as a reflector to test imaging with the biphasic prototype. The wire was placed 2 cm from the imaging transducer, crossing the central region of the transducer elements. The 128 Vantage System (Verasonics) was programmed to create planar B-mode images. Raw RF-data were acquired for each electrode and various tests were performed to evaluate several scenarios when the biphasic method was applied for imaging purposes. A time gain compensation (TGC) of 27 dB was applied in the region of the nylon wire. This gain was kept constant for all tests. B-mode images were reconstructed with the envelope profile of the Hilbert transform of the RF data. Each experiment captured 100 frames and each experiment was repeated 5 times, for a total of 500 frames.

Figure 20:
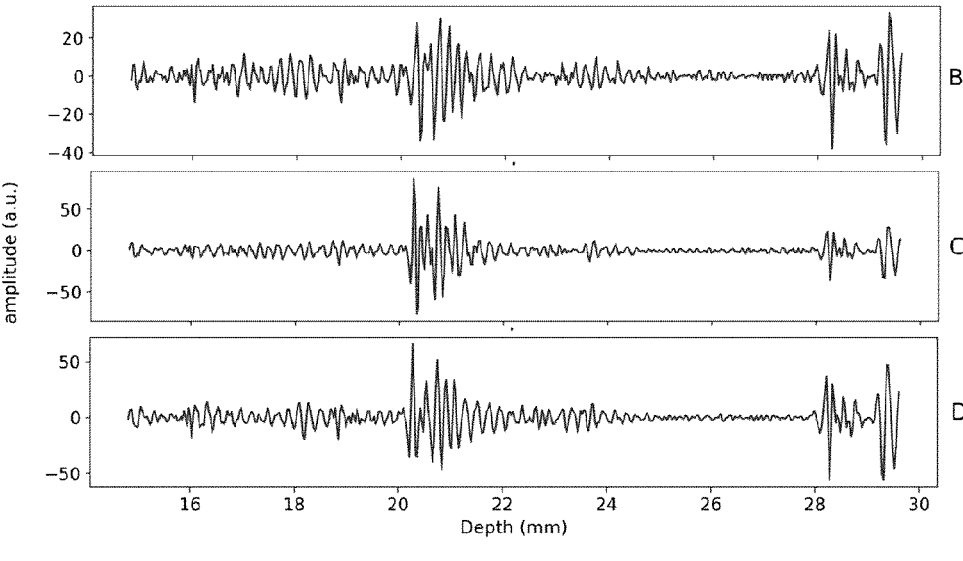
FIG. 20 plots examples of echo signals received on the P-electrodes of elements B, C and D of the transducer.
Figure 21:
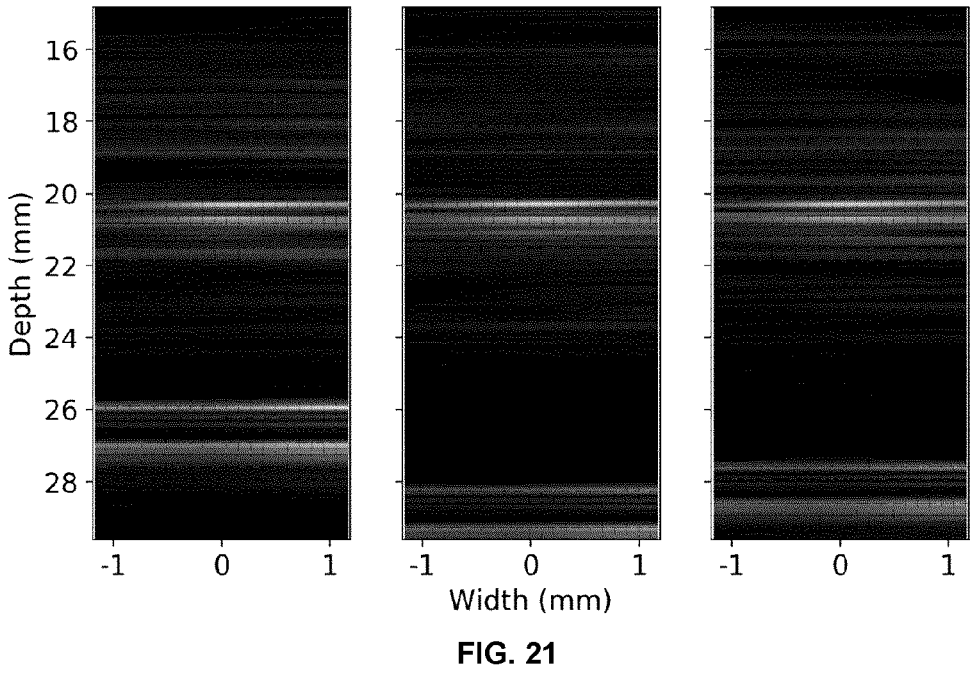
FIG. 21 shows three examples of B-mode images, where only the P-electrodes were used for driving and reception.

Example 7: Imaging Results with Driving and Reception Using Only P-Electrodes In the present example, driving with the P-electrodes was used as the reference in which the transducer was driven and its reading captured in the traditional ultrasound imaging configuration. FIG. 20 shows an example of an RF echo-pulse observed in the P-electrodes of elements B, C and D. The nylon-wire reflector is clearly visible at 2 cm. Noise-related pulses were also identified as arising from electrical interference in the cables. These noise-related pulses appeared at "random" locations in the captured data pulse. FIG. 21 shows three B-mode images (one of the images is formed using the RF data from FIG. 20) showing the presence of the nylon wire and the noise pulses. FIG. 29A shows the average (±s.d.) peak-peak amplitude, axial resolution (half-pulse width) and signal-to-noise ratio (SNR) for each transducer element. The central transducer (C) showed the best imaging metrics of the reflector. SNR was calculated using the peak amplitude and the noise region between 16 and 18 mm.

Example 8: Imaging Results with Driving and Reception Using P and L Electrodes In the present example, transducer elements were driven using both P and L electrodes, and the P and L electrodes were also both employed for receive. The optimal phase delay for each element that was established Example 4 was programmed for each corresponding L-electrode. FIG. 22 shows an example of the RF signals recorded on the P- and L-electrodes of element C. Compared to the signals recorded via the P-electrodes, the signals on the L-electrodes showed similar pulse shapes with smaller amplitude. Direct summation of the P and L signals showed an increase in the peak amplitude but also of the noise pulses. The imaging metrics were calculated as in Example 7 for the images produced using P, L and P+L RF data. FIG. 23 shows an example of reconstructed B-mode images, and FIG. 29B shows the imaging metrics from all datasets.

Compared to images reconstructed with the P-electrodes, images obtained with the L-electrodes showed less intense amplitudes but comparable SNR and better axial resolution. Metric data indicated that simple summation of P- and L-electrodes RF data (P+L) produced more intense images, but with degradation in SNR (loss of 2.7 dB in the central element compared to P-only) and a severe loss in axial resolution (142% increase in the central element compared to L-only).

The results presented above indicate the biphasic driving method modulates the output pressure generated by imaging transducers operating under broadband conditions (low-Q). Driving only the L-electrodes provided further confirmation that the pressure amplitude and shape that resulted from using the biphasic P+L mode are not the result of a simple addition of the P-only and L-only contributions, but a much more complex piezo-electric conversion resulting from the rotating electric field.

The observed pressure amplitude gain relative to the baseline is less than was observed in narrowband devices. The total applied voltage in both L- and P-electrodes was 60

V. The tests involving the driving of only the P-electrodes and varying the applied voltage indicated that the peak-peak pressure was linearly related to the voltage, which is expected in piezoelectric materials such as PZT. The maximum observed gain of 50% in the pressure measured when applying a total of 30V+30V to the P- and L-electrodes was below the level obtained by applying 60 V directly to the P-electrodes alone. The transducer showed sub-optimal broadband operation, probably originating from the non-standard fabrication process required to produce this new type of applicator.

Example 9: Imaging Results Using the Biphasic Method on Reception

Inspection of the RF data from Example 8 indicated that the noise in the P-electrodes and L-electrodes was the mostly in phase. More importantly, the pulse shapes of the reflector in the P-electrodes and L-electrodes were out of phase. The present inventors hypothesized that the biphasic effect could also be applicable in reception mode, according to the hypothesis an optimal re-phasing of the signal in the L-electrode may exist that can be added to the signal of the P-electrode to increase image quality. The inventors hypothesized that that with modified method of performing reception, the noise would be reduced, increasing both the SNR and peak-peak amplitude, while enhancing the axial resolution.

Using the same metrics of axial resolution, peak-peak amplitude and SNR, the optimal phase to be applied in reception mode of the L-electrode was determined based on the receive data from the experiments performed in Example 8. Using this method of controlling the phase between the signals received with the P and L electrodes before combining these signals, the found that the SNR metric was clearly the most robust and consistent.

The method was performed according to the flow chart shown in FIG. 10A, as follows.

1. Calculate in X the fast Fourier transform (FFT) of L-data:

$$X = FFT(L-\text{data})$$

2. For each phase ($\phi$, in radians) from 0 to $2\pi$:
   a. Calculate the Y vector (same size as X) in the frequency domain that shifts all the frequency spectrum by $\phi$ with $$Y(n) = e^{-i2\varphi\frac{\left(n-\frac{N}{2}\right)}{N}}$$

where n is the position in the spectrum and N is the size of the X vector
   b. Calculate vector Z=X×Y in the frequency domain
   c. Apply inverse fast Fourier transform (FFT$^{-1}$) to Z to calculate L-rotated:

$$L-\text{rotated} = FFT^{-1}(Z)$$

d. Add L-rotated to P-data to obtain P+L-rotated
   e. Calculate the SNR of P+L-rotated 3. The optimal φ is the one producing the highest SNR.

FIG. 24 shows a plot for one acquisition of the SNR of P+L-rotated receive signal as a function of the receive phase delay #. The results indicated that by applying a rotation to the L-signal the SNR can be improved significantly between 5 and 7 dB. It was found that the optimal phase delay between the P receive signals and the L receive signals (approximately 300°) was similar for all elements and very close to the optimal phase established in the tests to increase the pressure (Example 4), which, without intending to be limited by theory, suggests that the physical process in the piezoelectric material to increase the pressure and to improve imaging quality are linked. FIG. 29C shows the imaging metrics of the P+L-rotated signal for all the tests, including the average of the optimal phase per electrode. The SNR and axial resolution showed significant improvements when using the new P+L-rotated signal. Compared to images reconstructed with P-data, the average improvement in the SNR ranged from +3.6 dB in the lateral element D to +5.4 dB in the central element C. Axial resolution improved from 18% in the lateral element B to 43% in the central element C.

FIG. 25 shows an example of the reconstructed images with P, L, P+L and P+L-rotated RF data. The image reconstructed with P+L-rotated data clearly shows a better delineated object with less visible noise in the image.

The first tests of the biphasic method for image reconstruction provided solid evidence documenting how the technique can significantly improve image quality. FIG. 28 shows a summary of the imaging metrics obtained using the P+L-rotated method. The difference between the results obtained with the P+L-rotated methods and the reference was statistically significant ($p < 10^{-6}$) for all tests (Results from Shapiro-Wilk test indicate that every population was not normalized distributed ($p > 0.05$); the Kruskal-Wallis test was used to establish the significance ($p < 0.05$) of the difference of the medians of a given P+L-rotated test and its corresponding reference group). By applying the same rotational field concept of the biphasic method in the reception (using numerical methods), the present results demonstrated that the biphasic method can increase the SNR of ultrasound signals up to +12.4 dB, which represents a gain of 412%. This result offers the first proof that the biphasic method (applied both on transmission and on reception) can increase the image quality considerably and with less energy.

It is noted that the P+L tests had a total applied voltage of 60V, while the reference test used 30V. Because the amplitude of the signals varies linearly with voltage, simply doubling the voltage in the reference test would not produce such gain in SNR. Assuming ideal conditions, 60V would produce a gain of 6 dB on the reference test, which is less than half the maximum SNR observed with the biphasic method.

Example 10: Imaging Results with Driving and Reception Using P and L Electrodes, Driving with Supplementary Delay The results from Example 5 indicated that adding a supplemental delay to the rotated field in the L-electrodes can improve the transmitted pulse. Therefore, a series of tests was executed adding 2 T with a phase of 340° (FIG. 29D) and 2.5 T with a phase of 160° (FIG. 29E). Adding the delay further improved the quality of the imaging metrics. The P+L-rotated test with 2 T produced the best improvement in axial resolution, showing 1.1 mm, 0.8 mm and 0.8 mm for elements B, C and D, respectively. The P+L-rotated test with 2.5 T and the P+L-rotated RF data produced the highest gain in SNR, showing a remarkable average gain of +12.4 dB, +5.8 dB and +11.6 dB for elements B, C and D, respectively. The tests with delays of 2 T and 2.5 T produced SNR levels among elements that were the closest to each other. FIG. 26 shows an example of RF data for 2 T. The P+L-rotated shows the larger amplitude, while suppressing noise and narrowing the pulse shape. FIG. 27 shows a reference image and an image obtained with a delay of 2.5 T and P+L-rotated. The latter image shows much more homogenous intensity of the nylon wire.

Example 11: Imaging Results with Driving Using Only P Electrodes, and Reception Using P and L Electrodes A series of experiments were also performed in which only the P-electrode was driven, while both the P and L electrodes were employed for receive, applying the biphasic method on reception. The inventors hypothesized that the biphasic method, when applied on reception, will increase the image quality of pulses generated using only the P-electrodes. FIG. 29F shows the imaging metrics of this approach. Compared to the reference (FIG. 29A), results clearly confirmed that the biphasic method on reception when driving only the P-electrode significantly improved image quality. Results showed that the central element of the transducer significantly improved axial resolution from 0.8 mm to 0.5 mm. However, the SNR level was in overall lower compared when both P+L electrodes were used for driving (FIGS. 29C-29E).

Example 12: Expected Increase in Power Efficiency

A finite element analysis of the biphasic effect was performed using COMSOL (Multiphysics, C. O. M. S. O. L. 2011) for a ring-shaped cylindrical transducer with P electrodes on the flat surface of the ring and L electrodes on the outside and inside sides of the cylinder. The efficiency was calculated as the ratio of the acoustic and electric power and compared to the efficiency of a transducer with the same geometry but only P electrodes. This numeric analysis confirmed the measured and predicted result of an increased efficiency when using the biphasic method.

Example 13: Numerical Studies of Directional Determination Via Multi-Axial Transducers Numerical studies were performed in the frequency domain using COMSOL Multiphysics® (v. 5.6, COMSOL AB, Stockholm, Sweden). A single transducer was placed at the origin and surrounded by a 0.5 mm air backing on all sides except for the top. A point source (radius of 0.5 mm) was placed above the transducer at various locations. Two configurations were employed, one tuned for 133 kHz and one tuned for 250 kHz.

Rectangular terminals were place on the faces of the transducer, with the number and location depending on if it was a biaxial or triaxial configuration. One terminal was always placed on the transducer's top face (or "Forward" face). In the biaxial case, one terminal was placed laterally along the x axis. Point source locations were then varied along the x-z plane. In the triaxial case, terminals were placed on both lateral faces and point source locations are varied in x, y, and z. In the triaxial case, the terminal aligned with the y axis is referred to as "Lateral Terminal 1" or "L₁"
and the terminal aligned with the x axis as "Lateral Terminal
2" or "L₂."

Example 14: Results from Numerical Studies of Source Directional Determination Via Biaxial Transducers In the present example, two-terminal, or biaxial, trans-
ducers were investigated via mathematical simulation for
their ability to determine the cylindrical angle of incident
signals using 80 points across an area of 8 cm×4 cm. FIGS.
35A-35C plots the terminal phase difference and amplitude
ratio against the cylindrical angle for a grid of points along
the x-z plane at five depths relative to the top surface of the
transducer. The phase difference, on the left, shows a mostly
single-valued relationship with the cylindrical angle. In the
middle is the amplitude ratio, which shows a two-valued
relationship with the cylindrical angle, but symmetrically
around 0 degrees of the cylindrical angle. It is important to
note that the phase difference of two signals is computa-
tionally slower to compute in the time domain than the
amplitude ratio. This is in part because a buffer of points is
required to determine phase and in part because either
cross-correlation or a Fourier transform must be applied.

Overall, FIGS. 35A-35C demonstrates that biaxial trans-
ducers can provide information about the cylindrical angle
of a point source using the phase difference, amplitude ratio,
or both. The different depth levels are in good agreement and
variables visually appear to be smooth enough that they can
be fit by a polynomial regression model. While the ampli-
tude ratio is two valued, this can be compensated for by
taking the absolute value of the ratios. Information about the
sign of the angle is lost using this approach, but preliminary
results show that using the amplitude ratio gives a more
precise and accurate result. The sign of the cylindrical angle
can then be recovered using the phase difference. If the sign
of the angle is not important, such as if a source is guaran-
teed to be on one side of the transducer, then it can also be
used to directly estimate the angle.

FIGS. 36A-36C shows the same plots as FIGS. 35A-35C,
but instead with a transducer tuned for 250 kHz. While these
curves are not identical to the other frequency, they are still
consistent for different depth levels. While both phase
difference and amplitude ratio have ranges in which they
have multiple possible values for the cylindrical angle, these
ranges can be minimized by considering both relationships.
In therapeutic applications, where the likelihood of active
sources of sound outside of this area is minimal, an array
could be built and positioned to minimize ranges where
aliasing is possible.

Example 15: Results from Numerical Studies of Source Directional Determination Via Triaxial Transducers Triaxial transducers were similarly analyzed with 507
points spread over a volume of 8 cm×8 cm×3 cm, as
depicted in FIG. 37. Since the phase difference and ampli-
tude ratio show little dependence on depth, FIGS. 38, 39 and
40 show the phase difference and amplitude ratio as they
relate to the x and y coordinates of the point sources at a
single depth of 11 cm. Each figure shows a different pair of
terminals for the same point sources. While the order of the
terminals used could have also permuted, such a permuta-
tion does not make a difference to the ability of triaxial
transducer to locate a source because it simply applies the previously mentioned transformations to the data instead of
generating new results. It is noted that due to the limitations
of a greyscale colour map, white and black are in fact
adjacent to each other because of angle aliasing.

FIG. 38 depicts the phase difference and amplitude ratio
for the forward terminal and lateral terminal 1 (aligned along
the y axis). The phase difference (left) shows two regions
with different behaviour. First, in the range 0 cm<y<4 cm,
the plot shows oscillations between 180 degrees and −180
degrees. These oscillations spread spherically away from the
center of the plot, or the position of the transducer. The
relationship is multi-valued and therefore would have alias-
ing at different polar angles away from the center of the
transducer.

The second region is the lower half of the plot, or the
range of −4 cm<y<0 cm. Oscillations are also observed, but
around a difference of 0 degrees. It should be noted that, in
both cases, a singly valued relationship is found along the y
axis when taking the absolute value of the phase difference.
Overall, phase difference for this terminal pairing is best
suited for estimating y position. The amplitude ratio (right)
shows two distinct peaks in the range of y>0 cm, although
also has multiple possible values for each amplitude ratio
value. These peaks can still be characterized and combined
with other terminal pairings to address the multiple value
problem. This predictive ability along the y axis was antici-
pated, as the two terminals are aligned along the y axis.

FIG. 39 depicts the forward terminal and lateral terminal
2 (aligned along the x axis). The phase difference plot on the
left shows a similar pattern to FIGS. 38A-38C, but rotated
such that there is variation along the x axis instead of the y
axis. The amplitude ratio appears rotated and then mirrored
along x=0. This rotation is expected because this terminal
configuration is aligned with the x axis.

FIG. 40 depicts the relationships between the two lateral
terminals. These terminals appear to be related to the azi-
muth angle, as there is cyclical variation going around the
origin with little dependence on the distance from the origin.
Straight lines crossing through the origin appear to have
approximately similar phase difference, and thus the other
two terminal pairings will be required to address aliasing.
The amplitude ratio shows more peaks than in previous
plots, which may help in localization with the amplitude
ratio.

Overall, the patterns observed within these figures dem-
onstrate the ability of triaxial transducers to estimate the
cylindrical angle of point sources in a volume. All three
terminal configurations are employed to estimate the polar
and azimuth angles, as each terminal pairing appears to have
a very specialized response. Altogether, triaxial transducers
have been numerically demonstrated as able to determine
the cylindrical angle of point sources in 3D.

A demonstration of the abilities of triaxial transducers to
locate point sources is demonstrated in FIGS. 41A and 41B,
by describing both polar and azimuthal angles using spline-
based fits, which take as parameters the amplitude ratios and
return the corresponding angles (equations 7 and 8). For
simplicity, and the sake of visualization, this fit has been
limited to only use the amplitude ratios of each terminal
combination. The phase difference could also be substituted
in this plot, or a combination of both amplitude ratio and
phase differences would be analogous to a six-dimensional
plot.

Example 16: Results from Numerical Studies of Source Localization Via Biaxial Transducers Biaxial point source localization was accomplished using
the relationships explored in previous sections. For the purposes of this document, polynomial regression and splines have been used to fit the data. In the 133 kHz case, the results were adequately fit by polynomial regression. More complicated fits for 250 kHz were obtained using spline fits. FIG. 42 shows how the amplitude ratio and phase difference of a 250 kHz transducer produces a steady gradient that can be fit to estimate the polar and azimuth angles of a point source.

FIGS. 43A and 43B shows an example of how the cylindrical angle of a point source can be used to estimate its location. A fit equivalent to a lookup table was used on the left to demonstrate that localization by use of standard trigonometry and line equations (equations 11 to 22 above) can be used to estimate the location. The plot on the right demonstrates an imperfect spline fit, where small errors in the estimate produce large errors in the estimated position of the point sources. The error in the original estimate is amplified depending on how close the two transducers are located to each other. While more sophisticated fits of more points would be able to increase the accuracy of this estimate, it is likely that a larger array of sensors with a larger aperture may be beneficial in enabling applications such as image reconstruction or multi-source localization.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

Therefore what is claimed is:

1. A method of performing ultrasound imaging using an ultrasound array, the ultrasound array comprising an array of ultrasound elements, each ultrasound element comprising a ferroelectric material, propagation electrodes disposed on a first pair of opposing surfaces of the ferroelectric material, and lateral electrodes disposed on a second pair of opposing surfaces of the ferroelectric material, each pair of propagation electrodes defining a propagation direction, the method comprising:

applying a respective pair of biphasic driving signals to each ultrasound element of a first set of ultrasound elements to emit ultrasound energy therefrom, such that the biphasic driving signals respectively applied to each ultrasound element of the first set of ultrasound elements comprise:
a first drive signal that is applied to the propagation electrodes; and
a second drive signal that is applied to the lateral electrodes, wherein the first drive signal and the second drive signal are applied with a phase difference therebetween to generate a rotating electric field within the ferroelectric material;
receiving, respectively, from each ultrasound element of a second set of ultrasound elements, a first receive signal from the propagation electrodes and a second receive signal from the lateral electrodes;
combining the first receive signals with the second receive signals to generate, for each ultrasound element of the second set of ultrasound elements, a respective composite receive signal; and
processing composite receive signals to generate at least a portion of an ultrasound image.

2. The method according to claim 1 wherein the phase difference is a first phase difference, and wherein the composite receive signal is generated, for each ultrasound element of the second set of ultrasound elements, by combining the first receive signal and the second receive signal with a second phase difference therebetween.

3. The method according to claim 2 wherein the second phase difference is applied in the frequency domain.

4. The method according to claim 2 wherein the second phase difference is applied by:
applying a fast Fourier transform to one of the first receive signal and the second receive signal to obtain a transformed receive signal;
applying the second phase difference to the transformed receive signal, thereby obtaining a phase-shifted transformed receive signal; and
applying an inverse fast Fourier transform to the phase-shifted transformed receive signal.

5. The method according to claim 2 wherein the second phase difference is determined and applied by:
applying a fast Fourier transform to one of the first receive signal and the second receive signal to obtain a transformed receive signal;
generating a plurality of transformed receive signals;
applying a different test phase difference to each transformed receive signal, thereby obtaining a set of phase-shifted transformed receive signals;
applying an inverse fast Fourier transform to each phase-shifted transformed receive signal; and
selecting, as the second phase difference, the test phase difference that provides an optimal imaging metric.

6. The method according to claim 2 wherein one or both of the first phase difference and the second phase difference are selected to lie within 45 degrees of an optimal phase associated with maximum ultrasound output.

7. The method according to claim 1 wherein, for each ultrasound element of the first set of ultrasound elements, the first drive signal and the second drive signal are applied with a transmit delay therebetween;
wherein the transmit delay is sufficiently small to permit temporal overlap between at least a portion of the first drive signal and the second drive signal.

8. The method according to claim 7 wherein, for at least one ultrasound element of the first set of ultrasound elements, the transmit delay is selected to increase the ultrasound energy relative to an amount of ultrasound energy that is emitted in the absence of delay between the first drive signal and the second drive signal.

9. The method according to claim 7 wherein the first drive signal and the second drive signal are periodic time dependent signals having a common period associated therewith, and wherein the first drive signal and the second drive signal each have a respective time duration that is greater than one period, and wherein the time delay is greater than one period.

10. The method according to claim 7 wherein the different transmit delay values amount to at least two ultrasound elements are selected to harmonize one or more properties of the ultrasound array.

11. The method according to claim 10 wherein the one or more properties include signal to noise ratio and axial resolution.

12. The method according to claim 1 wherein, for each ultrasound element of the second set of ultrasound elements, the composite receive signal is generated by combining the first receive signal and the second receive signal with a receive delay therebetween;
wherein the receive delay is less than a time duration of the first drive signal, and less than a time duration of the second drive signal.

13. The method according to claim 12 wherein the receive delay is selected to increase the ultrasound energy relative to an amount of ultrasound energy that would be emitted in the absence of drive signal delay between the first drive signal and the second drive signal.

14. The method according to claim 12 wherein the receive delay varies among at least two ultrasound elements.

15. The method according to claim 14 wherein the different receive delay values amount to at least two ultrasound elements are selected to harmonize one or more properties of the ultrasound array.

16. The method according to claim 14 wherein the different receive delay values amount to at least two ultrasound elements are selected to maximize one or more properties of the ultrasound array.

17. The method according to claim 1 wherein, for each ultrasound element of the first set of ultrasound elements, the first drive signal and the second drive signal are applied with a transmit delay therebetween;

wherein the transmit delay is less than a time duration of the first drive signal, and less than a time duration of the second drive signal; and wherein, for each ultrasound element of the second set of ultrasound elements, the composite receive signal is generated by combining the first receive signal and the second receive signal with a receive delay therebetween;

wherein the receive delay is less than the time duration of the first drive signal, and less than the time duration of the second drive signal.

18. The method according to claim 1 wherein the lateral electrodes are orthogonal to the propagation electrodes.

19. The method according to claim 1 wherein the first set of ultrasound elements is the same as the second set of ultrasound elements.

20. The method according to claim 1 wherein at least one set of the first set of ultrasound elements and the second set of ultrasound elements include all elements of the ultrasound array.

21. A method of transmitting ultrasound from an ultrasound transducer, the ultrasound transducer comprising a ferroelectric material, propagation electrodes disposed on a first pair of opposing surfaces of the ferroelectric material, and lateral electrodes disposed on a second pair of opposing surfaces of the ferroelectric material, the propagation electrodes defining a propagation direction, the method comprising:

applying biphasic driving signals to the ultrasound transducer to emit ultrasound energy therefrom, the biphasic driving signals comprising a first drive signal that is applied to the propagation electrodes, and a second drive signal that is applied to the lateral electrodes, wherein the first drive signal and the second drive signal are applied with a phase difference therebetween to generate a rotating electric field within the ferroelectric material;

wherein the first drive signal and the second drive signal are applied with a time delay therebetween;

wherein the time delay is less than a time duration of the first drive signal, and less than a time duration of the second drive signal.

22. The method according to claim 21 wherein the time delay is selected to increase the ultrasound energy relative to an amount of ultrasound energy that would be emitted in the absence of delay between the first drive signal and the second drive signal.

23. The method according to claim 21 wherein the first drive signal and the second drive signal are periodic time dependent signals having a common period associated therewith, and wherein the first drive signal and the second drive signal each have a respective time duration that is greater than one period, and wherein the time delay is greater than one period.

24. An ultrasound imaging system comprising:

an array of ultrasound elements, each ultrasound element comprising:

a ferroelectric material;

propagation electrodes disposed on a first pair of opposing surfaces of the ferroelectric material; and lateral electrodes disposed on a second pair of opposing surfaces of the ferroelectric material, wherein each pair of propagation electrodes defines a propagation direction; and control and processing circuitry operably connected to the array of ultrasound elements, the control and processing circuitry comprising a processor and a memory, wherein the processor is configured to execute instructions stored in said memory for performing the steps of:

applying a respective pair of biphasic driving signals to each ultrasound element of a first set of ultrasound elements to emit ultrasound energy therefrom, such that the biphasic driving signals respectively applied to each ultrasound element of the first set of ultrasound elements comprise:

a first drive signal that is applied to the propagation electrodes; and a second drive signal that is applied to the lateral electrodes, wherein the first drive signal and the second drive signal are applied with a phase difference therebetween to generate a rotating electric field within the ferroelectric material;

receiving, respectively, from each ultrasound element of a second set of ultrasound elements, a first receive signal from the propagation electrodes and a second receive signal from the lateral electrodes;

combining the first receive signals with the second receive signals to generate, for each ultrasound element of the second set of ultrasound elements, a respective composite receive signal; and processing composite receive signals to generate at least a portion of an ultrasound image.

25. The system according to claim 24 wherein the phase difference is a first phase difference, and wherein the control and processing circuitry is configured such that the composite receive signal is generated, for each ultrasound element of the second set of ultrasound elements, by combining the first receive signal and the second receive signal with a second phase difference therebetween.

26. The system according to claim 25 wherein the control and processing circuitry is configured such that the second phase difference is applied in the frequency domain.

27. The system according to claim 25 wherein the control and processing circuitry is configured such that the second phase difference is applied by:

applying a fast Fourier transform to one of the first receive signal and the second receive signal to obtain a transformed receive signal;

applying the second phase difference to the transformed receive signal, thereby obtaining a phase-shifted transformed receive signal; and applying an inverse fast Fourier transform to the phase-shifted transformed receive signal.

28. The system according to claim 25 wherein the control and processing circuitry is configured such that the second phase difference is determined and applied by:

applying a fast Fourier transform to one of the first receive signal and the second receive signal to obtain a transformed receive signal;

generating a plurality of transformed receive signals;

applying a different test phase difference to each transformed receive signal, thereby obtaining a set of phase-shifted transformed receive signals; and applying an inverse fast Fourier transform to each phase-shifted transformed receive signal; and selecting, as the second phase difference, the test phase difference that provides an optimal imaging metric.

29. The system according to claim 25 wherein the control and processing circuitry is configured such that one or both of the first phase difference and the second phase difference are selected to lie within 45 degrees of an optimal phase associated with maximum ultrasound output.

30. The system according to claim 24 wherein the control and processing circuitry is configured such that, for each ultrasound element of the first set of ultrasound elements, the first drive signal and the second drive signal are applied with a transmit delay therebetween;

wherein the transmit delay is sufficiently small to permit temporal overlap between at least a portion of the first drive signal and the second drive signal.

31. The system according to claim 30 wherein the control and processing circuitry is configured such that, for at least one ultrasound element of the first set of ultrasound elements, the transmit delay is selected to increase the ultrasound energy relative to an amount of ultrasound energy that is emitted in the absence of delay between the first drive signal and the second drive signal.

32. The system according to claim 30 wherein the control and processing circuitry is configured such that the first drive signal and the second drive signal are periodic time dependent signals having a common period associated therewith, and wherein the first drive signal and the second drive signal each have a respective time duration that is greater than one period, and wherein the time delay is greater than one period.

33. The system according to claim 32 wherein the control and processing circuitry is configured such that the different transmit delay values amount the at least two ultrasound elements are selected to harmonize one or more properties of the ultrasound array.

34. The system according to claim 33 wherein the control and processing circuitry is configured such that the one or more properties include signal to noise ratio and axial resolution.

35. The system according to claim 24 wherein the control and processing circuitry is configured such that, for each ultrasound element of the second set of ultrasound elements, the composite receive signal is generated by combining the first receive signal and the second receive signal with a receive delay therebetween;

wherein the receive delay is less than a time duration of the first drive signal, and less than a time duration of the second drive signal.

36. The system according to claim 35 wherein the control and processing circuitry is configured such that the receive delay is selected to increase the ultrasound energy relative to an amount of ultrasound energy that would be emitted in the absence of drive signal delay between the first drive signal and the second drive signal.

37. The system according to claim 35 wherein the control and processing circuitry is configured such that the receive delay varies among at least two ultrasound elements.

38. The system according to claim 37 wherein the control and processing circuitry is configured such that the different receive delay values amount the at least two ultrasound elements are selected to harmonize one or more properties of the ultrasound array.

39. The system according to claim 37 wherein the control and processing circuitry is configured such that the different receive delay values amount the at least two ultrasound elements are selected to maximize one or more properties of the ultrasound array.

40. The system according to claim 24 wherein the control and processing circuitry is configured such that, for each ultrasound element of the first set of ultrasound elements, the first drive signal and the second drive signal are applied with a transmit delay therebetween;

wherein the transmit delay is less than a time duration of the first drive signal, and less than a time duration of the second drive signal; and wherein, for each ultrasound element of the second set of ultrasound elements, the composite receive signal is generated by combining the first receive signal and the second receive signal with a receive delay therebetween;

wherein the receive delay is less than the time duration of the first drive signal, and less than the time duration of the second drive signal.

41. The system according to claim 24 wherein the lateral electrodes are orthogonal to the propagation electrodes.

42. The system according to claim 24 wherein the first set of ultrasound elements is the same as the second set of ultrasound elements.

43. The system according to claim 24 wherein the control and processing circuitry is configured such that at least one set of the first set of ultrasound elements and the second set of ultrasound elements include all elements of the ultrasound array.

44. An ultrasound imaging system comprising:

an ultrasound transducer comprising:

a ferroelectric material;

propagation electrodes disposed on a first pair of opposing surfaces of the ferroelectric material;

lateral electrodes disposed on a second pair of opposing surfaces of the ferroelectric material;

wherein the propagation electrodes define a propagation direction; and control and processing circuitry operably connected to the ultrasound transducer, the control and processing circuitry comprising a processor and a memory, wherein the processor is configured to execute instructions stored in said memory for performing the steps of:

applying biphasic driving signals to the ultrasound transducer to emit ultrasound energy therefrom, the biphasic driving signals comprising a first drive signal that is applied to the propagation electrodes, and a second drive signal that is applied to the lateral electrodes, wherein the first drive signal and the second drive signal are applied with a phase difference therebetween to generate a rotating electric field within the ferroelectric material;

wherein the first drive signal and the second drive signal are applied with a time delay therebetween;

wherein the time delay is less than a time duration of the first drive signal, and less than a time duration of the second drive signal.

45. The system according to claim 44 wherein the time delay is selected to increase the ultrasound energy relative to an amount of ultrasound energy that would be emitted in the absence of delay between the first drive signal and the second drive signal.

* * * * *